United States Patent

[11] 3,614,406

[72] Inventor William S. Brown
Chatham, N.J.
[21] Appl. No. 400,370
[22] Filed Sept. 30, 1964
[45] Patented Oct. 19, 1971
[73] Assignee Bell Telephone Laboratories Incorporated
New York, N.Y.

[54] MACHINE PROCESSING OF ALGEBRAIC INFORMATION

9 Claims, 26 Drawing Figs.
[52] U.S. Cl. .......... 235/168, 235/156, 340/172.5
[51] Int. Cl. .......... G06f 7/385, G06f 7/39, G06f 7/00
[50] Field of Search .......... 235/168, 164, 153, 156; 340/172.5

[56] References Cited

OTHER REFERENCES

P. Wegner An Introduction to Symbolic Programming 1963 pp. 70–71
IBM 7090/7094 Programming Systems Fortran II Assembly Program, pp. 1–11, 1962, Form #C28-6235-4.

*Primary Examiner*—Malcolm A. Morrison
*Assistant Examiner*—David H. Malzahn
*Attorneys*—R. J. Guenther and William L. Keefauver

ABSTRACT: A method and apparatus are disclosed for improving the efficiency of processing and storing algebraic and similar information in a data processor. Polynomial information is treated as an array of coefficient and exponent information subject to machine boundary conditions, user format statements and linking signals. Dynamic storage allocation and exponent overflow are also provided.

| REFERENCE NO. | LOCATION FIELD | OPERATION FIELD | OPERAND/VARIABLE FIELD |
|---|---|---|---|
| 10-1 | | POLBEG | SIZE |
| 10-2 | | POLRDF | FORMAT |
| 10-3 | | POLRDD | P,FORMAT |
| 10-4 | | POLRDD | Q,FORMAT |
| 10-5 | | POLMPY | R,P,Q |
| 10-6 | | POLPRT | R |
| 10-7 | N | EQU | 20 |
| 10-8 | FORMAT | BSS | N |
| 10-9 | P | | |
| 10-10 | Q | | |
| 10-11 | R | | |

INVENTOR.
W. S. BROWN
BY G. E. Kersey
ATTORNEY

FIG. 2A

POLBEG MACRO

| REFERENCE NO. | LOCATION FIELD | OPERATION FIELD | OPERAND/VARIABLE FIELD |
|---|---|---|---|
| 20-1 | POLBEG | MACRO | SIZE,CR1 |
| 20-2 | | CALL | POLBEG,SIZE,CR1 |
| 20-3 | | COMMON | SIZE-1 |
| 20-4 | CR1 | COMMON | 1 |
| 20-5 | | END | MACRO |

FIG. 2B

| | | | |
|---|---|---|---|
| 21-1 | | TSX | POLBEG,IR |
| 21-2 | | PZE | SIZE |
| 21-3 | | PZE | CR1 |

FIG. 2C

| | | | |
|---|---|---|---|
| 22-1 | POLBEG | CLA | 2,4 |
| 22-2 | | STA | A |
| 22-3 | | STA | B |
| 22-4 | | ADD | 1,4 |
| 22-5 | | STA | C |
| 22-6 | | STA | D |
| 22-7 | | TRA | 3,4 |
| 22-8 | A | | |
| 22-9 | B | | |
| 22-10 | C | | |
| 22-11 | D | | |

FIG. 3A

| | | |
|---|---|---|
| POLRDF | MACRO | FORMAT |
| | CALL | POLRDF,FORMAT |
| | END | POLRDF |

PATENTED OCT 19 1971 3,614,406

SHEET 06 OF 19

FIG. 3D

| LOCATION | STORAGE | |
|---|---|---|
| | POLPRT | |
| FORMAT | NUMBER OF EXPONENT WORDS | (E = 1) |
| | NUMBER OF VARIABLES PER POLYNOMIAL | (V = 3) |
| | BCI OF FIRST VARIABLE | $(X = 67_8)$ |
| | MAXIMUM NUMBER OF BITS IN EXPONENT OF FIRST VARIABLE | $(B_1 = 18_{10} = 22_8)$ |
| | BCI OF SECOND VARIABLE | $(Y = 70_8)$ |
| | MAXIMUM NUMBER OF BITS IN EXPONENT OF SECOND VARIABLE | $(B_2 = 12_{10} = 14_8)$ |
| | BCI OF THIRD VARIABLE | $(Z = 71_8)$ |
| | MAXIMUM NUMBER OF BITS IN EXPONENT OF THIRD VARIABLE | $(B_3 = 6_{10} = 6_8)$ |
| | MASK FOR $B_1$ THROUGH $B_n$ ($B_1$ = 18, $B_2$ = 12, $B_3$ = 6: MASK = 000001000101) | |
| P | HEADING ADDRESS OF POLYNOMIAL P | |

FIG. 4A

| LOCATION FIELD | OPERATION FIELD | OPERATION/VARIABLE FIELD |
|---|---|---|
| POLRDD | MACRO | P,FORMAT |
| | CALL | POLRDD,P,FORMAT |
| | END | |

| LOCATION FIELD | OPERATION FIELD | OPERAND/VARIABLE FIELD |
|---|---|---|
| POLMPY | MACRO | R,P,Q |
| | CALL | POLMPY |
| | PZE | R |
| | PZE | P |
| | PZE | Q |
| | END | |

| REFERENCE NO. | LOCATION FIELD | OPERATION FIELD | OPERAND/VARIABLE FIELD |
|---|---|---|---|
| 50-1 | | CAL | X |
| 50-2 | | ACL | Y |
| 50-3 | | SLW | Z |
| 50-4 | | ERA | X |
| 50-5 | | ERA | Y |
| 50-6 | | ANA | MASK |

MACHINE PROCESSING OF ALGEBRAIC INFORMATION

This invention relates to the processing of information by machine and more particularly to the processing of algebraic information.

In a general sense information can be represented by sequences of characters which are said to constitute symbolic strings. The individual characters may be numeric, alphabetic, or they may be arbitrary symbols. As a preliminary to processing they are converted into code signals and stored.

In the case of algebraic information a symbolic string is constituted of expressions whose terms are linked by operation symbols. Each term includes integral coefficients, variables, and exponents.

In pristine form a representative algebraic expression is $3X^2Y+Z$. The first term $3X^2Y$ has an explicit coefficient of 3, a variable X with an explicit exponent of 2, and a variable Y with an implicit exponent of unity. The second term Z is linked to the first by the explicit operation symbol +. In addition to the implicit operation of exponentiation, the first term also contains an implicit operation of multiplication.

For data processing purposes all operations must be explicit. In keeping with this requirement one well-known convention uses a single asterisk to represent multiplication and a double asterisk to represent exponentiation.

According to this convention the foregoing example becomes 3*X**2*Y**1+1*Z**1 and includes the explicit representation of implicit exponents and coefficients.

In order to be converted into machine terms each individual character of a symbolic string, such as that representing the foregoing algebraic expression, is converted into a preassigned set of code signals. According to one well-known convention, six binary code signals are required for each character. Since each set of three binary signals can be represented by an octal number, two such numbers are used for each character and the foregoing expression, with all operations explicit, takes the form 03 54 67 54 54 02 54 70 54
54 01 20 01 54 71 54 54 01 which has the binary form 000011 101100 110111
101100 101100 000010
101100 111000 101100
101100 000001 010000
000001 101100 111001
101100 101100 000001

Thus the representation of the foregoing algebraic expression in machine terms can require up to 108 binary signals. For more complicated expressions the number of required symbols increases correspondingly. It is apparent for even relatively simple algebraic manipulations the storage capacity of even a large-scale machine can easily be exceeded.

Accordingly it is an object of the invention to reduce the number of symbols required in the representation of algebraic information. A related object is to reduce the amount of storage required.

When algebraic information is manipulated as an extended string of characters with preassigned symbols representing variable names and operations, including arithmetic operations and exponentiation, not only is extensive storage required, but it also becomes necessary to scan and identify the various symbols in order to determine the nature of the operation to be accomplished and to identify the associated data. Such operations are time consuming. They require the analysis of extended strings with the result that the processing machine must either have extremely large-capacity registers or it must scan data over many cycles before an operation can be completed.

Accordingly it is a further object of the invention to reduce the amount of time required in the processing of algebraic information. Still another object is to permit the manipulation of algebraic information with associated processing components of modest capacity.

In accomplishing the foregoing and related objects, the invention provides for representing algebraic expressions by their coefficients and exponents only. The position of the exponent indicates the variable with which it is associated.

For the algebraic expression $3X^2Y+Z$ considered earlier, the first term is represented by the coefficient 3 and the exponent set 210, the first two digits of the exponent set indicating the respective powers of the first and second variables X and Y, and the remaining digit indicating that the variable Z, which is absent from the first term, is raised to the zero power. Similarly the second term is represented as 1,001.

In signal terms the coefficient and exponent of each term occupy one or more machine words. Typically the coefficient is separated from the exponents which are packed, depending upon size, into one or more machine words.

Besides coefficient and exponent signals, format signals are generated which indicate the names of the variables and the maximum sizes of their exponents. The format signals also include a mask for checking certain arithmetic operations such as multiplication and indicating the way in which the exponent signals are packed. In multiplication, for example, the exponent signals must be added without overflow from one packing position to another. For the illustrative expression, the exponent set 210 of the first term can be added to the exponent set 001 of the second term without danger of a carry from one digit position to another. Verification that there has been no overflow, i.e., carry, is made using the mask.

As a result of the polynomial representation prescribed by the invention, there is a saving in time that would be otherwise required in the scanning of operation symbols. In addition, the elimination of symbols for representing variables and for indicating exponentiation reduces the required amount of machine storage. In a mathematical sense the invention provides for representing each term of an algebraic expression as a coefficient and a set, i.e., vector, of exponents.

To facilitate the processing of algebraic information, the invention provides for the lexicographic ordering of exponent sets that have been entered into storage. The designation lexicographic means that the exponent sets are ordered in a fashion similar to the ordering of words in a dictionary except with letters replaced by numbers. For the purpose of lexicographic ordering each exponent set is treated as ordinary numbers which are then sorted in numerical sequence. In the earlier example, the exponent set represented by 210 would follow the exponent set represented by 001 at the conclusion of the sorting process. Thus each polynomial entered into storage becomes an ordered vector of exponent sets with each set accompanied by its appropriate coefficient.

In the processing of polynomial information, the invention provides for initialization, followed by input, arithmetic and output manipulations. Initialization includes the establishment of format and polynomial reference locations in machine memory and the allocation of adequate data storage, the latter constituting a data buffer. Reference locations are also provided for the inner and outer bounds of the data buffer. The outer bounds are fixed, but the inner bounds are variable. As long as the data buffer is empty, the inner and outer bounds coincide.

Input begins with format information, which, for each variable, represents the name of the variable, followed by an indication of its maximum exponent size. This information is stored beginning at the format reference location and is used in generating mask signals.

The format input is followed by polynomial data. For each polynomial, a heading that is accessible from an associated reference location is created in the lower portion of the data buffer. The heading includes (1) the beginning address of the coefficient and exponent signals which are stored in the upper portion of the data buffer, (2) the address of the format reference location, and (3) the number of terms in the polynomial.

Each coefficient typically occupies a machine word and is followed by one or more words of exponent sets which are packed in accordance with format requirements.

As the data buffer becomes occupied, updating adjustments are made in the variable inner bounds in order to indicate the next available locations in the upper and lower portions of the data buffer.

The coefficient and exponent words entered into the data buffer may be initially in the lexicographic order described earlier, in which case the polynomial is said to be in "canonical" form. However if it is not, it is so ordered.

Once the format and polynomial information have been stored, a variety of polynomial arithmetic manipulations can be undertaken. One such illustrative operation is the multiplication of one polynomial by another. This proceeds by one of two methods. If there is sufficient available space in the data buffer, a "leapfrog" technique is used. Otherwise a slower "-compact" method is used. In the leapfrog method, space is reserved in the data buffer for blocks of storage amounting to one plus the number of terms in the smaller polynomial and each capable of accommodating all of the terms of the larger polynomial. Then the smaller polynomial is treated monomially, i.e., a term at a time, to multiply all of the terms of the remaining polynomial. Each such multiplication produces a partial product which is stored at one of the blocks. The first two partial products are combined into a partial sum which is stored at the beginning of a new block and allowed to overwrite one of the earlier blocks, if necessary. Each partial sum is combined with a subsequent partial product. This procedure is repeated until the desired result appears at the beginning of the first reserved block.

Using the compact method of multiplication, storage is required only for the longest partial sum and the terms of the longer polynomial. The last partial sum starts at the top of the available storage. The next partial product is placed immediately below it and then both are moved down, leaving a gap that is of the same extent as the number of terms in the longer polynomial. A partial product is then added to the partial sum to produce a new partial sum starting at the top of the available space and overwriting, if necessary, a portion of the previous partial sum.

As a result of the canonical form prescribed by the invention, operated in conjunction with the polynomial format, there is an enhancement in the speed of the operation and simplification of term by term processing.

Contributing to the speed of operation is the packing of selected machine words with pluralities of distinctive items, such as the exponents of a set. This permits the items, e.g., the exponents, to be processed on a word-by-word basis instead of individually. For such words, each item occupies a distinctive region. As long as the regions remain distinctive, there is no error. However, if an overflow takes place from one region to another, the operation has to be rejected.

To indicate the occurrence of any overflow, the invention provides mask signals which delimit the various regions. Each word resulting from an operational sequence being tested is subjected to the equivalent of an Exclusive-OR operation with its source words. This procedure eliminates all noncarry signals from the word under test which is then subjected to an AND operation with the mask signals. If there had been no carry into the mask position, the result would have been zero; nonzero otherwise.

The final manipulation is the extraction of the processed data signals from storage. This can be done by adopting well-known output techniques commonly employed with data processing machines.

Other aspects of the invention will become apparent after considering an illustrative embodiment in conjunction with the figures in which:

FIG. 2A is a listing of a macrodefinition corresponding to the first instruction of FIG. 1A;

FIG. 2B is a calling sequence for the subroutine corresponding to the first instruction of FIG. 1A;

FIG. 2C is a listing of the subroutine corresponding to the first instruction of FIG. 1A;

FIG. 3A is a listing of a macrodefinition corresponding to the second instruction of FIG. 1A;

FIG. 3D is a diagram of memory storage allocated in the vicinity of the format statement of FIG. 1C, showing assignments made to the format statement by the subroutine of FIG. 3B;

FIG. 4A is a listing of a macrodefinition corresponding to the third instruction of FIG. 1A;

FIGS. 4B-1 and 4B-2 are flow charts for the subroutine corresponding to the third instruction of FIG. 1A;

FIGS. 4D-1 and 4D-2 are flow charts for the canonical form subroutine included within the flow chart of FIG. 4B;

FIG. 5A is a listing of a macrodefinition corresponding to the fourth instruction of FIG. 1A;

FIGS. 5D-1 through 5D-3 are expanded flow charts of the flow chart of FIG. 5C; and FIGS. 5E-1 and 5E-2 are respectively a listing and a block diagram for checking exponent addition in accordance with the invention.

The method of processing information by the embodiment here disclosed is independent of the machine by which it is performed. It is only necessary that the machine have a memory unit for storing signals representing information, a unit for entering signals into and extracting them from storage and units for manipulating and decoding the signals.

For the sake of illustration, the method is specified in terms of operations which are used with machines of the IBM 700 series. One well known machine of this series is the IBM 7090 which is described in IBM Form 223-6895-2 dated June, 1962, entitled IBM 7090 Data Processing System. The central constituent of the IBM machine is a memory unit, known as core storage, for the semipermanent storage of information in magnetic cores. The contents of core storage are gated into and out of various registers, which are used for the temporary storage.

One of the registers of the IBM machine, the address register, specifies the location in core storage of the current information item, whether it be an instruction or a data item. The address register is controlled in part by an instruction location counter. Address modification and auxiliary counting operations are performed with a set of index registers. Logical operations are performed by a so-called sense indicator register.

There are two registers in the IBM machine for arithmetic operations. The first is a so-called accumulator which operates in conjunction with an adder for registering the cumulative results of operations which yield the equivalent of addition and subtraction. The other arithmetic register is a so-called multiplier-quotient register which is used in conjunction with the accumulator to perform multiplication and division.

With such a machine, operational sequences are communicated through the medium of punched cards or their equivalent, such as magnetic tape. Typically, each card contains an "instruction" which includes an operation portion. A set of cards contains instructions which form a "program" and constitute a source deck.

In processing algebraic information in accordance with the invention, symbolic specification is made in terms of a source language which is translated into machine language by a compiler.

Figures 1A, 1B:
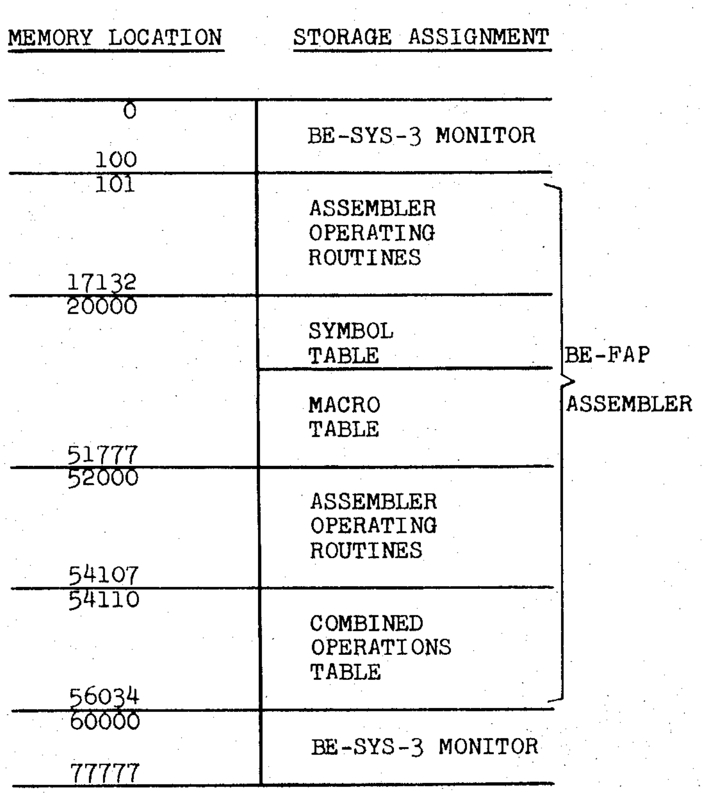
FIG. 1A is a listing of a representative main program in accordance with the invention.
FIG. 1B is a diagram of memory storage allocations during assembly.

The operations of FIG. 1A translated by the compiler include (1) the reservation of a block of storage for data at the time of assembly and the initialization of storage allocation at the time of execution; (2) the storage of polynomial format information; (3) the storage of polynomial information according to the format statement. This operation includes the designation of a set of storage locations which include the address of the polynomial, the address of the format statement and the number of terms in the polynomial statement. This operation also provides for the dynamic allocation of storage and the sorting of the polynomial terms into canonical form; (4) the performance of a designated polynomial operation, for example, the multiplication of two polynomials and (5) the extraction from storage of the results of step 4.

The compiler includes macrodefinitions. These allow the user to specify the ultimate operations of the machine in terms of his own choosing. For example, no existing information-processing machine includes a basic machine operation by which two polynomials can be added together. However, using the macro-operation, the user can specify such an operation, such as POLMPY, for Polynomial Multiply. In an elementary compiler, the macros essentially contain calls to subroutines and the calling sequence of those subroutines. In advanced versions, the compiler is used for such varied tasks as defining other macros and providing flexibility to the manipulation of polynomial quantities.

A representative specification of operations for the multiplication of two polynomials P and Q is set forth in FIG. 1A. The listing of FIG. 1A constitutes a "main program." Each line of the listing is composed of characters entered on one card of the source deck. For ease of reference the entries of FIG. 1A are numbered sequentially from 10–1 through 10–11.

As shown, disregarding the reference numbers which have been supplied for identification only, each line of FIG. 1A contains distinctive fields of contiguous characters, respectively designated from left to right as the location, operation and variable fields.

The operation field contains the symbolic counterpart of signals which, in the listing of FIG. 1A, are calls to macro instructions. POLBEG at reference No. 10–1 names the polynomial operations by which storage is allocated for the data to be processed. POLRDF at reference No. 10–2 names the operations for Reading the Polynomial Format Statement. POLRDD at reference Nos. 10–3 and 10–4 names the operations for reading the polynomials P and Q, respectively. POLMPY at reference No. 10–5 names the operations for multiplying two polynomials together. POLPRT at reference No. 10–6 names the operations for printing the resulting polynomial R.

The terminal entries FORMAT, P, Q and R, at reference Nos. 10–8 through 10–11 of FIG. 1A are in the location field of the listing. The first of these entries, symbolized by FORMAT, provides storage positions of the format statement read by POLRDF. It is preceded by reference No. 10–7 which explicitly specifies the number of format storage locations as being 20. The remaining entries P, Q and R have blank operation fields. They constitute pointers to data storage locations. Their operand, or variable, fields are supplied with pointer signals during data processing. Such signals are supplied at location P by POLRDD P, FORMAT; at location Q by POLRDD Q, FORMAT; and at location R by POLMPY, R, P, Q.

Initially, the main program of FIG. 1A is assembled to bring about the conversion of the various operation codes into various storage allocations and calling sequences which are discussed in greater detail subsequently.

In bringing about the first assembly, the memory of the machine is manually loaded with a system program which is used in loading other listings and in monitoring the progress of data processing. A suitable system program is BE-SYS-3, for Bell System Program, Version 3, which is available generally through the users' organization of IBM 700 machines known as SHARE. As shown in FIG. 1B, BE-SYS-3 occupies the first $100_8$ locations in memory as well as locations $60000_8$ through $77777_8$. The subscript 8 indicates that the companion numbers are to the base eight, or octal, according to the well-known convention for designating locations in a binary machine in terms of a power of 2. Octal numbers are commonly written without commas. The corresponding decimal locations are $64_{10}$ and $24{,}576_{10}$ through $32{,}767_{10}$.

This division of the system program into two sections stems from the desirability of having the loading section in the early portion of the memory while allowing the monitoring section to appear near the end of the memory.

Once the system program is loaded, it is used, in turn, to load the compiler and an assembly program, by which symbolic operation codes of the main program are translated into machine-code binary signals. A suitable assembly program is BE FAP which is in the widely used FAP, for Fortran Assembly Program, language. BE FAP is supplied as an adjunct to BE SYS 3. The name FORTRAN is of historical significance only.

The operational portion of the FAP assembler occupies octal locations 101 through 17132. In addition, the assembler includes three sets of tables. One of these is designated the combined operations table and contains the BCI counterparts along with the code signal forms of the basic machine operations. A second table, designated the macro table, is used in storing the definitional items of each macro-operation. A third table, designated the symbol table, is reserved for strings, known as symbols, of one or more nonoperational characters that appear in the main program listing. For example, in FIG. 1A, such strings are FORMAT R, P and Q in the location field. During assembly, the location counter is advanced one unit at a time for each machine instruction encountered, except in the case of storage allocation instructions. When a symbol is encountered, such as FORMAT R, P or Q, the binary-coded counterpart of that symbol is entered into the symbol table together with the value of the instruction counter at the point where the symbol was encountered.

In the initial assembly of the main program, a deck of cards containing the various macrodefinitions applicable to the listing of FIG. 1A and a further deck containing the information of the listing in FIG. 1A are applied to the machine. In addition, the decks are preceded by a FAP control card, which is used to initiate loading by the system program and also to call the FAP assembler. During assembly, the cards are read one at a time. The contents of the macrodefinitional cards of the compiler are entered into the macrotable of the assembler. When the cards corresponding with the program listing in FIG. 1A are encountered, their operation fields are seen to contain operation codes which do not represent standard FAP operations. However, when macros are entered into the macrotable, their names are added also so that a reference to the table for any particular macroname produces in turn a reference to the constituents of that macro. Where the operation code does not represent a macro, or is for some other reason not entered into the combined operations table, the assembler produces an error indication to that effect. The various macrodefinitions are subsequently treated by the assembler as if their constituent instructions had been originally included in the listing of the main program. The assembly requires two passes. During the first pass, the symbol table is formed and equivalents, indicated by the location counter, are assigned to the symbols. During the second pass, the symbols of the operand field are evaluated using the symbol table and the operation fields are converted to machine code using the combined operations table. At the conclusion of the second pass, the output tape contains the assembled main program.

Subsequently, the assembled main program is loaded into the machine, with the results shown in FIG. 1C, to bring about the desired data processing. As before, the machine includes the monitor program. However, the main program appears in place of the assembly program. In addition, the subroutines that are called by the main program are also entered into storage and bear the designation ALPAK, for Algebraic Package.

The first macrodefinition POLBEG of the compiler is set forth in FIG. 2A. This macro-operation serves two functions: it provides a calling sequence to the subroutine of FIG. 2B and, in addition, it establishes the data buffer shown in the machine storage map of FIG. 1C.

The signals corresponding to the operation fields of FIG. 2A are active only during assembly, and hence are called assembly operations. They draw upon machine operation subroutines which are a part of BEFAP.

The macro-operation at reference No. 20–1 causes the symbolic coding included between reference No. 20–2 and the END operation at reference No. 20–5 to be entered into the macrotable of the assembler (FIG. 1B). When the POLBEG macro is called during the assembly of the POLBEG instruction of FIG. 1A, the CALL assembly operation at reference No. 20–2 is translated into a calling sequence for the POLBEG subroutine taking the form shown in FIG. 2B. In addition, the CALL operation places the binary-coded informational counterpart of the subroutine name at the head of the assembled main program in a so-called "transfer vector" as shown in FIG. 1C and with an effect discussed subsequently.

The COMMON assembly operation at reference No. 20–3 of FIG. 2A reserves a section of the machine memory known as common storage. This storage is established with respect to the last available location of machine memory. As shown in FIG. 1C the common storage begins at location $57777_8$ before the block of memory assigned to the monitor program, beginning at location $60000_8$. The designated memory allocation in the common portion of machine memory is made by adjusting the location counter assigned for this purpose. As seen from FIG. 1C, the memory storage allocations can be made downward with reference to the beginning of storage at location 101, or upward with reference to the end of storage at location 60000. Two so-called location counters, which are specified memory locations within the monitor program, are used for this purpose.

The COMMON assembly operation alters the stored contents of the location assigned to the common counter by the size of the argument in the operand field, which for the listing of FIG. 2A is given as SIZE–1. However, the argument used during assembly is an absolute expression, i.e., a number which indicates the amount of storage being allocated to the data buffer. Initially, the common "counter" contains the signals representing the number $57777_8$. If SIZE is 1,000 decimal, the octal counterpart of SIZE–1 is 1,747, so that the COMMON operation at reference No. 20–3 changes the common counter from 57777 to 56030.

The next COMMON operation at reference No. 20–4 of FIG. 2A reduces the common counter by one to 56027. The symbol CR1 in the location field of reference No. 20–4 is "-created" during the assembly of the POLBEG macro. It is assigned a regular storage allocation during the assembly of the main program.

Figures 1, 1C:
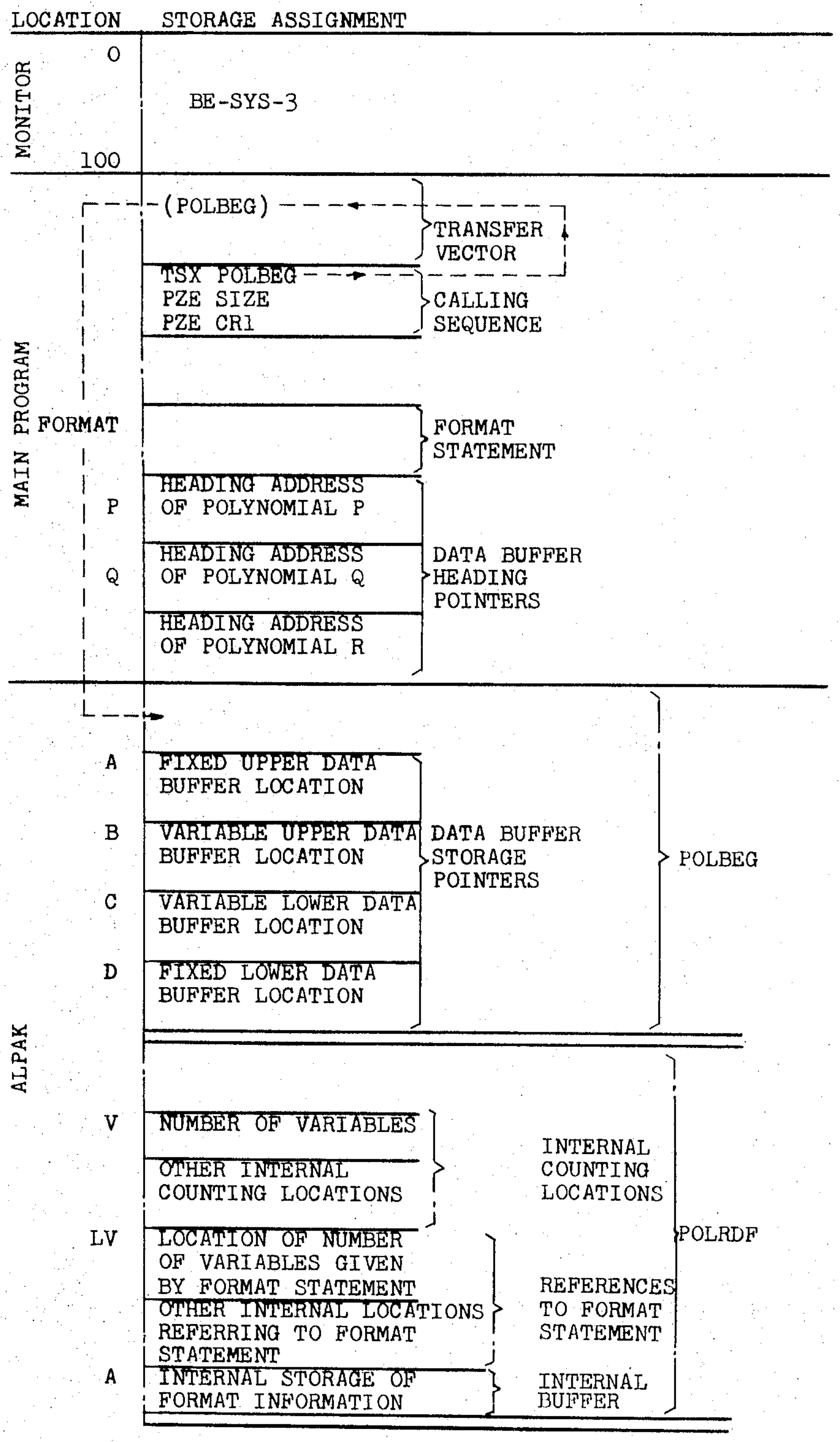
FIGS. 1C-1 through 1C-3 are diagrams of memory storage allocations during execution.

At the time the main program is executed, the POLBEG instruction of FIG. 1A, as assembled according to FIG. 2B, produces a transfer to the POLBEG subroutine of FIG. 2C, as indicated by the arrows in FIG. 1C. This is accomplished through the instruction at reference No. 21–1 of the calling sequence, TSX, for Transfer and Set the designated index register IR. When the assembled main program is loaded into the machine, the binary-coded representation of the subroutine name in the transfer vector is replaced by the loading location of the corresponding subroutine. Thus, at execution time, the TSX command in the main program produces a transfer to the transfer vector location which, in turn, produces a transfer to the first instruction of the associated subroutine, as indicated by the arrows in FIG. 1C.

The other instructions at reference Nos. 21–2 and 21–3 in the calling sequence of FIG. 2B supply arguments to the POLBEG subroutine in the manner discussed subsequently. The command PZE for Plus Zero is represented, in its operation, by signals which do not produce a decoder output. Consequently, the signals in its address portion can be used to store information for the subroutine.

In addition to indicating a transfer to the subroutine, the TSX instruction of the calling sequence provides for storing signals indicating the 2's complement of the present setting of the instruction location counter in the specified index register IR. In the IBM 7090 this index register is typically the fourth. When the stored contents of IR 4 are supplemented by one plus the length of the calling sequence, the register indicates the position of the main program to which a return is to be made upon completion of the subroutine.

As for the POLBEG subroutine of FIG. 2C, its first instruction at reference No. 22–1 causes the machine signals representing the beginning location of the data buffer to be entered into the accumulator. This is brought about through the effect of operand field 2, 4. The instruction CLA, for Clear and Add, causes the accumulator to be set to zero, followed by signals from the memory location indicated by the first subfield of the operand field as modified by the contents of index register No. 4. The net result is that the contents of the memory location associated with reference No. 21–3 of the assembled calling sequence of FIG. 2B are entered into the accumulator. This is the beginning location of the data buffer. The instruction at reference No. 22–2 next causes the beginning location of the data buffer to be stored at the internal memory location A at reference No. 22–8 of the POLBEG subroutine, as shown in FIG. 1C. The A location contains a so-called pointer to the beginning point of the data buffer. In addition, there is a B pointer which initially contains the same designation as the A pointer but is adjusted downward, i.e., increasing in size as the data buffer is occupied.

The next task of the POLBEG subroutine is to indicate the terminal position of the data buffer. This is done by the instruction at reference No. 22–4 of FIG. 2C by which the second item of the calling sequence is added to the beginning location of the data buffer. The terminal location of the data buffer is stored at internal locations C and D of reference Nos. 22–10 and 22–11 by the instructions at reference Nos. 22–5 and 22–6. As with the A and B pointers, the C and D pointers are initially at the same position. During processing, the C pointer is moved upwards, i.e., decreasing in size. The final instruction of the POLBEG subroutine at reference No. 22–7 causes a return to the main program.

The second command of FIG. 1A, POLRDF, produces a call to an associated subroutine, by the macro set forth in FIG. 3A, in a fashion similar to that of the POLBEG command considered earlier. The processing operations accomplished by the POLRDF subroutine are summarized in the flow chart of FIG. 3B. The reference numbers included in the flow chart identify the detailed coding of the subroutine included in Appendix I.

The detailed coding of Appendix I is in two sections. The right-hand section forms a listing similar to those of FIGS. 1A and 2A through 2C. The left-hand section represents the actual machine signals corresponding to the coding of the right-hand section.

In essence the POLRDF subroutine transfers input format information to the region of the memory assigned to the format statement of the main program as shown in FIG. 1C. In addition, the input format information generates mask signals which are used in polynomial multiplication to prevent exponent overflow in a manner considered subsequently.

As applied at the input the format information is an alternating sequence of variable names and field widths separated by commas. In the case of polynomial information with three variables X, Y and Z, a representative sequence is

X,6,Y,12,Z,18 in which the field width integer following each variable name is translatable into the maximum exponent size of the associated variable. For example, in a binary machine, the field number 6, following the variable X indicates that the exponent of the variable X cannot exceed 63 or $2^6-1$ bits per machine word. The sum of the field widths indicating exponent sizes is 36 which is the same as the number of bits in each word of the IBM machine used in the illustrative processing, so that only a single exponent word of machine storage is required. However, there is no restriction on the number of exponent words and more than one such word can be specified in the format statement and generated from it.

Although in the particular example being considered each variable name consists of but a single alphabetical character, it is to be understood that the variables may be specified by strings of characters. In the case of the IBM 7090 computer operated in conjunction with the BEFAP assembler each variable name may consist of a string of up to six characters.

Figure 3B:
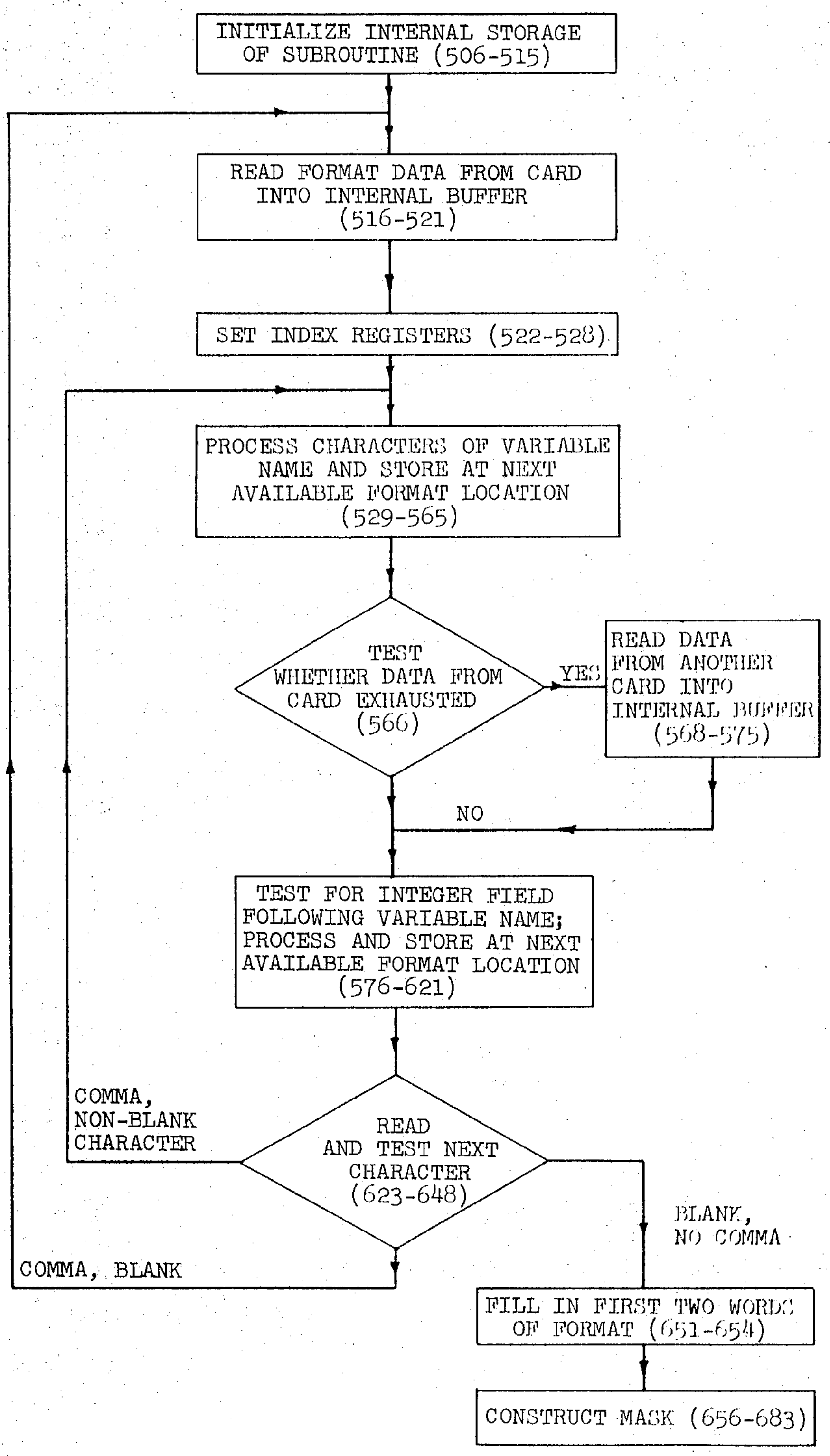
FIG. 3B is a flow chart for the subroutine corresponding to the second instruction of FIG. 1A.

Returning to the flow chart of FIG. 3B, the enclosures of that figure summarize the results of the individual operations shown in the detailed listing of Appendix I. The boxes are of two kinds: Rectangular, indicating collections of operations and diamond, indicating decisional processes. It is to be understood that a decisional process may be included among a collection of operations.

The first set of operations (506–515) summarized by the flow chart of FIG. 3B initializes internal storage locations of the POLRDF subroutine. The initialized locations, selectively represented in FIG. 1C, fall into one of two categories. They are either internal "counting" locations or they identify locations of the format statement. For example, the location designated V is used to count the number of variables that have been processed. On the other hand, the location designated LV makes reference to the second word format statement, which contains the maximum number of variables in a polynomial. (693–695 and 699–706).

In addition to the counting and format locations, the internal storage locations include an internal data buffer which constitutes a block for temporarily holding the format information as it is read. The only requirement on the internal data buffer is that it be large enough to contain all the information read from each card. (697–698).

Once the subroutine is initialized, the binary-coded data contained on the card is read into the internal buffer. (516–521). The reading takes place through the use of a standard system subroutine.

Next, three index registers are initialized to monitor the completion of the format statement. (522–528). The first index register, known as IR1, is used to indicate the next word that is to be extracted from the internal data buffer. It is initially set to the beginning location A of the internal buffer and is incremented each time that a word is extracted. The second index register, known as IR2, gives the number of characters remaining in each word extracted from the internal data buffer and is, in the case of the IBM 7090, initially set with the count of six. The third index register, IR4, gives a count of characters in the name of each variable. At the beginning of processing, the count is one and increases by one each time a new character constituent of a variable name is encountered.

After the index registers are set, the first word from the internal data buffer is entered into the multiplier-quotient register and a first six-bit character is shifted into the accumulator. (529–533). Additional characters enter the accumulator until the variable name is complete. Following testing, the signals of the variable name are stored at the appropriate format address. (529–565).

If the variable name occupies the entire internal data buffer, it is necessary to replenish the buffer by reading data from another card (566–575). In any case, because of the way in which the format statement is constituted, a number indicating the number of bits in the variable should follow it. Initially a test is made to verify that the next character is an integer, followed by a test to determine the number of integers constituting the exponent size. (576–580 and 595). For the example under consideration the exponent size is limited to two integers. Consequently the integer-processing routines provide for multiplying the first integer by 10 (583–587). If there is a second integer, it is added to 10 times the product of the first and stored in the format statement; otherwise the first digit alone is stored. (598–599 and 606–608).

The next character following an exponent length indication may be a blank, in which case the format information from the input has been completed. Otherwise a return is made to the beginning of the character processing routine and the earlier procedure repeated until a blank is encountered following a number field in the format information. (623–648).

By the time a terminal blank is encountered, the format statement contains alternate entries giving the binary-coded counterparts of the variable names as shown in FIG. 3D. For the example under consideration the variables are represented as $$X=67_8=110111_2$$
$$Y=70_8=111000_2$$
$$Z=71_8=111001_2.$$

Following each variable name is an indication of the maximum number of bits permitted in the associated exponent which, for the example, is $$B_1=B_X=18_{10}=22_8$$
$$B_2=B_Y=12_{10}=14_8$$
$$B_3=B_Z=6_{10}=6_8.$$

Once a terminal blank is encountered, the first two words of the format statement are filled in to specify the number of exponent words and the number of variables. (656–683). For the example under consideration the number of exponent words is unity and the number of variables is three, which information is entered into the first two words of the format accordingly as shown in FIG. 3D.

Figure 3C:
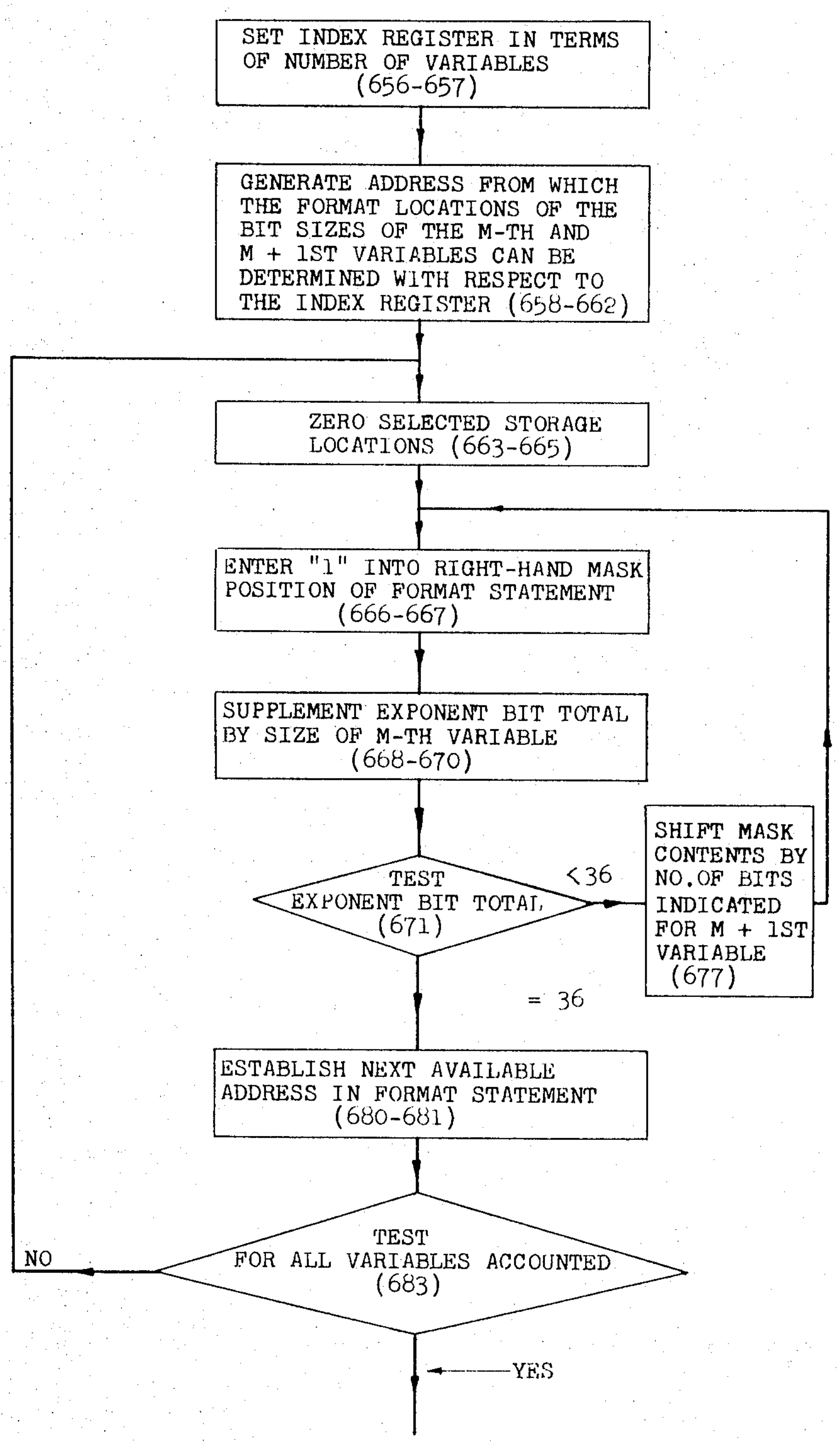
FIG. 3C is a flow chart expansion of the last set of operations included in the flow chart of FIG. 3B.

The final task of the POLRDF subroutine is to generate the format mask. In effect the mask is constituted by placing "1" bits to demark the exponent subwords. Thus, in the example under consideration, the number of bits assigned to the variables $X$, $Y$, $Z$ are 18, 12, 6, respectively, and a "1" bit is placed at the 18th, 30th, and 36th bit positions accordingly to form the mask word 000001000101 shown at the end of the format statement of FIG. 3D. A detailed flow chart for the construction of the mask is given in FIG. 3C.

The construction of the mask begins by setting IR1 (Index Register 1) with an indication of double the number of variables included in the format statement. (656–657). Next, addresses are generated from which the format locations in FIG. 3D of the bit sizes for the M-th and the M+1st variables can be determined with respect to the index register. (658–662). In the example being considered, the generated addresses are respectively the mask address +1 and the mask address +3. The mask address is, in turn, equal to the format address + double the number of variables +2. Thus the locations given by the generated addresses with respect to the initial contents of the index register are the respective locations of the bit sizes $B_1$ and $B_2$ for the first and second variables.

After the mask location of the format statement has been zeroed, as well as an internal location NB for totaling the exponent bits, a "1" is entered into the right-hand mask position of the format statement. (663–667). The bit size of the M-th variable is added to the total at location NB. (668–670). If the total is less than 36, the mask is incomplete and the right-hand "1" is shifted to the left according to the number of bits indicated for the M+1st variable. (671–677). The contents of the index register are next decremented and the foregoing procedure is repeated, beginning with the entry of the right-hand "1" into the mask. (678).

If the bit total is 36 and the mask is incomplete, additional mask words are constructed using the foregoing procedure beginning with the zeroing of the mask and the NB storage locations. (680–683).

Following the POLRDF command of FIG. 1A is the first of two POLRDD commands. As with the POLRDF command, each POLRDD command is assembled from a macrosequence to produce a call to an associated subroutine. FIG. 4A shows the macrosequence for the polynomial P with two arguments P and FORMAT, represented by information signals correspondingly designated "storage" locations in FIG. 1C. The contents of storage location P indicate the beginning buffer storage position of the heading for the associated polynomial P. Similarly, location Q indicates the beginning of the heading for polynomial Q. Storage location FORMAT marks the beginning of the format statement.

Figures 1, 4B:
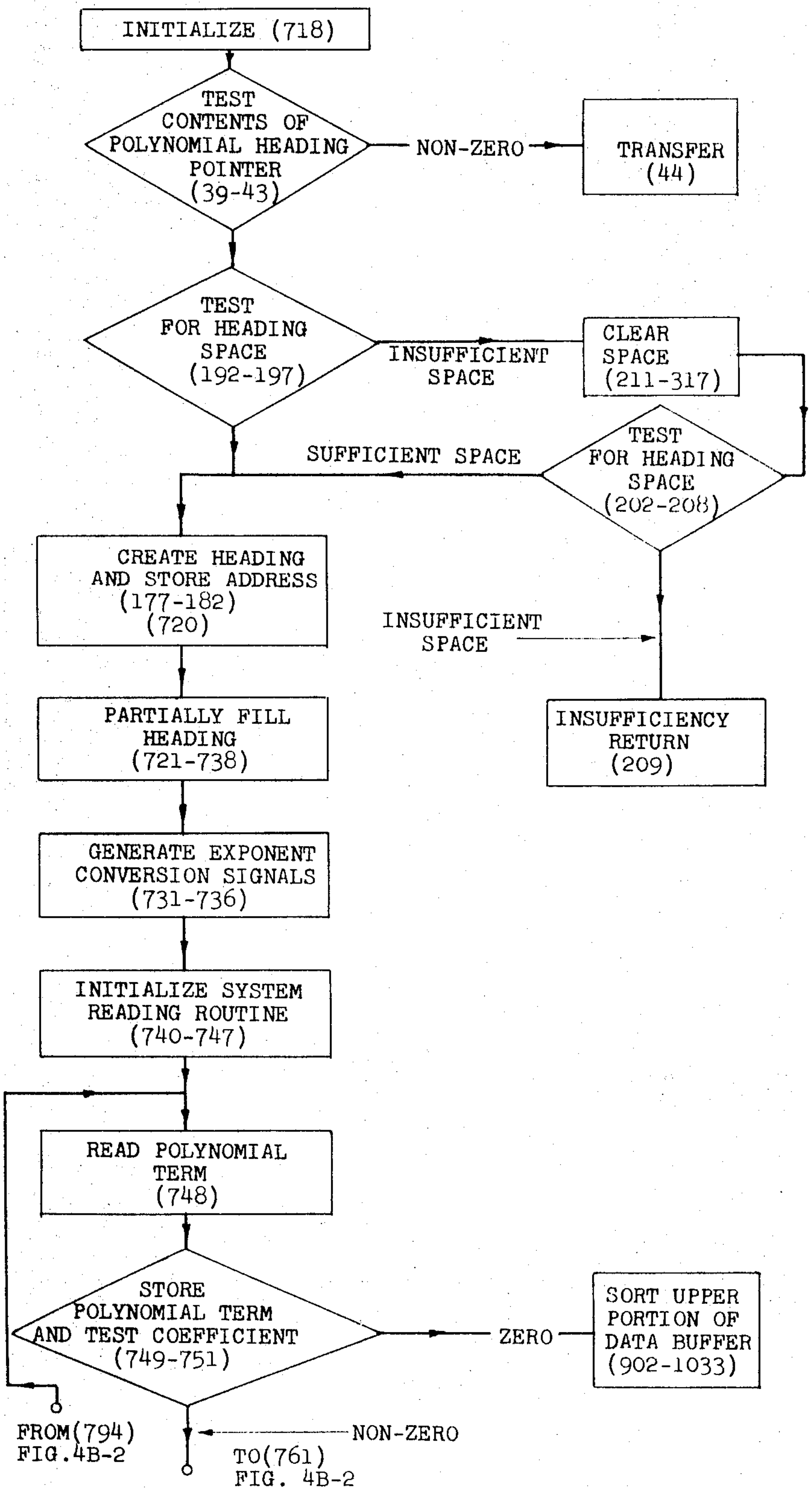
Figures 2, 4B:
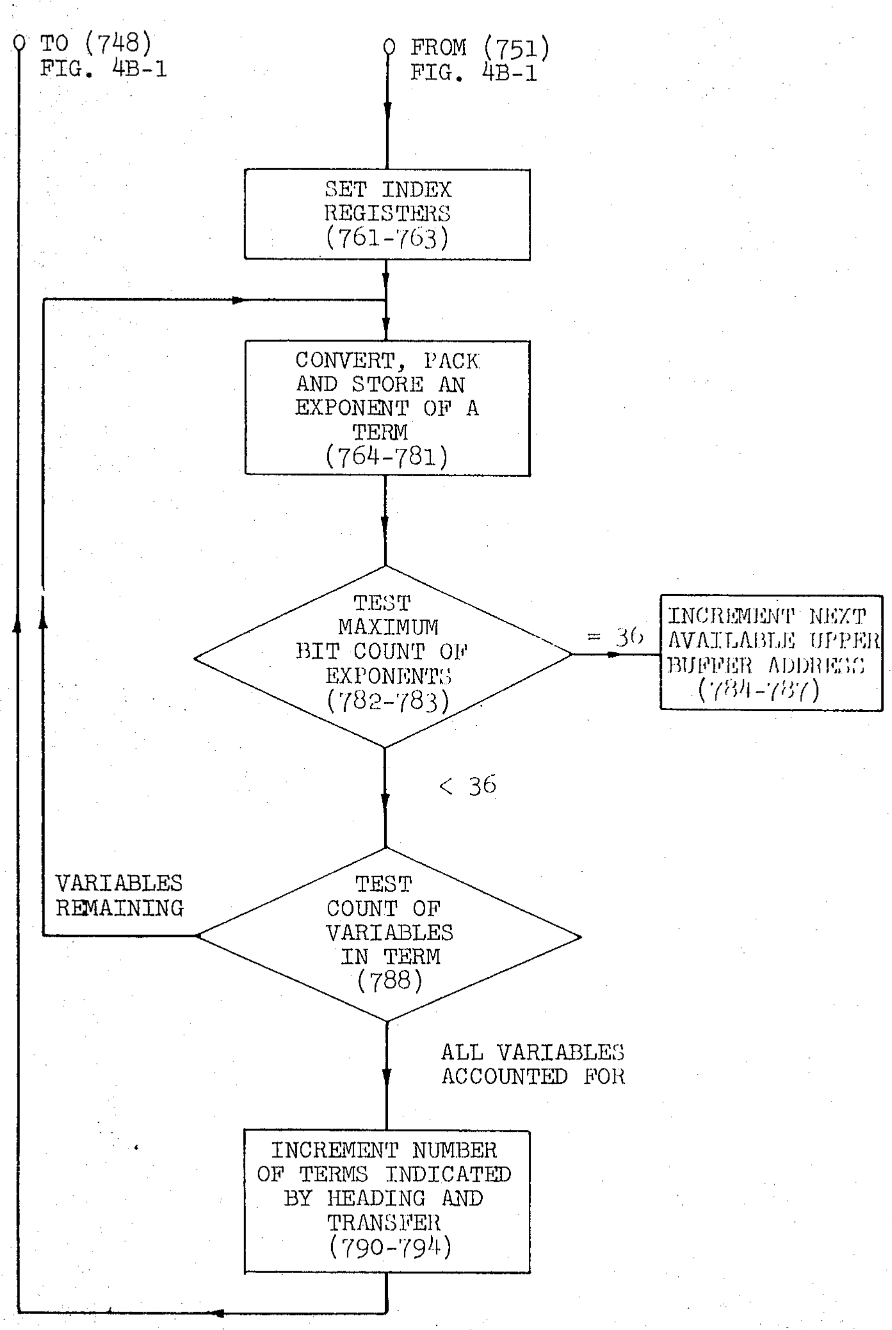

The processing operations accomplished by the POLRDD subroutine are summarized in the flow chart of FIG. 4B. As before, the reference numbers included in parentheses refer to the detailed coding included in Appendix I.

For each polynomial, the POLRDD routine (1) allocates storage for a heading in the lower portion of the data buffer, (2) fills the heading with signals which, inter alia, designate a location in the upper portion of the data buffer and (3) enters coefficient and exponent signals in the upper portion of the data buffer beginning at the designated location.

Figure 4C:
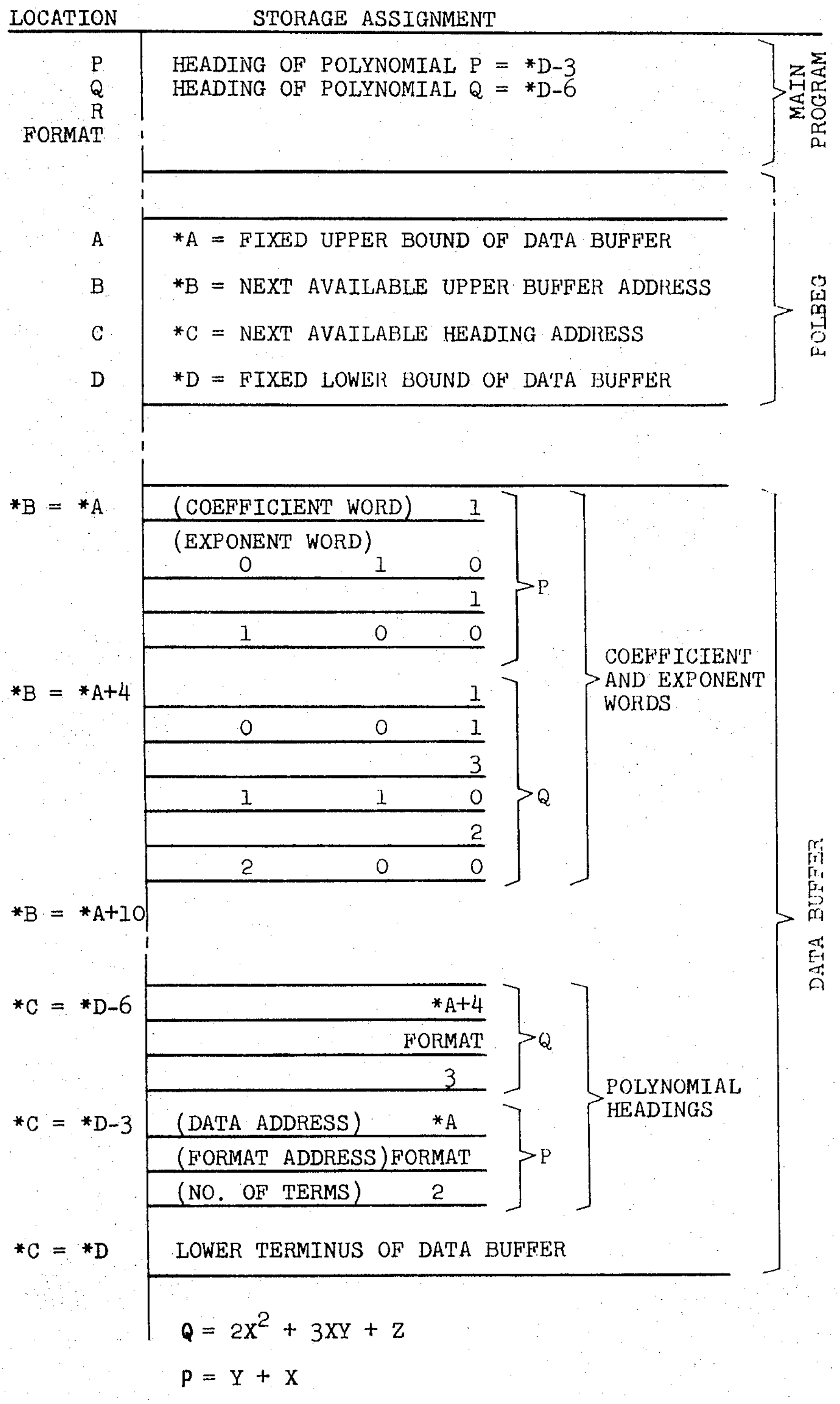
FIG. 4C is a diagram of memory storage allocated in the vicinity of the stored main program, the stored subroutine of FIG. 2C, and the data buffer of FIG. 1C, showing assignments made by the subroutine of FIG. 4B.

Allocation of heading storage is made by updating the heading address at the internal location C of the POLBEG subroutine shown in FIGS. 1C and 4C. The contents of the internal location C are designated *C, and refer to locations in the data buffer as shown in FIG. 4C. Initially, the internal location C indicates the lower bound of the data buffer, i.e., $*C=*D$. The updating depends on the number of words assigned to each heading.

In the example under consideration, each heading includes (1) the beginning address of the associated coefficient and exponent signals (2) the format address of the polynomial and (3) the number of terms in the polynomial.

Once the heading has been filled, coefficient and exponent signals are read and packed according to the format statement, beginning at the buffer storage location $*B$ given by the internal storage location $B$ of the POLBEG subroutine. Initially the internal location $B$ specifies the upper bound of the data buffer as the beginning point for the storage of coefficient and exponent signals, i.e., $*B=*A$.

In the example under consideration, the polynomial P consists of three terms with one coefficient word and one exponent word per term. In general there will be more than one exponent word per term, depending upon exponent size.

More specifically, with reference to the flow chart of FIG. 4B, the POLRDD routine begins by zeroing an internal subroutine storage location HA, for Heading Address shown in FIG. 1C. (718).

This is followed by a test of the contents of location P of FIG. 1C. (39–43). The test is generated as a result of the assembly of a POLHDA macro, for Polynomial Heading Address. (719).

If the contents of location P are nonzero, a transfer is made which is of no consequence to the present processing. (44). If the contents are zero, a further test is made to determine if there is available space for the heading in the data buffer. (192–197). This is accomplished by a transfer within the POLHDA macro to a RFNCRH routine, for Rational Function Created Heading (171 and 47). The RFNCRH routine, in turn, contains a call (176) to a POLBSS macro (27–36) for Polynomial Buffer Storage Search, which contains a transfer (28) to POLBSS subroutine. (192–197). The latter does the actual test of the data buffer to determine if there is sufficient space.

In determining if there is sufficient space, the POLBSS routine provides for subtracting the contents of location $C$ from the contents of location $B$, in FIG. 1C, (192–195). If the result is negative or zero, adequate space is indicated and a return is made to the RFNCRH subroutine. (196–197 and 177). Initially the data buffer is empty so that a return is assured. A similar condition prevails when the data buffer is only partly occupied. After extensive processing, however, the buffer space indicated as available may become inadequate, in which case an attempt is made to clear space by a subroutine which is considered subsequently. (211–317). Upon return from the clearing subroutine a further test is made for heading space. (202–209). If insufficient space is indicated, there is a return to that effect to the calling sequence of the POLBSS subroutine. (32).

When there is sufficient space in the data buffer, a heading is created and its address stored in the reference location of FIG. 1C reserved for the polynomial P. This is accomplished by the RFNCRH subroutine which, in addition, updates the contents of location $C$ containing the last available heading address. (177–182). The heading address thus established is stored for later reference at the internal location HA of the POLRDD subroutine as shown in FIG. 1C. (720).

Next, the heading is filled with three items of information, as shown in FIG. 4C. The uppermost word of the heading contains the next available address in the upper portion of the data buffer, given by the contents of internal storage location $B$ of the POLBEG subroutine. (721–723). This word indicates the beginning position for the entry of coefficient and exponent signals associated with the polynomial under consideration. The second word of the heading is filled with the format address of the polynomial. (724–725). The format address designates the beginning position of the format statement shown in the main program portion of FIG. 1C.

The third word of the heading is reserved for the number of terms in the polynomial. The information to be entered here is accumulated during the processing of the POLRDD subroutine. For this purpose the subroutine contains an internal counting location W, shown in the POLRDD section of FIG. 1C, which is initially set to 1. (727–730).

The POLRDD subroutine also generates reference signals which are used in converting exponent signals according to the stored format statement of FIG. 3D. For the format statement shown there, each variable name is followed by an indication of the maximum number of bits contained in the associated exponent. Consequently the number of bits in a particular variable can be determined with respect to a reference parameter which is double the number of variables in the polynomial. For this purpose an indication of double the number of variables is obtained from the second word of the format statement by a single bit shift of the word contained there and the resultant is stored at internal location 2V of the POLRDD subroutine. (731–733). In addition, the conversion of exponent signals is expedited by a reference to the lowermost, or mask location of the format statement of FIG. 3D. The latter is stored at internal location BIT. (734–736).

The next operation is to read an input card containing information about the polynomial P. In the present embodiment there is a separate card for each term, which is in the form of a coefficient followed by a blank, followed by comma-delimited numbers, indicating the values of the exponents assigned to the successive variables. For example, if the polynomial P is $X+Y$ and the polynomial Q is $2X^2+3XY+Z$, the manipulation of this polynomial information requires at least three variables so that in accordance with the invention, the polynomials are represented $$P=1X^0Y^1Z^0+1X^1Y^0Z^0$$
$$Q=2X^2Y^0Z^0+3XYZ^0+X^0Y^0Z^1$$

which respectively appear on successive data cards as

```
      1  0,1,0
      1  1,0,0
            0
and   2  2,0,0
      3  1,1,0
      1  0,0,1
            0
```

with the terminal zero of each set marking the end of the preceding polynomial.

The reading of a card begins with the initialization of a system subroutine, after which the information contained in the first card is entered into the multiplier-quotient register.

(740–748). The first word is a coefficient which is stored at the internal subroutine storage location COEFF of FIG. 1C. (749). The coefficient is next tested to determine whether it is zero, indicating the end of the term, in which case a transfer takes place to the POLCFM operational sequence, discussed in more detail subsequently. (750–751). If the coefficient is nonzero, the POLBSS routine is called to determine if there is sufficient space. (752). If sufficient space is indicated, the coefficient is stored at the location specified by the B pointer. (753–758).

In the example under consideration, the coefficient of the first term is unity, which is entered, as shown in FIG. 4C at the location $*A$ given by the first word of the heading address, which is itself at location $*C=*D-3$.

After the coefficient is entered, preparation is made for entering one or more exponent words. This entails setting the three index registers used in the POLRDF routine to count variables, bits and words. (761–763).

Exponent information is read into the multiplier-quotient register, after which it is stored at the internal location EXP, for Exponent. (764–765). The number of bits in an exponent word is obtained from the format statement of FIG. 3D and stored at various locations of the processing sequence. (766–770). A "1" is set in the accumulator and shifted according to the number of bits indicated for the variable under consideration. (771–772). Thus shifted, the contents of the accumulator are used to test the internal location EXP to verify that no overflow has taken place in which case the exponent word is stored at the next available location in the upper portion of the data buffer. (773–780).

As long as the count of the maximum number of bits in the exponents that have been stored is less than 36, the foregoing procedure is repeated for succeeding variables. (782–783 and 788). When the bit count attains 36, the next available location in the upper portion of the data buffer is incremented and the earlier procedure repeated.

In the present example, the exponent information of the first term of polynomial $P$ is 0,1,0. This information is packed into a single exponent word at location $*A+1$ of FIG. 4C.

When all of the exponent words of a term have been stored in the data buffer the data buffer location containing the number of terms is incremented and the foregoing procedure is repeated until all of the coefficients and exponents associated with a polynomial expression have been entered into the data buffer. (790–794). At that time a terminal zero is encountered and the POLCFM, for Polynomial Canonical Form, subroutine, is called into operation. (751).

The POLCFM subroutine inspects the exponent signals stored in the upper portion of the data buffer. If the polynomial is in canonical form, the exponents are in lexicographic order, in which each exponent word is ordered according to its numerical value. Continuing the earlier example, of the polynomial $P$, the exponent words are 0.1.0 and 1,0,0. Taken without the delimiting commas, the exponent words can be treated as the numbers 010 and 100 respectively. Thus they are initially in the lexicographic order prescribed by the invention. However, the exponent words in the upper portion of the data buffer for the three term polynomial $Q$ are in the order 2,0,0
1,1,0
0,0,1 and are, hence, in a descending sequence instead of the desired ascending sequence.

Figures 1, 4D:
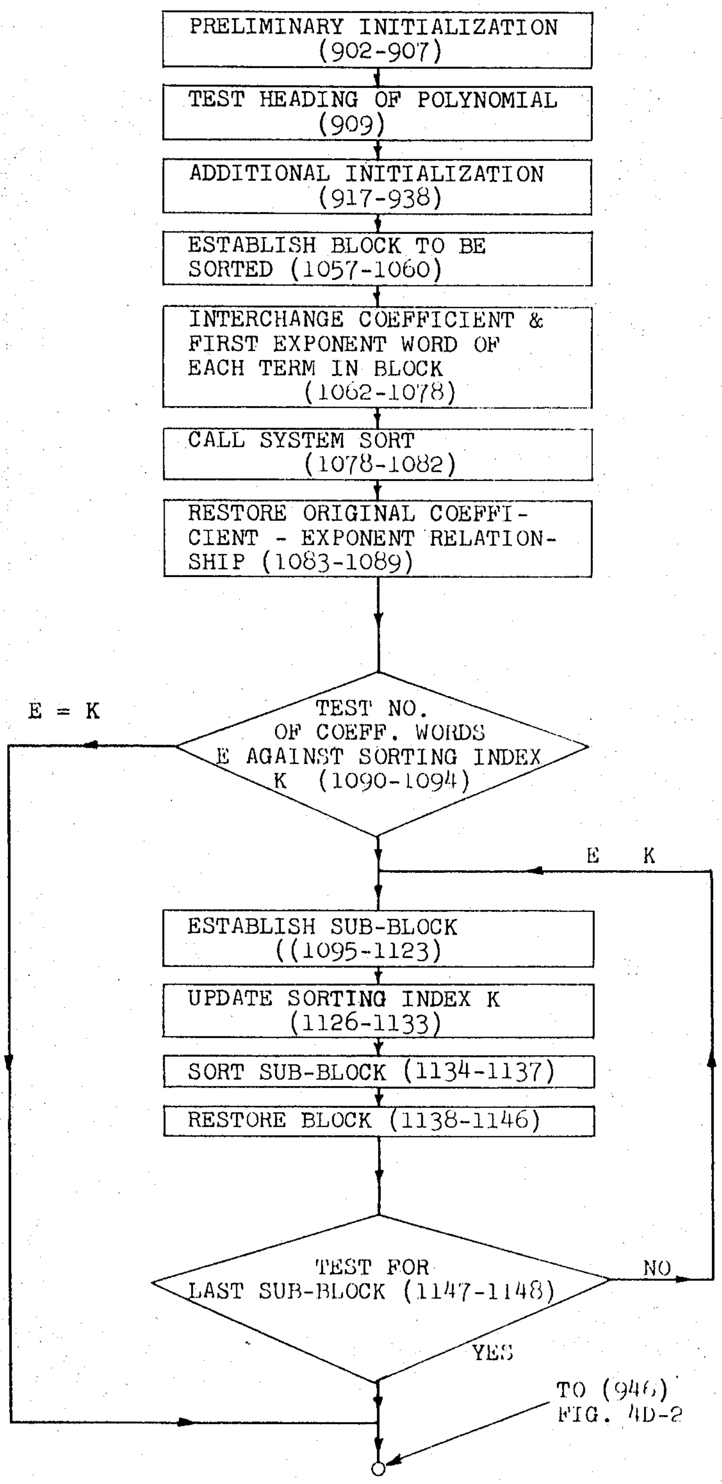

The exponent words of the polynomial $Q$ are reordered by the operations summarized in the POLCFM flow chart of FIG. 4D. As a result they ultimately appear in the data buffer in the order shown in FIG. 4C.

The POLCFM subroutine is initialized by storing the heading address of the polynomial at an internal subroutine storage location and by deriving arguments for the subroutine which indicate (1) the polynomial data address in the upper portion of the data buffer and (2) the number of terms in the polynomial. (902–907).

Next the heading is tested to determine whether it applies to a polynomial or to a constant. (909). The actual test is accomplished by a transfer to an RFNHDT subroutine, for Rational Function Heading Test. (832–848). In the case of a constant, the first word of the heading contains a code number 5, and the second word contains the value of the constant. If the first word of the heading is zero, an idle heading is indicated. Other code numbers are assigned to signify various classes of polynomial functions.

Once the heading has been tested, additional initialization is made of internal subroutine storage locations for indicating the number of terms in the polynomial, the number of words per term, and the number of exponent words. (917–920). If the number of terms is one or zero, reordering is unnecessary, and a transfer is indicated. (922–925) Otherwise the polynomial contains more than one term and various internal locations of the subroutine are set with the number of exponent words per term. (928–938).

This is followed by the establishment of a sorting index $k$ which is initially set to 1. (940–941). The sorting index is necessary since the number of exponent words per term may exceed unity, in which case sorting begins on a block basis and then proceeds to a subblock basis.

The actual sorting takes place by a transfer to a SORT subroutine (942). The latter establishes the block to be sorted, which initially is taken as the entire polynomial information. (1057–1060). Since coefficient signals precede the exponent signals in the data buffer, the two are interchanged, and sorting takes place with a standard system sorting routine, following which the original coefficient-exponent relationship is restored. (1062–1089).

After the first block has been sorted, the number of coefficient words E is tested against the sorting index $k$. (1090–1094). If the number of coefficient words exceeds the sorting index, it is necessary to sort on a subblock basis until the last subblock has been sorted. (1095–1148).

When the sorting operation is completed, terms with like sets of exponent signals are combined and consolidated by a return to the main POLCFM subroutine. The terms are compared on the basis of indices I and J which are set in respective index registers. (946–961). The exponent of term I is compared with the exponent of term J. (980–984). Initially, the indices I and J refer to the same term. If the exponents are equal, term I is combined with term J. (1005–1009) If the resulting term is nonzero the index I is incremented and the earlier procedure repeated; if it is zero, the index J is decremented and the earlier procedure repeated. (1010–1012)

If the compared terms are unequal, the index J is incremented. (989). If there had been an earlier finding of equality, term I is moved to the position of term J. (990–998). After all terms have been tested, the parameter N, indicating the number of terms, is adjusted if there had been an earlier finding of equality. (999 and 1015–1028). When the terms of the two polynomials have been consolidated, a final test is made to determine if the resulting polynomial is a constant. (1031–1033).

Once signals representing polynomials $P$ and $Q$ have been entered into the data buffer, the machine is ready to undertake polynomial multiplication in accordance with the POLMPY operation of FIG. 1A.

Figures 2, 4D, 5A:
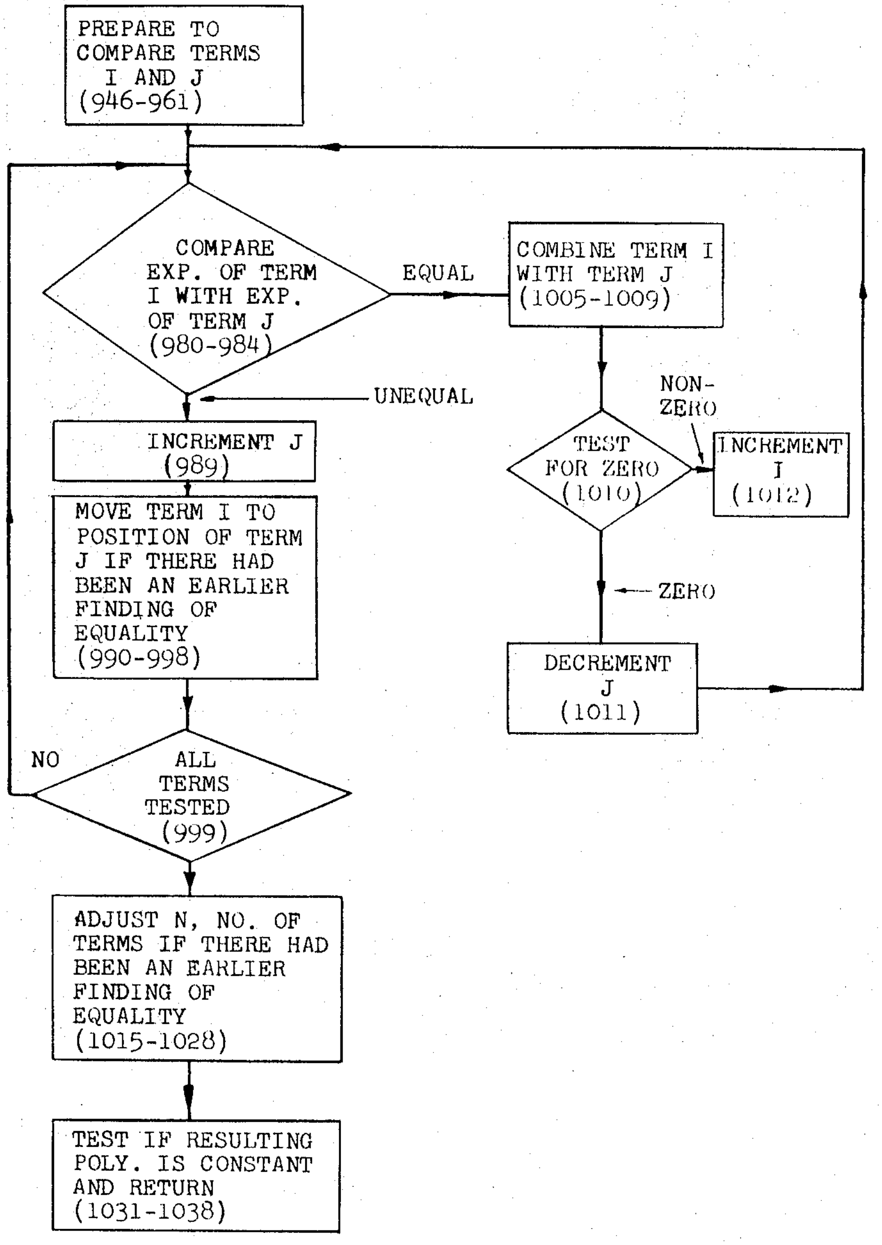

As with the other operations specified in FIG. 1A, the command POLMPY constitutes a macrocall, shown in FIG. 5A, to a subroutine of the same name. The subroutine has three arguments $R$, $P$ and $Q$, of which $P$ and $Q$ represent the polynomials to be multiplied and $R$ represents the resulting product. In the execution of POLMPY, the longer of two polynomials is multiplied by each term of the shorter, using POLOMP, for Polynomial One Term Multiply, to produce partial products. The resulting partial products are then accumulated using POLADD, for Polynomial Add.

Assuming that polynomial $P$ has $np$ terms and that polynomial $Q$ has $nq$ terms, with $np \leq nq$, a "leapfrog" method is used if there is sufficient space available in the data buffer. This method allocates $np+1$ blocks, each of length $nq$.

The first partial product is placed in the NP-th block and the second partial product is placed in the NP+1st block. At this point a transfer is made to the POLADD subroutine to produce a partial sum at the beginning of the NP−1st block. The next partial product is placed in the NP+1st block, and the next partial sum is started at the beginning of the NP−2nd block. The foregoing procedure is repeated until the final result appears at the beginning of the first block.

If the I-th partial product is $T_i=P_i \cdot Q$ and the I-th partial sum is $$PS_i=\sum_{j=0}^{i} T_j;$$

Then the final result which begins at the first reserved block and extends no further than NP blocks is $$PS_{np}=\sum_{j=1}^{np} T_j$$

Figure 5B:
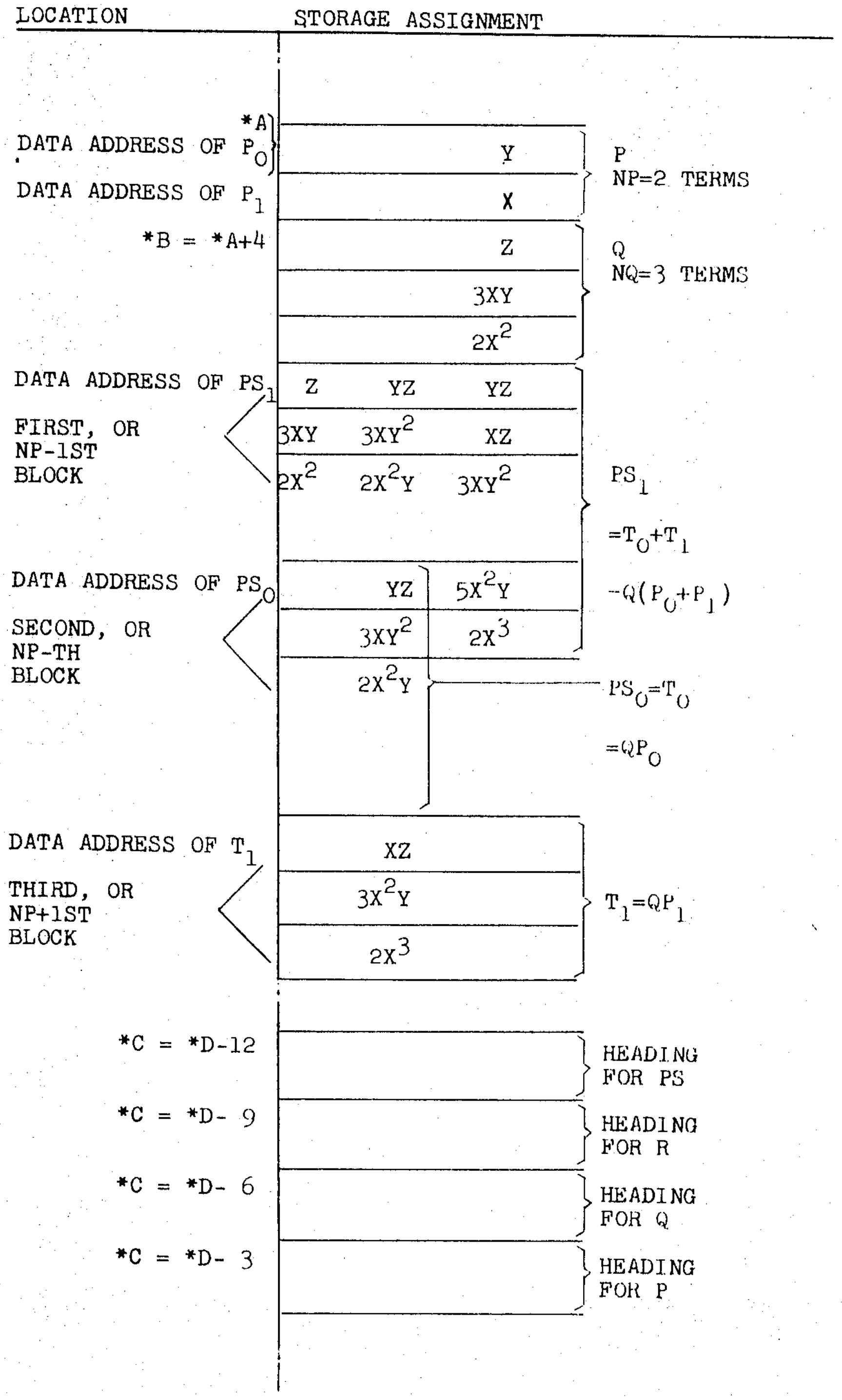
FIG. 5B is a diagram of data buffer storage illustrating "leapfrog" polynomial multiplication.

The foregoing technique is illustrated in FIG. 5B for the example under consideration. The polynomial $P$ is stored in the upper portion of the data buffer as a sequence of two terms $Y$ and $X$, it being understood that this is a shorthand notation for the actual storage shown in FIG. 4D for which two data words are required, for each term.

Since the polynomials $P$ and $Q$ have two and three terms, respectively, the previously considered inequality between NP and NQ is satisfied. Where the inequality is not satisfied, the polynomial headings are interchanged.

For the polynomials being considered, reservation is made in storage of three blocks of three terms each. The first, or zero order, partial product is given by multiplying the polynomial Q by the first or zero order term of $P$, $P_0=Y$, with the result that $P_0Q=YZ+3XY^2+2X^2Y$ which is entered into the NP-th or second reserved block of the data buffer. The zero order partial product $T_0$ is also the zero order partial sum $PS_0$. The partial product of the polynomial $Q$ multiplied by the second or first order term of $P$, $P_1=X$, gives the result $P_1Q=XZ+3X^2Y+2X^3$ which is entered into the NP+1st or third reserved block of the buffer.

Next the partial products are combined into a partial sum $PS_1=P_0Q+P_1Q=YZ+XZ+3XY^2+5X^2Y+2X^3$ which is placed at the beginning of the NP-1st block and partially overwrites the NP-th block. Since NP has been taken as 2, the partial sum $PS_1$ is the final sum and commences at the head of the first reserved block.

Figures 1, 1C, 2:
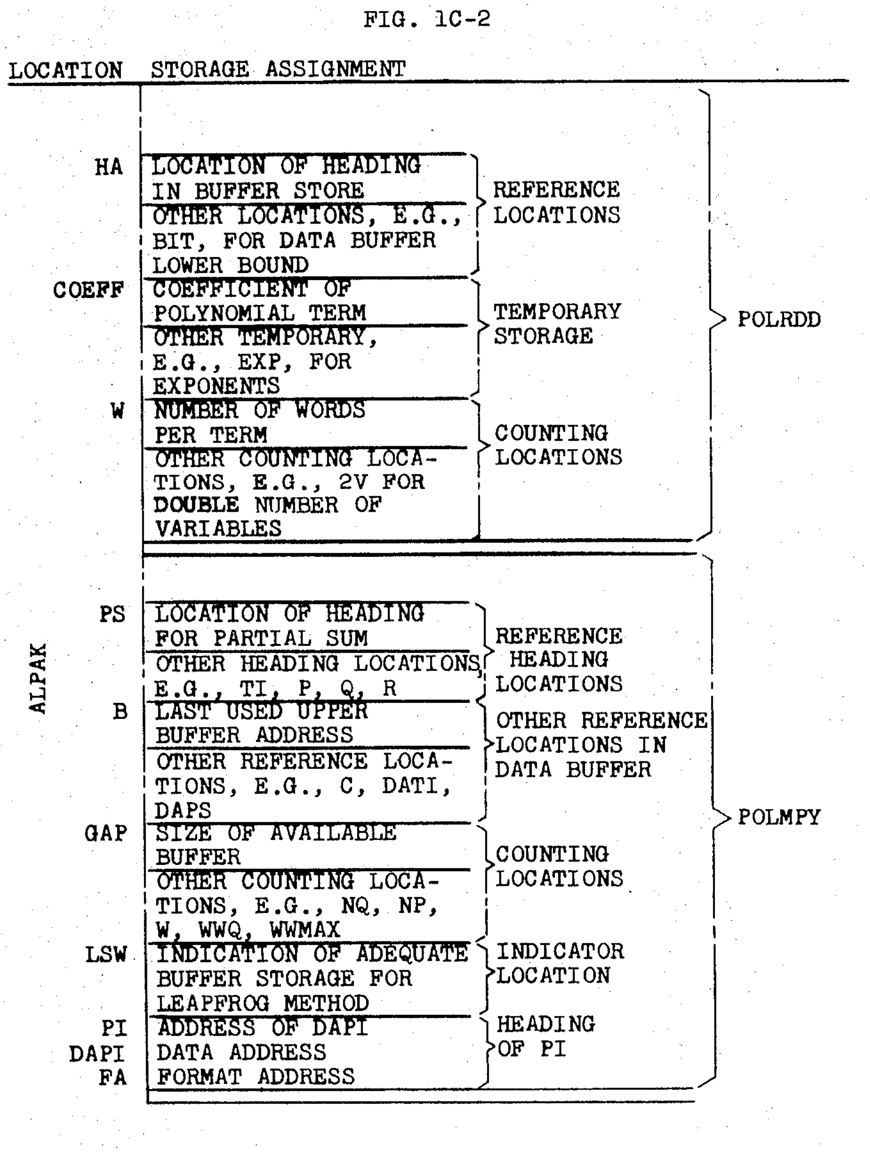
Figures 1, 1C, 2, 3:
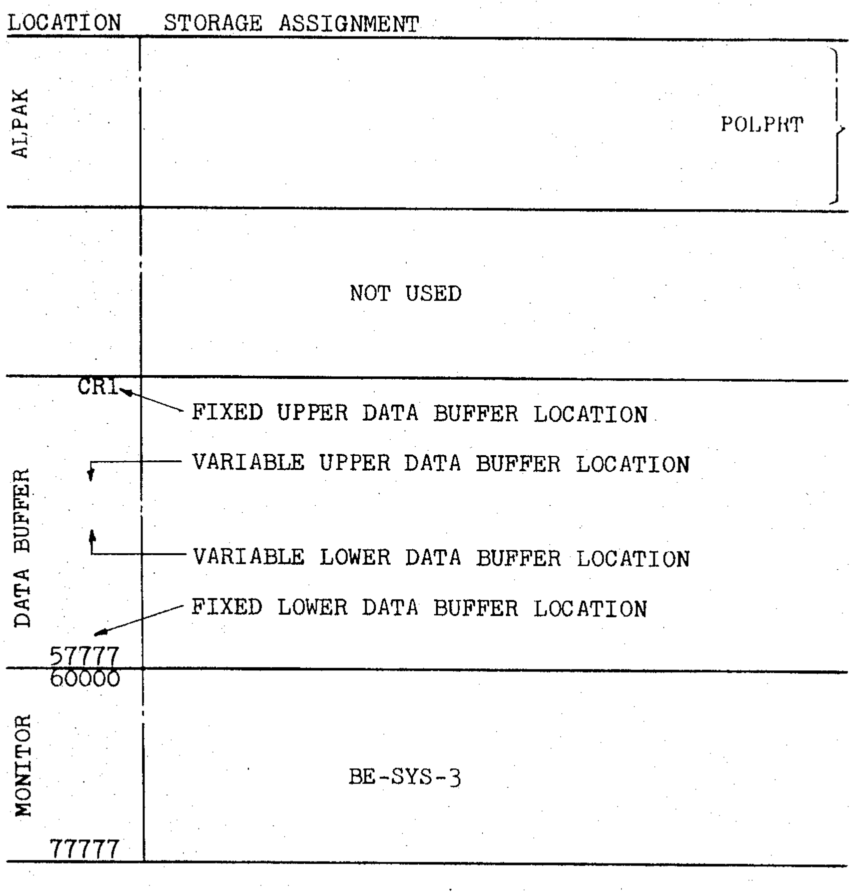
Figure 5C:
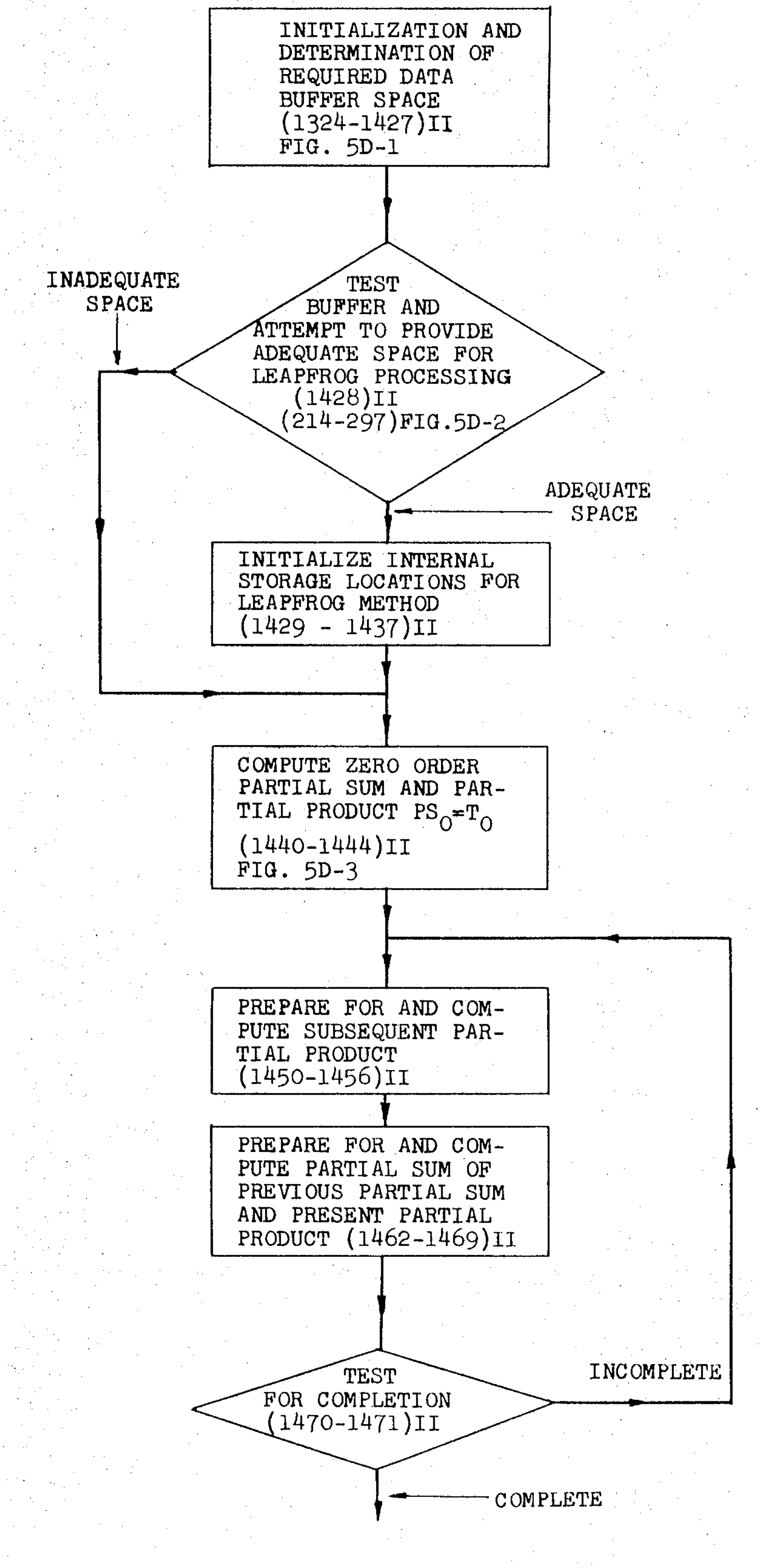
FIG. 5C is an overall flow chart for the subroutine corresponding to the fourth instruction of FIG. 1A.
Figures 1, 5D:
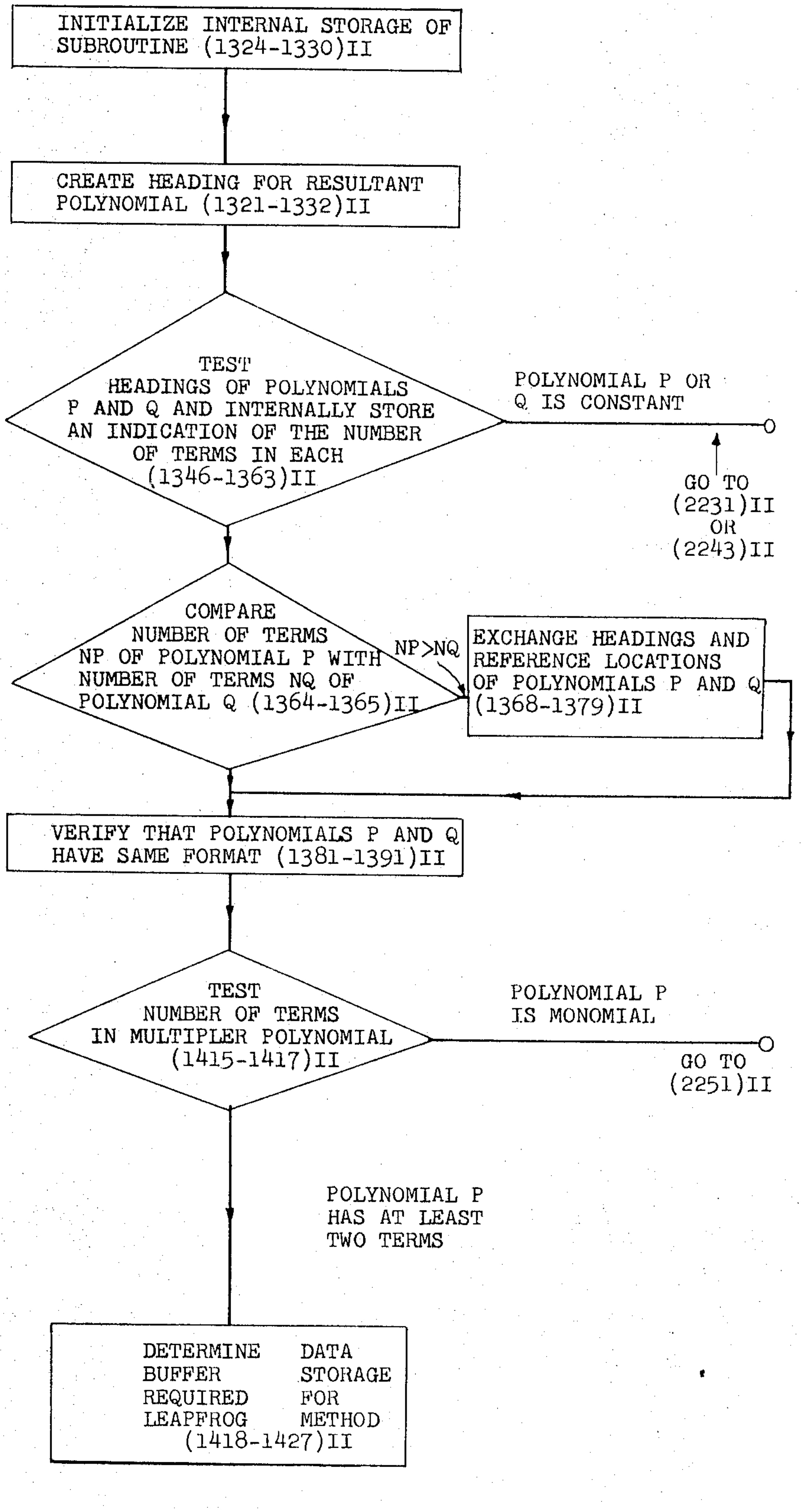
Figures 2, 5D:
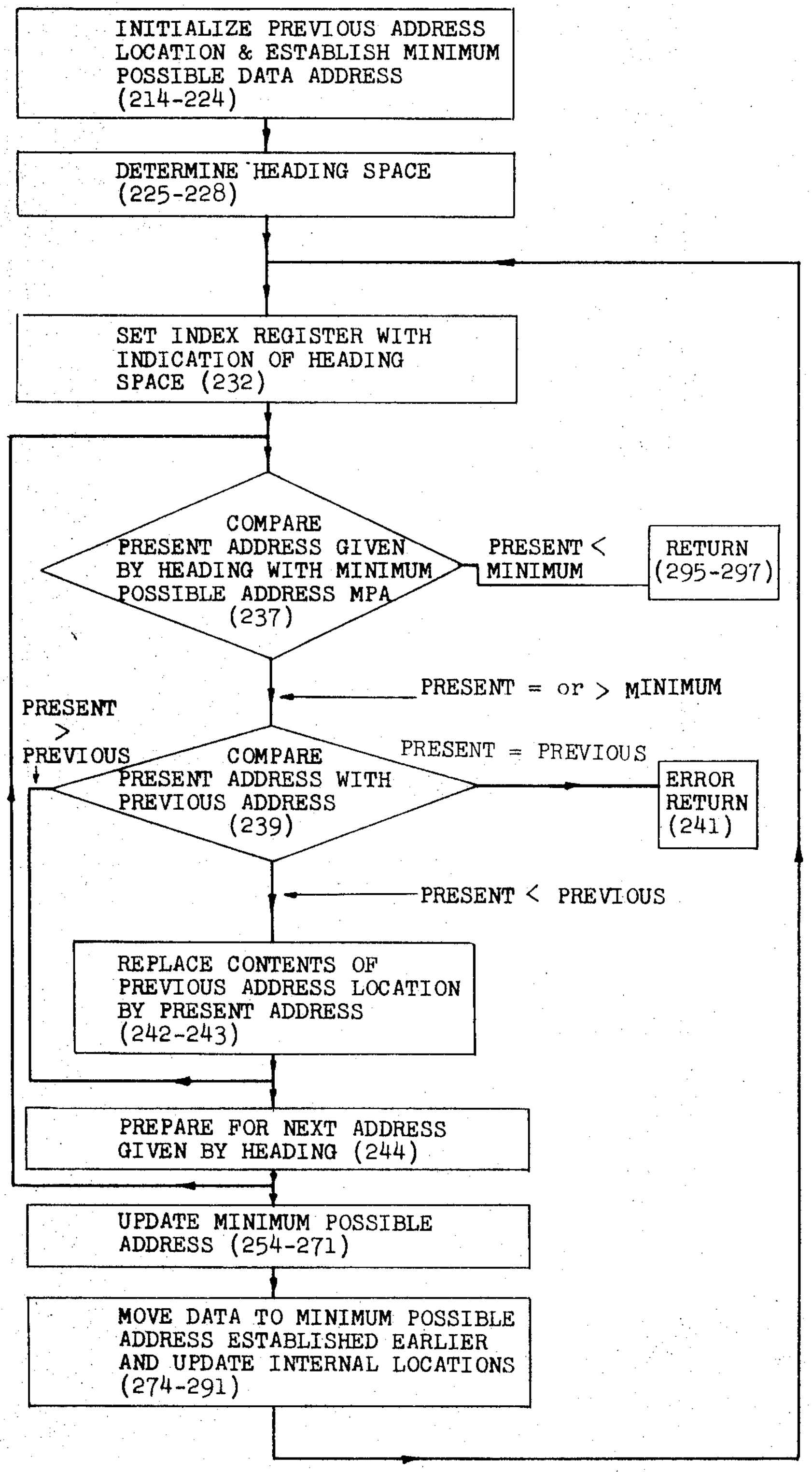
Figures 3, 5D:
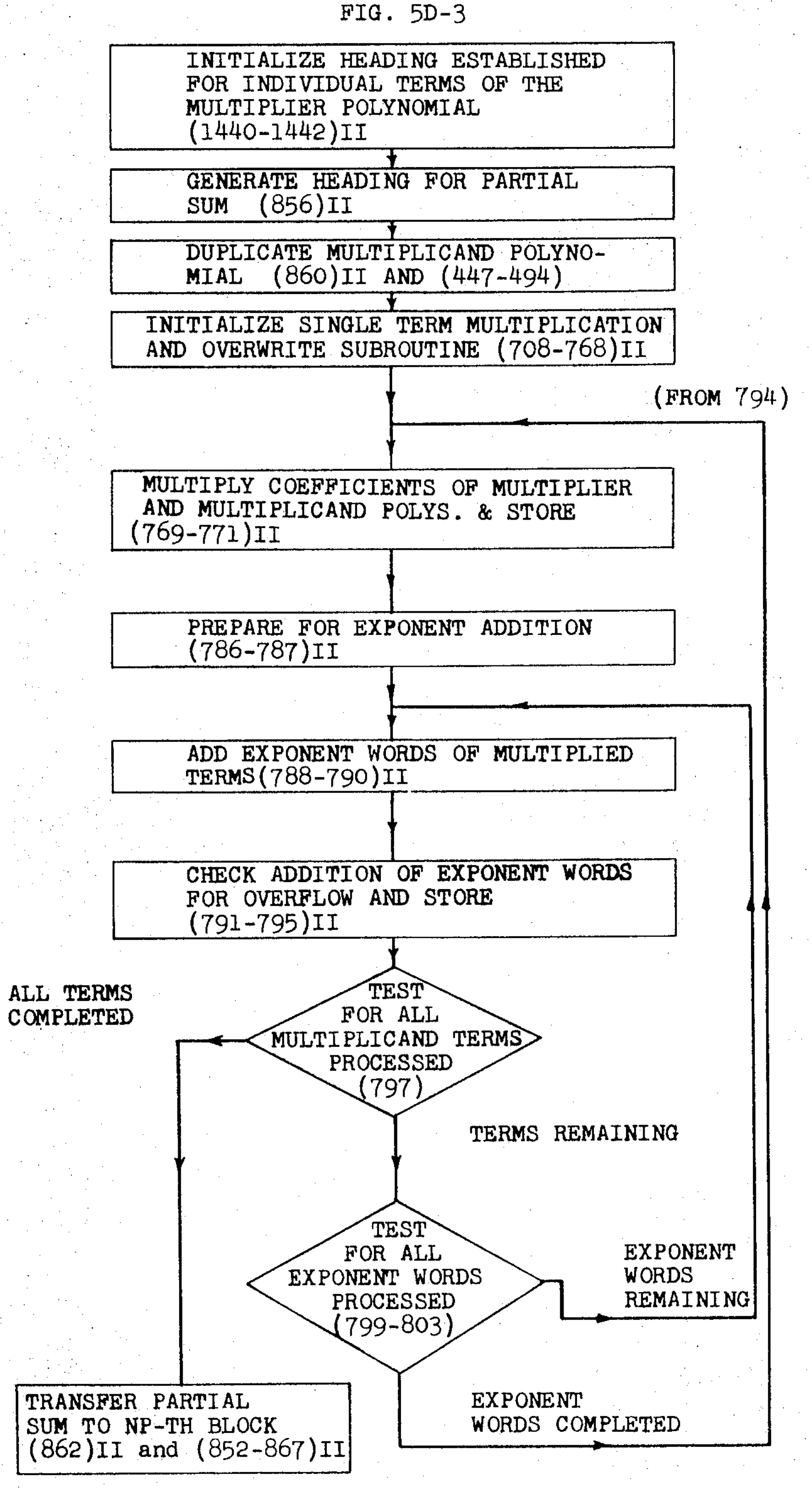

In carrying out the foregoing procedure, the operations of the POLMPY subroutine are summarized in the flow chart of FIG. 5C and shown in greater detail in the flow charts of FIGS. 5D–1 through 5D–3. The parenthesized numbers refer to detailed operations, which, as indicated by the Roman numeral following each set of parentheses, are included in Appendix II.

Turning to FIG. 5D–1, the subroutine begins with the initialization of selected internal storage locations. (1324–1330)II. This includes (1) the zeroing of locations $PS$ and TI, which are used for the heading addresses of the partial sum and the latest partial product (2). The heading of the internal reference locations of the polynomials $P$ and $Q$ (3) and the zeroing of reference location R for the result.

Next a heading is created for the resulting polynomial R using the operations of the POLHDA macro discussed earlier in conjunction with the POLRDD operations, after which the heading address is stored at the internal reference location R. (1331–1332)II.

Subsequently, the headings of the polynomials $P$ and $Q$ are tested using the RFNHDT subroutine discussed in conjunction with POLCFM. (1346 and 1356)II. The numbers of terms in the polynomials $P$ and $Q$ are stored in locations NP and NQ respectively. If the headings indicate constant terms, transfers are made accordingly. (1352 and 1362)II.

If both $P$ and $Q$ are nonconstant polynomials, their terms are compared. (1364–1365)II. The processing is arranged for the number of terms in the polynomial $P$ to be less than or equal to the number of terms in $Q$. Should this condition not prevail, the headings and reference locations of the two polynomials are interchanged. (1368–1379)II.

In addition the polynomials must be of the same format. This is verified and the format address stored at the internal location FA. (1381–1391)II.

Once the polynomials are found to have the same format, they are ready to be multiplied. This, in turn, depends upon the number of terms in the multiplier, which is tested. (1415–1417)II. If the multiplier is a monomial, the multiplication can be made directly by the POLOMP subroutine. Otherwise, a determination of the data buffer space needed for the fast, "leapfrog" method is made. (1418–1427)II.

The space that is needed is checked by the POLBSS subroutine, for Polynomial Buffer Storage Search, in the fashion that has been considered previously in conjunction with the flow chart of FIG. 4D for the POLRDD subroutine. (1428)II and (192–197). If the available space is indicated to be inadequate, an attempt is made with the POLBSS subroutine to consolidate the stored data items. (211–317).

During the course of processing headings in the lower portion of the data buffer are created which designate data addresses for blocks of coefficient and exponent words in the upper portion of the buffer. The headings are discarded or rendered inactive when no longer needed, but, to expedite processing, their associated data items are allowed to remain in the upper portion of the buffer as long as the remainder of the buffer provides adequate storage.

When a need arises for additional storage, the current headings are examined to establish that their indicated data addresses correspond to a succession of minimum possible addresses. The minimum possible addresses begin with the upper bound of the data buffer. If the data addresses of all headings exceed the minimum possible address, the data items associated with the minimum actual address are moved to the minimum possible address and the associated heading changed accordingly. Subsequently the minimum possible address is updated by the extent of the block required by the data items that have been moved, and the foregoing procedure is repeated for the remainder of the current headings until all of the data entries occupy contiguous blocks in the upper portion of the data buffer.

The procedure for consolidating the data items in the upper portion of the buffer is given in greater detail by the flow chart of FIG. 5D–2. After initialization, the pointer to the inner bound of the data buffer is set with the upper bound location *A, which is in turn stored at an internal subroutine location NAAPRE, for Next Available Previous Address, which is the minimum possible data address. (214–224).

Then, to allow examination of the data addresses of the headings in turn, the space occupied by all of the headings is established and a corresponding indication is set in Index Register 1. (225–233). The latest heading, i.e., the last one entered into the data buffer (at location *C of FIG. 1C), is considered first. Its included data address is compared with the minimum possible address contained in internal location NAAPRE. (237).

If the address given by the present heading is less than the minimum possible address, it cannot be the one being sought, and a transfer is made to allow consideration of other headings. (240). If the addresses being compared are equal, or if the address given by the heading is greater than the minimum possible address, a further comparison is made. (239).

For the latest, i.e., first, heading the second comparison is made with the address of a more remote heading. For subsequent headings the comparison takes place with the data address given by a previously considered heading. If the compared addresses are equal, an error is indicated. (241). If the present address exceeds the previous address, a transfer is made to allow consideration of other headings. (240). The final condition for the second comparison is for the comparing address to be smaller than the compared address. For the first heading the final condition prevails when the indicated data address is smaller than the remote heading address. For subsequent headings the final condition is satisfied when the present heading address is smaller than the previous heading address. In either case, the comparison address is stored at internal location SUP, for Superseded Data Address. (243).

The foregoing procedure is repeated (244) until all headings have been examined, at which point the internal location SUP contains the minimum actual address.

If no heading with a minimum address is found, a return is made to the main subroutine. (245–248). Otherwise the heading is identified with the minimum address and stored at an internal location HA, for Heading Address. (249–251). This is followed by an updating of the minimum possible address by the extent of the data of the minimum actual address. (254–271). If the minimum actual address does not correspond to the earlier minimum possible address, given by the inner bound pointer, the data are moved accordingly, after which the inner bound pointer and the heading are updated and the earlier procedure repeated. (274–291). When all data items have been packed in contiguous blocks in the upper portion of the data buffer, a return is made to the main POLMPY routine of FIG. 5C. (297).

If there is adequate space for the leapfrog method, an indication to that effect is entered at an internal location LSW, for Leapfrog Switch. (1429)II. Otherwise an overwrite method of multiplication is used.

When the leapfrog method is used, subroutine reference locations to the data buffer are filled. (1432–1437)II. These references locations are DATI, for the temporary data address of the latest partial product; and DAPS, for the data address of the partial sum.

The initial data address of the partial sum is for the zero order term $PS_0$ at the beginning of the NP-th block, which is also the data address of the zero order partial sum $T_0$ (See FIG. 5B). The initial data address of the partial product location is for the first order term $T_1$ at the beginning of the NP+1st block (See FIG. 5B).

The next step is to multiply the terms of polynomial $Q$ by the first term $P_0$ of the polynomial $P$. (1440–1445). The operations encompassed by this step are outlined in the flow chart of FIG. 5D-3. As a preliminary, provision is made for identifying the individual terms $P_I$ of the multiplier polynomial. For this purpose the POLMPY subroutine includes a heading at location $PI$ for the I-th term of polynomial $P$ (See FIG. 1C). The data address of heading $PI$ is set initially with the upper address of the data buffer. (1440–1441)II. Index register 1 is set with the number of terms in the polynomial $P$. (1442)II. Initialization is followed by a transfer to a POLOMP subroutine, for Polynomial One Term Multiplication. (1443)II. The latter subroutine creates a heading for the partial sum $PS$, using the POLHDA macro discussed in conjunction with the POLRDD COMMAND. (856)II.

At this point, the reference address, given by location $C$ of FIG. 1C, is stored so that subsequently created headings will be only temporary. (859)II. Next there is a transfer to the POLDUP subroutine, for Polynomial Duplication. (860)II. This subroutine duplicates the polynomial $Q$ starting at the first available address in the upper portion of the data buffer, as shown in FIG. 5B. A duplicate is made in order that the multiplication of the polynomial $Q$ may take place on a term by term basis at the duplicate locations without disturbance to the original polynomial at the location specified by the heading.

The POLDUP subroutine initializes its internal storage locations and generates a temporary heading in the lower portion of the data buffer which designates the first available address in the upper portion of the buffer. (447–451). Once the number of words of storage required for the polynomial has been established, the polynomial $Q$ is copied into the data buffer beginning at the location indicated by the newly created temporary heading and the pointer at location B is updated accordingly. (460–489).

The call to the POLDUP subroutine from the POLOMP subroutine is followed by a call to a POLOMO subroutine, for Polynomial One Term Multiply and Overwrite. (861)II. This is the subroutine which accomplishes the actual term by term multiplication and substitutes for each pair of multiplied terms the result of the multiplication beginning at the upper buffer storage locations specified by the temporary heading.

In essence the POLOMO subroutine multiplies the coefficient of a selected term of the polynomial $P$ by each term of the polynomial $Q$ and stores the result. (769–771)II. The multiplication is followed by an addition of the exponent words of the multiplied terms of the polynomials $P$ and $Q$. (788–790)II. The exponent words thus added are checked to determine whether or not overflow has taken place from one mask position to another. (791–793)II. If there has been no overflow, the resultant exponent word or words are stored in the data buffer following the result of the coefficient multiplication. (795)II.

Considered in greater detail, the POLOMO subroutine begins by storing the headings of the duplicated polynomial $Q$ and the single term of the multiplier polynomial $P$ at internal locations of the subroutine. (708–711)II. The headings are tested, as in the case of the POLMPY, to determine if either pertains to a constant. (712–731)II. Testing is followed by calculations of (1) the words per term and the total words in the polynomial $Q$; (2) the format address of the polynomial $Q$; and, (3) the mask address as supplemented by the number of exponent words per term. (732–746)II. The latter quantity is used in checking the exponent addition and is calculated using the POLFMI subroutine, for Polynomial Format Information. (871–891). In addition, successive coefficients of the polynomial $P$ are extracted and stored at internal subroutine locations. (748–751)II. Index registers 1 and 4 are set with the total number of words in polynomial $Q$ and the data address of the polynomial, as supplemented by the total number of words, is stored at reference locations of the subroutine. (762–768)II.

The initialization of the POLOMO subroutine is followed by a so-called I loop which is used for coefficient multiplication. (769–804)II. The I loop contains a nested J loop which is used for exponent addition. (788–799)II. The J loop contains test operations for determining (1) if all of the terms of polynomial $Q$ have been processed and (2) a test of whether all of the exponent additions have been made for each term of the polynomial $Q$. (797–803).

The testing of exponent addition for overflow is spaced by being expressed in terms of sense indicator operations. However, the testing for overflow is more readily understood in terms of the basic Exclusive-OR and AND operations that are performable in the accumulator. If the exponent word of the multiplier term is at storage location $X$, and the term by which it is being multiplied is at storage location $Y$, the exponent checking operation takes the form of the expansion shown in FIG. 5E–1, which is applicable to the apparatus block diagram also shown in FIG. 5E–2, as well as the data processing machine by which the invention is being illustrated.

Figures 1, 2, 5E:
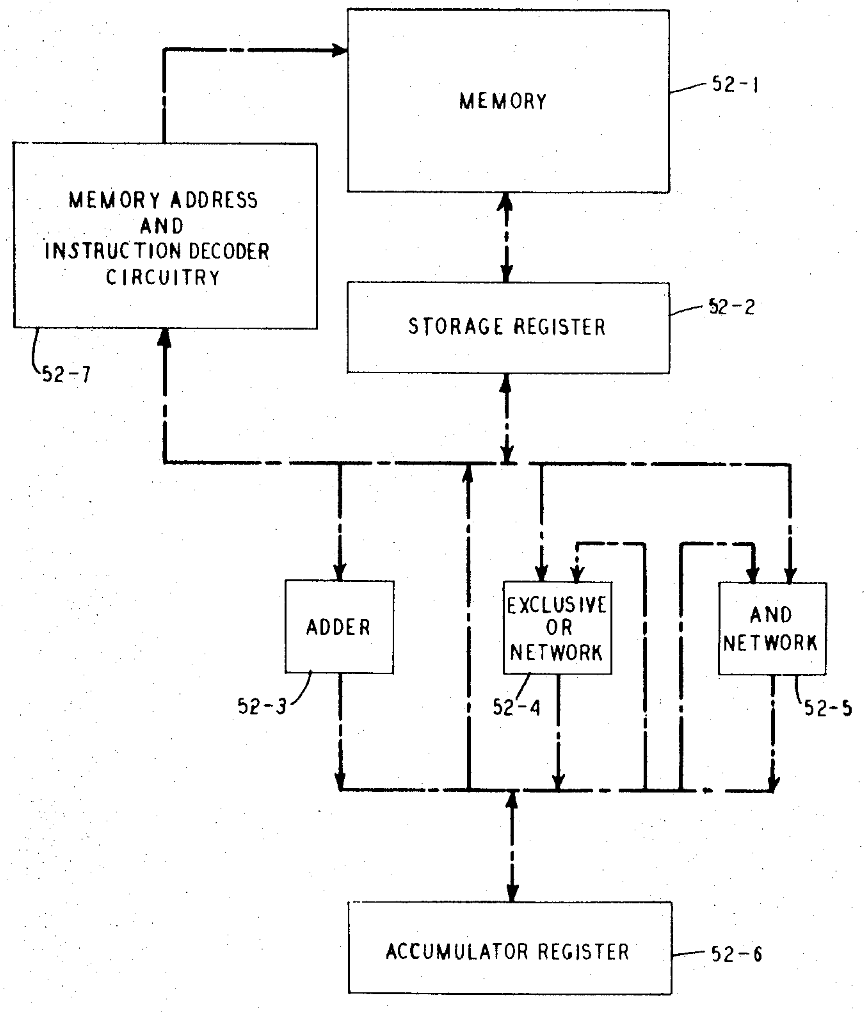

The apparatus block diagram of FIG. 5E–2 includes a memory 52–1, a storage register 52–2, an adder 52–3, an Exclusive-OR network 52–4, an AND network 52–5 and an accumulator register 52–6. In addition, the apparatus includes memory address and instruction decoder circuitry 52–7 which operates in conventional fashion to control the memory 52–1, as well as gating (not shown) among other components 52–1 through 52–6.

The first three instructions of the listing in FIG. 5E–1 at reference Nos. 50–1 through 50–3 are responsible for adding the contents at storage location $X$ of the memory 52–1 to the contents at storage location $Y$ and storing the resultant summation at storage location $Z$. In addition, the accumulator register 52–6 also contains the resultant summation. Hence, the instruction at reference No. 50–4 brings about an Exclusive-ORing between the contents of storage location *X* and the summation in the register 52–6, through the use of the Exclusive-OR network 52–4. This is followed by an Exclusive-ORing, as directed by the instruction at reference No. 50–5 with the contents at storage location *Y*. The outcome of this operation is ANDed, by the instruction at reference No. 50–6, with the contents at a mask location of the storage means, through the AND network 52–5. The first EXCLUSIVE-ORing operation has the effect of eliminating any contribution to the initial summation that did not involve a carry, made by the contents of location *X*. Similarly, the second EXCLUSIVE-ORing operation eliminates any contribution from the contents of *Y* which did not involve a carry. As a result, any signals remaining must have resulted from carries. A test of any carries in preassigned positions of the mask is made by the final ANDing operation. In the illustrative example, the contents of location *X*, for the first term of the polynomial *Q* are $000000000001_8$. The similar contents of location *Y* for the first term of the polynomial *P* are $000000000100_8$. The summation of these two contents produces a machine word at location *Z* in the form $000000000101_8$. The first EXCLUSIVE-ORing operation eliminates the information from storage location *X* so that the result is $000000000001_8$. The second EXCLUSIVE-ORing operation eliminates the contribution from location *Y* so that the result is $000000000000_8$. This resultant contains no carries so that the ANDing operation has no effect on it. However, if the contents of locations *X* and *Y* had each been given by nine binary signals, respectively represented as $053_8$ and $046_8$, an overflow carry would have been indicated using the illustrative mask. The resulting summation would have been $121_8$. The latter is converted into $134_8$, which has a binary representation of $001011100_2$, after the two indicated EXCLUSIVE-ORing operations. Hence, starting from the right-hand digit, carries are indicated for the third, fourth, fifth and seventh digit positions. The corresponding binary represented portion of the mask is $001000001_2$; so that the final ANDing operation yields $001000000_2$, for which an overflow carry is indicated for the seventh digit position.

Upon completion of the operations of the POLOMO subroutine there is a return to the POLOMP subroutine which indicates a transfer to an RFNDPH subroutine, for Rational Function Duplicate and Place Heading. (862)II. The RFNDPH subroutine transfers the overwritten term by term multiplication at the upper data buffer location indicated by the temporary heading to the position within the data buffer assigned to the zero order partial sum whose heading is at location *D–12 as shown in FIG. 5B. The operations of the RFNDPH subroutine by which this is accomplished amount to a direct interchange of information between the respectively indicated locations. (852–867)II. The restoration of the internal reference location *C* completes the POLOMP subroutine. (863–864)II.

The next step of the main POLMPY subroutine is a test of the POLMPY subroutine location LSW and the setting of the contents of location *B* with the contents of internal subroutine location DATI, in preparation for the entry of the multiplication of the second term of the polynomial *P* by the polynomial *Q*. (1448–1450)II. The contents of location DATI specify the beginning of the term or the NP+1st block of the data buffer, as shown in FIG 5B. The information for this block is obtained using the POLOMP subroutine just considered. (1456)II.

At this point the data buffer contains two partial products which are combined (1462–1468)II into a partial sum. The partial sum is brought about using a POLADD subroutine, for Polynomial Addition.

Since the terms of the polynomials *P* and *Q* are in canonical form, the data blocks containing their partial products are also in canonical form. Thus each partial sum of two partial products is produced by comparing the exponents of the terms in each block and canceling them or merging them, beginning at the data address that has been set for the partial sum. (1037–1060)II. If the exponents of corresponding terms are equal, the coefficients are added. (1063–1074)II. The initialization of the POLADD subroutine is similar to that of the previously considered POLMPY subroutine. (896–1036)II. The entry of the partial sum into the data buffer is followed by operations which restore the original subroutine and include the filling in of the heading of the resultant partial sum. (1157–1164)II.

The foregoing generation of partial products and their combination into partial sums is continued in the POLMPY subroutine until the data items of the polynomials *P* and *Q* are exhausted. (1470–1471)II. For the example under consideration, the polynomial *P* has two terms and the desired result appears after one application of the POLADD subroutine.

Once the result of the desired calculation is available in storage, all that remains is the extraction of that information from storage. This is accomplished by the POLPRT command of FIG. 1A. (1315–1567). This command produces a call to a subroutine of the same name, by which each term of the polynomial is printed on a single line with continuation lines used where necessary. In the case of the IBM 7090 all coefficients are right adjusted so that they form a column in the output. The exponents typically form additional columns headed by their corresponding variable names. In each line the coefficient is separated from the exponent by two blanks and the exponents are separated from each other by single blanks.

Other adaptations of the invention still occur to those skilled in the art.

PAGE 3 13:32:18 09/25/64 JØB 3773

APPENDIX I

```
25 * MACRØS.

27 PØLBSS MACRØ  A,B,C
28        TSX    PØLBSS,4
29        PZE    A
30        PZE    B
31        IFF    1,,C
32        REM3
33        IFF    ,,C
34        C
35        ENDM
36        NØCRS  PØLBSS

38 PØLHCA MACRØ  Y,T,ØUT
41        SXA    ØUT,4
42        CLA*   Y,T
43        ANA    =Ø77777
44        TNZ    *+5
45        PXA    Y,T
46        SUB    *-1
47        TSX    RFNCRH,4
48        TRA    ØUT
55  ØUT   AXT    **,4
56        END
```

```
PAGE 4                                                                   13:32:18     09/25/64  JOB 3773

                                  169 * RFNCRH.  CREATE HEADING.
 00042   0621 00 0 00052              RFNCRH STA     BTL3
 00043                            176          POLBSS  B,=3
 00047   0500 00 0 00034          177  BTL2   CLA     C                      CREATE HEADING AND STORE ITS ADDRESS.
 00050   0402 00 0 04062          178          SUB     =3
 00051   0601 00 0 00034          179          STO     C
 00052   0601 60 0 00000          180  BTL3   STO*    **
 00053   0600 60 0 00034          181          STZ*    C
 00054                            182          EXIT    1,4


                                  189 * POLBSS.  CHECK FOR REQUIRED SPACE BELOW B POINTER.  IF NOT AVAILABLE,
                                  190 * COLLECT GARBAGE AND CHECK AGAIN.  SET C(1,4) TO B POINTER.
                                  191          ENTRY   POLBSS
 00063   0500 00 0 00033          192 POLBSS CLA     B
 00064   0621 60 4 00001          193          STA*    1,4
 00065   0400 60 4 00002          194          ADD*    2,4
 00066   0402 00 0 00034          195          SUB     C
 00067  -0120 00 4 00004          196          TMI     4,4              ENOUGH SPACE
 00070   0100 00 4 00004          197          TZE     4,4
 00071  -0754 00 0 00000          198          ZAC
 00072   0621 60 4 00001          199          STA*    1,4
 00073   0634 00 4 00075          200          SXA     *+2,4
 00074   0074 00 4 00105          201          TSX     RFNCLG,4
 00075   0774 00 4 00000          202          AXT     **,4
 00076   0500 00 0 00033          203          CLA     B
 00077   0621 60 4 00001          204          STA*    1,4
 00100   0400 60 4 00002          205          ADD*    2,4
 00101   0402 00 0 00034          206          SUB     C
 00102  -0120 00 4 00004          207          TMI     4,4              ENOUGH SPACE
 00103   0100 00 4 00004          208          TZE     4,4
 00104   0020 00 4 00003          209          TRA     3,4              INSUFFICIENT SPACE


PAGE 5                                                                   13:32:18     09/25/64  JOB 3773

                                  211 * RFNCLG.  COLLECT GARBAGE.

                                  213 RFNCLG ENTER   ENDJOB
 00111  -0600 00 0 00245          214          STQ     MQ           SAVE THE MQ.
 00112   0020 00 0 00114          215          TRA     *+2
 00113   0074 00 4 00000          216          TSX     /TV/TIMIN,4
 00114   0500 00 0 00033          217          CLA     B
 00115   0601 00 0 00244          218          STO     BOLD
 00116   0500 00 0 00034          219          CLA     C
 00117   0400 00 0 04060          220          ADD     =1
 00120   0601 00 0 00243          221          STO     CA
 00121   0500 00 0 00032          222          CLA     A
 00122   0601 00 0 00033          223          STO     B                SET B=A.
 00123   0601 00 0 00235          224          STO     NAAPRE           SET NAAPRE=A.
 00124   0500 00 0 00035          225          CLA     D
 00125   0402 00 0 00034          226          SUB     C
 00126   0100 00 0 00217          227          TZE     ST5          D-C IN AC. IF NO HEADINGS, GO TO STEP 5.
 00127   0621 00 0 00130          228          STA     ST1
                                  229 * STEP 1.  FIND THE HEADING WHOSE DATA ADDRESS
                                  230 *          IS MINIMUM IN THE INTERVAL
                                  231 *          (NAAPRE) LESS THAN OR EQUAL TO (DA) LESS THAN (C+1).
                                  232 *          IF NONE, GO TO STEP 5.
 00130   0774 00 1 00000          233  ST1    AXT     **,1             SET IR1=D-C.
 00131   0500 00 0 00243          234          CLA     CA
 00132   0601 00 0 00236          235          STO     SUP
 00133   0500 00 1 00000          236  BTL10 CLA     **,1          DA INTO AC. (**=D. SET BY RFNBEG.)
 00134   0340 00 0 00235          237          CAS     NAAPRE
 00135   0020 00 0 00136          238          TRA     *+1
 00136   0340 00 0 00236          239          CAS     SUP
 00137   0020 00 0 00143          240          TRA     BTL12
 00140                            241          REM6           2 HEADINGS WITH SAME DA, OR ONE WITH DA=C+1.
 00141   0634 00 1 00237          242          SXA     IR,1
 00142   0601 00 0 00236          243          STO     SUP
 00143   2 00003 1 00133          244  BTL12 TIX     BTL10,1,3
 00144   0500 00 0 00236          245          CLA     SUP
 00145   0340 00 0 00243          246          CAS     CA
 00146                            247          REM6
 00147   0020 00 0 00217          248          TRA     ST5              IF NO HEADING WAS FOUND, GO TO STEP5.
 00150   0500 00 0 00035          249          CLA     D
 00151   0402 00 0 00237          250          SUB     IR
 00152   0601 00 0 00240          251          STO     HA               SAVE THE HEADING ADDRESS.
                                  252 * STEP 2.  UPDATE NAAPRE AND VERIFY
                                  253 *          THAT IT DOES NOT EXCEED C.
 00153   0074 00 4 01247          254          TSX     RFNHDT,4
 00154   0 00000 0 00240          255          PZE     HA
 00155                            256          REM6
 00156                            257          REM6
 00157                            258          REM6
 00160                            259          REM6
 00161                            260          REM6
 00162                            261          REM6
 00163   0400 00 0 04060          262          ADD     =1
 00164   0601 00 0 00241          263          STO     W                W IN AC. N IN MQ.
 00165   0200 00 0 00241          264          MPY     W
```

```
00166 -0600 00 0 00242           STQ     WW
00167  0500 00 0 00236           CLA     SUP             DATA ADDRESS INTØ AC.
00170  0400 00 0 00242           ADD     WW              CØMPUTE NAA.
00171  0340 00 0 00034           CAS     C
00172                            REM6
00173  0020 00 0 00174           TRA     *+1
00174  0601 00 0 00235           STØ     NAAPRE
00175  0621 00 0 00207           STA     BTL35
                         * STEP 3. MØVE THE DATA TØ B.
00176 -0520 00 0 00242           NZT     WW
00177  0020 00 0 00226           TRA     NØD             IF NØ DATA, GØ TØ NØD.
00200  0500 00 0 00033           CLA     B               NEW DA INTØ AC.
00201  0340 00 0 00236           CAS     SUP             CØMPARE IT TØ ØLD DA.
00202                            REM6
00203  0020 00 0 00214           TRA     ST4+2
00204  0400 00 0 00242           ADD     WW
00205  0621 00 0 00210           STA     BTL36
00206  0534 00 1 00242           LXA     WW,1
00207 -0500 00 1 00000   BTL35   CAL     **,1            **=ØLD DA + WW.
00210  0602 00 1 00000   BTL36   SLW     **,1            **=NEW DA + WW.
00211  2 00001 1 00207           TIX     *-2,1,1
                         * STEP 4. UPDATE THE HEADING, UPDATE B, AND RETURN TØ STEP 1.
00212  0500 00 0 00033   ST4     CLA     B
00213  0601 60 0 00240           STØ*    HA
00214  0400 00 0 00242           ADD     WW
00215  0601 00 0 00033           STØ     B
00216  0020 00 0 00130           TRA     ST1
                         * STEP 5. RETURN WITH B IN THE AC.
00217  0020 00 0 00221   ST5     TRA     *+2
00220  0074 00 4 00001           TSX     /TV/TIMØUT,4
00221  0500 00 0 00033           CLA     B
00222  0560 00 0 00245           LDQ     MQ              RESTØRE THE MQ.
00223                            EXIT    1,4
                         * PØLYNØMIAL WITH ZERØ TERMS FØUND.
                         * DA IN AC MUST EQUAL BØLD.  UPDATE IT AND EXIT.
00226  0340 00 0 00244   NØD     CAS     BØLD
00227                            REM6
00230  0020 00 0 00232           TRA     *+2
00231                            REM6
00232  0500 00 0 00033           CLA     B
00233  0601 60 0 00240           STØ*    HA
00234  0020 00 0 00217           TRA     ST5

                         * STØRAGE.
00235  0 00000 0 00000   NAAPRE                          NAA FRØM PREVIØUS PØLYNØMIAL
00236  0 00000 0 00000    SUP
00237  0 00000 0 00000    IR                             SAVE INDEX REGISTER HERE.
00240  0 00000 0 00000    HA                             HEADING ADDRESS.
00241  0 00000 0 00000    W                              WØRDS PER TERM.
00242  0 00000 0 00000    WW                             WØRDS IN DATA BLØCK.
00243  0 00000 0 00000    CA                             C+1.
00244  0 00000 0 00000    BØLD                           ØLD B.
00245  0 00000 0 00000    MQ
```

```
PAGE 7                                                        13:32:18   09/25/64  JØB 3773

                              444 * PØLDUP--DUPLICATE.  QQ=PP.
                              445 * STEP 1.  SAVE INDEX REGISTERS AND TEST HEADINGS.
                              446 PØLDUP ENTER   ENDJØB
   00441  0600 00 0 00535     447        STZ     QQ
   00442  0500 60 4 00002     448        CLA*    2,4
   00443  0601 00 0 00534     449        STØ     PP
   00444                      450        PØLHDA  1,4
   00455  0601 00 0 00535     451        STØ     QQ
   00456  0074 00 4 01247     452        TSX     RFNHDT,4
   00457  0 00000 0 00534     453        PZE     PP
   00460                      454        REM4
   00461                      455        REM4
   00462                      456        REM4
   00463                      457        REM4
   00464                      458        REM4
   00465  0020 00 0 00526     459        TRA     PPC
   00466  0400 00 0 04060     460        ADD     =1
   00467  0601 00 0 00536     461        STØ     WPP
   00470  0200 00 0 00536     462        MPY     WPP
   00471 -0600 00 0 00537     463        STQ     WWPP
   00472                      464        PØLBSS  B,WWPP
                              465 * STEP 3.  MØVE THE DATA.
   00476 -0520 00 0 00537     466  S3    NZT     WWPP
   00477                      467        REM4
   00500  0500 00 0 00033     468        CLA     B
   00501  0400 00 0 00537     469        ADD     WWPP
   00502  0621 00 0 00510     470        STA     BTL72
   00503  0500 60 0 00534     471        CLA*    PP                ØLD DA INTØ AC.
   00504  0400 00 0 00537     472        ADD     WWPP
   00505  0621 00 0 00507     473        STA     BTL71
   00506                      474        EVEN
   00506  0534 00 1 00537     475        LXA     WWPP,1
   00507 -0500 00 1 00000     476  BTL71 CAL     **,1              ** = ØLD DA + WWPP.
   00510  0602 00 1 00000     477  BTL72 SLW     **,1              ** = NEW DA + WWPP.
   00511  2 00001 1 00507     478        TIX     *-2,1,1
   00512  0535 00 1 00534     479        LAC     PP,1
   00513  0535 00 2 00535     480        LAC     QQ,2
   00514  0500 00 0 00033     481        CLA     B                 B=DATA ADDRESS ØF QQ
   00515  0601 00 2 00000     482        STØ     0,2
   00516  0500 00 1 00001     483        CLA     1,1
   00517  0601 00 2 00001     484        STØ     1,2
   00520  0500 00 1 00002     485        CLA     2,1
   00521  0601 00 2 00002     486        STØ     2,2
   00522  0500 00 0 00033     487        CLA     B
   00523  0400 00 0 00537     488        ADD     WWPP
   00524  0621 00 0 00033     489        STA     B
   00525  0020 00 0 00531     490        TRA     BTL73
   00526  0074 00 4 01270     491  PPC   TSX     RFNDPH,4
   00527  0 00000 0 00535     492        PZE     QQ
   00530  0 00000 0 00534     493        PZE     PP
   00531                      494  BTL73 EXIT    3,4

                              497 * STØRAGE.

PAGE 8                                                        13:32:18   09/25/64  JØB 3773

   00534  0 00000 0 00000     498  PP
   00535  0 00000 0 00000     499  QQ
   00536  0 00000 0 00000     500  WPP
   00537  0 00000 0 00000     501  WWPP
```

```
                                      HEAD    8
                                      ENTRY   PØLRDF
                              PØLRDF  ENTER   DUMP
00544   0500 00 4 00001                CLA     1,4                 INITIALIZE STØRAGE.
00545   0621 00 0 00763                STA     LE
00546   0400 00 0 04060                ADD     =1
00547   0601 00 0 01055                STØ     LV
00550   0400 00 0 04060                ADD     =1
00551   0601 00 0 01056                STØ     NAA
00552   0600 00 0 01030                STZ     V
00553   0600 00 0 01031                STZ     NB
00554   0600 00 0 01032                STZ     E
00555   0600 00 0 01061                STZ     SW
00556   0074 00 4 77006        BTL1    TSX     HHPEAD,4            READ
00557   0 00000 0 01036                PZE     A                   ØNE CARD
00560   0074 00 4 03163                TSX     REMRK9,4
00561   0074 00 4 03166                TSX     RMRK10,4
00562  -0500 00 0 04124                CAL     =H
00563   0602 00 0 01052                SLW     A+12
00564   0774 00 4 00001                AXT     1,4                 SET IR4 FØR CØUNT.
00565   0774 00 1 00015                AXT     13,1                SET IR1 FØR BUFFER A.
                                                                   LENGTH IS 13 BECAUSE A
                                                                   WØRD ØF BLANKS IS
                                                                   APPENDED TØ BUFFER A.
00566  -0754 00 0 00000                ZAC
00567   0774 00 2 00006        BTL2    AXT     6,2
00570   0560 00 1 01053                LDQ     A+13,1              BCD WØRD INTØ MQ.
00571  -3 00007 4 00573        BTL3    TXL     *+2,4,7             NAME FIELD (INCLUDING CØMMA) MAY
00572   0074 00 4 03160                TSX     REMRK8,4
00573  -0763 00 0 00006                LGL     6                   NAME IN AC. ADD ØNE CHARACTER
00574   0602 00 0 01060                SLW     SHNAME              AND STØRE.
00575  -0320 00 0 04100                ANA     =Ø77
00576  -0340 00 0 04077                LAS     =Ø73
00577   0020 00 0 00601                TRA     *+2
00600   0020 00 0 00607                TRA     ENDN                GØ TØ ENDNAME.
00601  -0500 00 0 01060                CAL     SHNAME              ØTHERWISE UPDATE
00602   0602 00 0 01057                SLW     NAME                NAME,
00603   1 00001 4 00604                TXI     *+1,4,1             INCREMENT CØUNT,
00604   2 00001 2 00571                TIX     BTL3,2,1            AND REPEAT LØØP.
00605   2 00001 1 00567                TIX     BTL2,1,1
00606   0074 00 4 03160                TSX     REMRK8,4
00607   2 00001 2 00614        ENDN    TIX     BTL4,2,1            CØMMA IN AC. PREPARE
00610   2 00001 1 00612                TIX     *+2,1,1             TØ READ NEXT CHARACTER.
00611   0074 00 4 03160                TSX     REMRK8,4
00612   0774 00 2 00006                AXT     6,2
00613   0560 00 1 01053                LDQ     A+13,1
00614  -0763 00 0 00006        BTL4    LGL     6                   SHIFT NEXT CHARACTER
00615  -0340 00 0 04103                LAS     =Ø7360
00616   0020 00 0 00620                TRA     *+2
00617  -0625 00 0 01061                STL     SW                  SET SWITCH
00620  -0765 00 0 00006                LGR     6                   IN ANY CASE SHIFT IT BACK INTØ THE MQ,
00621  -0500 00 0 01057                CAL     NAME                    AND
00622   3 00006 4 00626        BTL5    TXH     BTL6,4,6                CØMPLETE
00623   0767 00 0 00006                ALS     6                       THE NAME
```

```
00624  0400 00 0 04075   557          ADD     =Ø60                WITH
00625  1 00001 4 00622   558          TXI     BTL5,4,1            BLANKS.
00626  0602 60 0 01056   559  BTL6    SLW*    NAA            STØRE IT AT NAA,
00627  0500 00 0 01056   560          CLA     NAA            AND
00630  0400 00 0 04060   561          ADD     =1             INCREMENT
00631  0601 00 0 01056   562          STØ     NAA            NAA
00632  0500 00 0 01030   563          CLA     V              AND
00633  0400 00 0 04060   564          ADD     =1             NV.
00634  0601 00 0 01030   565          STØ     V
00635 -0520 00 0 01061   566          NZT     SW             IF SWITCH IS ØN,
00636  0020 00 0 00647   567          TRA     BTL10
00637  0600 00 0 01061   568          STZ     SW             TURN IT ØFF, AND
00640  0074 00 4 77006   569          TSX     HHREAD,4       READ
00641  0 00000 0 01036   570          PZE     A              NEW CARD
00642  0074 00 4 03163   571          TSX     REMRK9,4
00643  0074 00 4 03166   572          TSX     RMRK10,4
00644  0774 00 1 00015   573          AXT     13,1           SET IR1.
00645  0774 00 2 00006   574          AXT     6,2            SET  IR2  AND  PUT
00646  0560 00 1 01053   575          LDQ     A+13,1         NEXT BCD WØRD INTØ MQ.
00647 -0754 00 0 00000   576  BTL10   ZAC
00650 -0763 00 0 00006   577          LGL     6              READ
00651 -0100 00 0 00653   578          TNZ     *+2
00652  0074 00 4 03160   579          TSX     REMRK8,4
00653  0340 00 0 04067   580          CAS     =9             FIRST DIGIT
00654  0074 00 4 03160   581          TSX     REMRK8,4
00655  0761 00 0 00000   582          NØP                    BIT NUMBER,
00656  0601 00 0 01062   583          STØ     BIT            STØRE IT,
00657  0767 00 0 00002   584          ALS     2              MULTIPLY IT
00660  0400 00 0 01062   585          ADD     BIT            BY 10
00661  0767 00 0 00001   586          ALS     1              AND
00662  0601 00 0 01063   587          STØ     TENBIT         STØRE THAT.
00663  2 00001 2 00670   588          TIX     BTL12,2,1      PREPARE
00664  2 00001 1 00666   589          TIX     *+2,1,1        TØ
00665  0074 00 4 03160   590          TSX     REMRK8,4         READ
00666  0774 00 2 00006   591          AXT     6,2            NEXT
00667  0560 00 1 01053   592          LDQ     A+13,1         CHARACTER.
00670 -0754 00 0 00000   593  BTL12   ZAC                    PUT NEXT CHARACTER
00671 -0763 00 0 00006   594          LGL     6              INTØ THE AC.
00672  0340 00 0 04067   595          CAS     =9             IF NØT AN INTEGER,
00673  0020 00 0 00705   596          TRA     BTL14          GØ TØ BTL14.
00674  0761 00 0 00000   597          NØP                    ØTHERWISE
00675  0400 00 0 01063   598          ADD     TENBIT         CØMPUTE AND
00676  0601 60 0 01056   599          STØ*    NAA            STØRE THE BIT NUMBER,
00677  2 00001 2 00710   600          TIX     BTL15,2,1      AND PREPARE
00700  2 00001 1 00702   601          TIX     *+2,1,1        TØ READ
00701  0074 00 4 03160   602          TSX     REMRK8,4         THE
00702  0774 00 2 00006   603          AXT     6,2            NEXT
00703  0560 00 1 01053   604          LDQ     A+13,1         CHARACTER
00704  0020 00 0 00710   605          TRA     BTL15
00705 -0765 00 0 00006   606  BTL14   LGR     6         RETURN THE TERMINATIØN CHARACTER TØ THE MQ,
00706  0500 00 0 01062   607          CLA     BIT            AND
00707  0601 60 0 01056   608          STØ*    NAA            STØRE THE BIT NUMBER.
00710  0400 00 0 01031   609  BTL15   ADD     NB             UPDATE NB.
00711  0340 00 0 04074   610          CAS     =36            IF NEW NB
```

```
00712  0074 00 4 03160   611          TSX    REMRK8,4
00713  0020 00 0 00716   612          TRA    BTL16            =36, GØ TØ BTL16.
00714  0601 00 0 01031   613          STØ    NB               LESS THAN 36, STØRE IT
00715  0020 00 0 00722   614          TRA    BTL18            AND GØ TØ BTL18.
00716  0600 00 0 01031   615   BTL16  STZ    NB               RESET NB TØ ZERØ.
00717  0500 00 0 01032   616          CLA    E                AND
00720  0400 00 0 04060   617          ADD    =1               INCREMENT
00721  0601 00 0 01032   618          STØ    E                E.
00722  0500 00 0 01056   619   BTL18  CLA    NAA              INCREMENT   NAA
00723  0400 00 0 04060   620          ADD    =1
00724  0601 00 0 01056   621          STØ    NAA
00725 -0754 00 0 00000   622          ZAC
00726 -0763 00 0 00006   623          LGL    6                LØØK AT THE
00727 -0340 00 0 04075   624          LAS    =Ø60
00730  0020 00 0 00733   625          TRA    BTL19            IF NØT BLANK, GØ TØ BTL19.
00731  0020 00 0 00760   626          TRA    ENDFS            IF BLANK, GØ TØ END FØRMAT STATEMENT.
00732  0074 00 4 03160   627          TSX    REMRK8,4
00733 -0340 00 0 04077   628   BTL19  LAS    =Ø73
00734  0074 00 4 03160   629          TSX    REMRK8,4         IT MUST
00735  0020 00 0 00737   630          TRA    *+2              BE
00736  0074 00 4 03160   631          TSX    REMRK8,4         CØMMA.
00737  2 00001 2 00744   632          TIX    BTL20,2,1        PREPARE
00740  2 00001 1 00742   633          TIX    *+2,1,1          TØ READ
00741  0074 00 4 03160   634          TSX    REMRK8,4           NEXT
00742  0774 00 2 00006   635          AXT    6,2              CHARACTER.
00743  0560 00 1 01053   636          LDQ    A+13,1
00744 -0763 00 0 00006   637   BTL20  LGL    6                SHIFT NEXT CHARACTER INTØ AC.
00745 -0340 00 0 04103   638          LAS    =Ø7360
00746  0020 00 0 00750   639          TRA    *+2
00747 -0625 00 0 01061   640          STL    SW               SET SWITCH.
00750 -0765 00 0 00006   641          LGR    6                IN ANY CASE, SHIFT IT BACK.
00751 -0520 00 0 01061   642          NZT    SW               IF SWITCH IS ØN,
00752  0020 00 0 00755   643          TRA    BTL24
00753  0600 00 0 01061   644          STZ    SW               TURN IT ØFF AND
00754  0020 00 0 00556   645          TRA    BTL1             GØ TØ BTL1.
00755  0774 00 4 00001   646   BTL24  AXT    1,4              ØTHERWISE RESET IR4
00756 -0754 00 0 00000   647          ZAC                     AND AC
00757  0020 00 0 00571   648          TRA    BTL3             AND GØ TØ BTL3.
00760  0520 00 0 01031   649   ENDFS  ZET    NB               NB MUST
00761  0074 00 4 03160   650          TSX    REMRK8,4           BE ZERØ.
00762  0500 00 0 01032   651          CLA    E                FILL IN
00763  0601 00 0 00000   652   LE     STØ    **               THE FIRST TWØ WØRDS
00764  0500 00 0 01030   653          CLA    V                ØF THE
00765  0601 60 0 01055   654          STØ*   LV               FØRMAT STATEMENT.
                         655 *  THE ØNLY REMAINING TASK IS TØ CØNSTRUCT THE MASK.
00766  0767 00 0 00001   656          ALS    1
00767  0734 00 1 00000   657          PAX    0,1              SET IR1=2NV.
00770  0500 00 0 01056   658          CLA    NAA
00771  0400 00 0 04060   659          ADD    =1
00772  0621 00 0 01002   660          STA    BTL30
00773  0400 00 0 04061   661          ADD    =2
00774  0621 00 0 01010   662          STA    BTL32
00775  0600 60 0 01056   663   BTL26  STZ*   NAA
00776  0600 00 0 01031   664          STZ    NB
```

```
00777 -0754 00 0 00000    665          ZAC
01000  0400 00 0 04060    666  BTL28   ADD      =1
01001  0602 60 0 01056    667          SLW*     NAA
01002  0500 00 1 00000    668  BTL30   CLA      **,1              **=MA+1=FA+3+2NV
01003  0400 00 0 01031    669          ADD      NB                MA=MASK ADDRESS.
01004  0601 00 0 01031    670          STØ      NB                FA=FØRMAT ADDRESS.
01005  0340 00 0 04074    671          CAS      =36
01006                     672          REM6
01007  0020 00 0 01016    673          TRA      BTL40
01010  0500 00 1 00000    674  BTL32   CLA      **,1              **=MA+3=FA+5+2NV
01011  0621 00 0 01013    675          STA      *+2
01012 -0500 60 0 01056    676          CAL*     NAA
01013  0767 00 0 00000    677          ALS      **
01014  2 00002 1 01000    678          TIX      BTL28,1,2
01015                     679          REM6
01016  0500 00 0 01056    680  BTL40   CLA      NAA               UPDATE NAA.
01017  0400 00 0 04060    681          ADD      =1
01020  0601 00 0 01056    682          STØ      NAA
01021  2 00002 1 00775    683          TIX      BTL26,1,2         RETURN TØ BTL26.
                          684 * NØW THE MASK IS DØNE. SET THE NUMBER
                          685 * ØF SIDE RELATIØNS TØ ZERØ AND EXIT.
01022                     686          EXIT     2,4

                          688 * DUMP SECTIØN.
01025                     689  DUMP    HPRINT   CARD,18
01027  0074 00 4 77000    690          TSX      ENDJØB,4

                          692 *  STØRAGE
01030  0 00000 0 00000    693  V                                  NUMBER ØF VARIABLES.
01031  0 00000 0 00000    694  NB                                 NUMBER ØF BITS.
01032  0 00000 0 00000    695  E                                  NUMBER ØF EXP. WØRDS
01033  402646514421       696  CARD    BCI      3,-FØRMAT CARD.
01034  636023215124
01035  336060606060
01036  606060606060       697  A       BCI      7,
01037  606060606060
01040  606060606060
01041  606060606060
01042  606060606060
01043  606060606060
01044  606060606060
01045  606060606060       698          BCI      8,
01046  606060606060
01047  606060606060
01050  606060606060
01051  606060606060
01052  606060606060
01053  606060606060
01054  606060606060
01055  0 00000 0 00000    699  LV                                 ADDRESS FØR V.
01056  0 00000 0 00000    700  NAA                                NEXT AVAILABLE ADDRESS.
01057  0 00000 0 00000    701  NAME                               NAME.
```

```
01060  0 00000 0 00000    702 SHNAME                              SHIFTED NAME.
01061  0 00000 0 00000    703  SW                                 SWITCH. ØN IF NEXT CHARACTER
                          704                                     IS TØ BE READ FRØM NEW CARD.
01062  0 00000 0 00000    705  BIT
01063  0 00000 0 00000    706 TENBIT
```

```
PAGE 14                                                                          13:32:18   09/25/64  JØB 3773

                                  708         HEAD    C
                                              ENTRY   PØLRDD
                                  710 * STEP 1.  INITIALIZE.
                                  711 PØLRDD ENTER    DUMP
 01070                            719         PØLHDA  1,4
 01101  0621 00 0 01235           720         STA     HA
 01102  0737 00 1 00000           721         PAC     ,1
 01103  0500 00 0 00033           722         CLA     $B
 01104  0601 00 1 00000           723         STØ     0,1
 01105  0500 00 4 00002           724         CLA     2,4
 01106  0601 00 1 00001           725         STØ     1,1
 01107  0600 00 1 00002           726         STZ     2,1
 01110  0737 00 2 00000           727         PAC     ,2
 01111  0500 00 2 00000           728         CLA     0,2
 01112  0400 00 0 04060           729         ADD     =1
 01113  0601 00 0 01237           730         STØ     W
 01114  0500 00 2 00001           731         CLA     1,2
 01115  0767 00 0 00001           732         ALS     1
 01116  0621 00 0 01147           733         STA     2V
 01117  0400 00 4 00002           734         ADD     2,4
 01120  0400 00 0 04062           735         ADD     =3
 01121  0621 00 0 01154           736         STA     BIT
                                  737 * STEP 2.  READ NEXT TERM.
                                  738 * STEP 2A.   CØNVERT AND SAVE CØEFFICIENT.
                                  739 *          IF ZERØ, GØ ØN TØ STEP 3.
 01122  0520 00 0 01240           740         ZET     CVSW
 01123  0020 00 0 01127           741         TRA     CV
 01124  0074 00 4 77016           742         TSX     XXXCSH,4
 01125  0 00000 0 00000           743         PZE                       FØRMATLESS CØNVERSIØN.
 01126  0020 00 0 01132           744         TRA     PRØC
 01127  0074 00 4 77053           745 CV      TSX     XXXDBC,4
 01130  0 00000 0 00000           746 A       PZE     **,,**            DECREMENT (BUFFER LENGTH) NØT USED IN
 01131  0 00000 0 00000           747         PZE                       FØRMATLESS CØNVERSIØN.
 01132 -1 00000 0 00000           748 PRØC    STR                       CØNVERT AND
 01133 -0600 00 0 01232           749         STQ     CØEFF             STØRE CØEFFICIENT.
 01134 -0520 00 0 01232           750         NZT     CØEFF
 01135  0020 00 0 01210           751         TRA     ST3
 01136                            752         PØLBSS  CFF,W(TRA ØT1)
                                  753 * STØRE THE CØEFFICIENT.
 01142  0500 00 0 01232           754         CLA     CØEFF
 01143  0601 00 0 00000           755 CFF     STØ     **
 01144  0500 00 0 00033           756         CLA     $B
 01145  0400 00 0 04060           757         ADD     =1
 01146  0601 00 0 00033           758         STØ     $B
                                  759 * STEP 2D.  CØNVERT, PACK, AND STØRE V EXPØNENTS.
                                  760 *         CØUNT VARIABLES ØN IR1, BITS ØN IR2, WØRDS ØN IR4.
 01147  0774 00 1 00000           761 2V      AXT     **,1              INITIALIZE.
 01150  0774 00 2 00000           762         AXT     0,2
 01151  0774 00 4 00000           763         AXT     0,4
 01152 -1 00000 0 00000           764 LØØP    STR                       CØNVERT AND
 01153 -0600 00 0 01233           765         STQ     EXP               STØRE EXPØNENT.
 01154  0500 00 1 00000           766 BIT     CLA     **,1              BIT NUMBER INTØ AC.   (**=FA+3+2V.)
 01155  0621 00 0 01162           767         STA     BIT1
 01156  0621 00 0 01170           768         STA     BIT2
```

```
PAGE 15                                                                13:32:18   09/25/64  JØB 3773

01157  0767 00 0 00022   769           ALS    18
01160  0622 00 0 01173   770           STD    BIT3
01161  0500 00 0 04060   771           CLA    =1                      TEST FØR ØVERFLØW
01162  0767 00 0 00000   772   BIT1    ALS    **
01163 -0340 00 0 01233   773           LAS    EXP
01164  0020 00 0 01167   774           TRA    *+3
01165  0020 00 0 01226   775           TRA    ØT2
01166  0020 00 0 01226   776           TRA    ØT2
01167  0500 60 0 00033   777           CLA*   $B
01170  0767 00 0 00000   778   BIT2    ALS    **
01171  0361 00 0 01233   779           ACL    EXP
01172  0602 60 0 00033   780           SLW*   $B
01173  1 00000 2 01174   781   BIT3    TXI    *+1,2,**                 INCREMENT BIT CØUNT.
01174 -3 00043 2 01202   782           TXL    TIX,2,35                 IF LESS THAN 36, GØ TØ TIX.
01175  0774 00 2 00000   783           AXT    0,2                      BIT CØUNT=36.  RESET IT TØ ZERØ,
01176  1 00001 4 01177   784           TXI    *+1,4,1                  AND INCREMENT WØRD CØUNT.
01177  0500 00 0 00033   785           CLA    $B
01200  0400 00 0 04060   786           ADD    =1
01201  0601 00 0 00033   787           STØ    $B
01202  2 00002 1 01152   788   TIX     TIX    LØØP,1,2
                         789 * STEP 2F.  INCREMENT N AND RETURN TØ STEP 2A.
01203  0535 00 1 01235   790           LAC    HA,1
01204  0500 00 1 00002   791           CLA    2,1
01205  0400 00 0 04060   792           ADD    =1
01206  0601 00 1 00002   793           STØ    2,1
01207  0020 00 0 01132   794           TRA    PRØC
                         795 * STEP 3.  PUT THE PØLYNØMIAL INTØ CANØNICAL FØRM.
01210  0074 00 4 77004   796   ST3     TSX    XXXRET,4
01211  0074 00 4 01334   797           TSX    PØLCFM,4
01212  0 00000 0 01235   798           PZE    HA
01213  0621 00 0 00033   799           STA    $B
01214                    800           EXIT   ØUT
01217  0520 00 0 01240   801   ØUT     ZET    CVSW
01220  0020 00 4 00004   802           TRA    4,4
01221  0020 00 4 00003   803           TRA    3,4

01222  0602 00 0 01236   805   ØT1     SLW    PSAC
01223  0074 00 4 77004   806           TSX    XXXRET,4
01224 -0500 00 0 01236   807           CAL    PSAC
01225                    808           REM3
01226  0602 00 0 01236   809   ØT2     SLW    PSAC
01227  0074 00 4 77004   810           TSX    XXXRET,4
01230 -0500 00 0 01236   811           CAL    PSAC
01231                    812           REM2

                         814 * STØRAGE.
01232  0 00000 0 00000   815   CØEFF
01233  0 00000 0 00000   816   EXP
01234  0 00000 0 00000   817   E
01235  0 00000 0 00000   818   HA
01236  0 00000 0 00000   819   PSAC
01237  0 00000 0 00000   820   W


PAGE 16                                                                13:32:18   09/25/64  JØB 3773

                         830           ENTRY  RFNHDT
                         831 *  INITIALIZE STØRAGE.
01247  0634 00 1 01263   832   RFNHDT  SXA    RES,1
01250  0500 60 4 00001   833           CLA*   1,4
01251  0737 00 1 00000   834           PAC    ,1
01252  3 00000 1 01254   835           TXH    *+2,1,0
01253                    836           REM4
01254  0560 00 1 00002   837           LDQ    2,1
01255  0500 00 1 00000   838           CLA    0,1
01256  0402 00 0 04065   839           SUB    =6
01257  0120 00 0 01265   840           TPL    PØL
01260  0400 00 0 04066   841           ADD    =8
01261  0621 00 0 01264   842           STA    *+3
01262  0500 00 1 00001   843           CLA    1,1
01263  0774 00 1 00000   844   RES     AXT    **,1
01264  0020 00 4 00000   845           TRA    **,4
01265  0500 60 1 00001   846   PØL     CLA*   1,1
01266  0534 00 1 01263   847           LXA    RES,1
01267  0020 00 4 00010   848           TRA    8,4


                         851           ENTRY  RFNDPH
01270  0634 00 1 01306   852   RFNDPH  SXA    END,1
01271 -0500 60 4 00001   853           CAL*   1,4
01272  0400 00 0 04062   854           ADD    =3
01273  0734 00 1 00000   855           PAX    ,1
01274  3 00077 1 01276   856           TXH    *+2,1,63
01275                    857           REM4                           STØRING ØVEP SYSTEM
01276  0621 00 0 01304   858           STA    NEW
01277 -0500 60 4 00002   859           CAL*   2,4
01300  0400 00 0 04062   860           ADD    =3
01301  0621 00 0 01303   861           STA    ØLD
01302  0774 00 1 00003   862           AXT    3,1
01303  0500 00 1 00000   863   ØLD     CLA    **,1
01304  0601 00 1 00000   864   NEW     STØ    **,1
01305  2 00001 1 01303   865           TIX    ØLD,1,1
01306  0774 00 1 00000   866   END     AXT    **,1
01307  0020 00 4 00003   867           TRA    3,4
```

```
PAGE 17                                                          13:32:18   09/25/64  JØB 3773

                                 870        ENTRY   PØLFMI
   01310 -0500 60 4 00001        871 PØLFMI CAL*    1,4
   01311  0400 00 0 04060        872        ADD     =1
   01312  0621 00 0 01313        873        STA     *+1
   01313  0500 00 0 00000        874        CLA     **                 FA INTØ AC.
   01314  0601 00 0 01332        875        STØ     FA
   01315  0400 00 0 04060        876        ADD     =1
   01316  0621 00 0 01317        877        STA     *+1
   01317  0500 00 0 00000        878        CLA     **                 V INTØ AC.
   01320  0601 00 0 01333        879        STØ     V
   01321  0767 00 0 00001        880        ALS     1
   01322  0400 00 0 01332        881        ADD     FA
   01323  0400 00 0 04061        882        ADD     =2                 MA=FA+2+2V.
   01324  0734 00 1 00000        883        PAX     0,1
   01325  0400 60 0 01332        884        ADD*    FA                 SRA=MA+F.
   01326  0734 00 2 00000        885        PAX     0,2
   01327  0500 00 0 01332        886        CLA     FA
   01330  0560 00 0 01333        887        LDQ     V
   01331  0020 00 4 00002        888        TRA     2,4
                                 889 * STØRAGE.
   01332  0 00000 0 00000        890  FA
   01333  0 00000 0 00000        891  V
```

```
PAGE 18                                                          13:32:18   09/25/64  JØB 3773

                                 893        HEAD    G
                                            ENTRY   PØLCFM
                                 895 * STEP 1. ENTER.
                                 896 PØLCFM ENTER   ENDJØB
   01340 -0500 60 4 00001        902  ST2   CAL*    1,4
   01341  0601 00 0 01540        903        STØ     HA
   01342  0400 00 0 04061        904        ADD     =2
   01343  0621 00 0 01526        905        STA     LN
   01344  0500 60 0 01540        906        CLA*    HA
   01345  0601 00 0 01407        907        STØ     DA
                                 908 * STEP 3.  TEST HEADING.
   01346  0074 00 4 01247        909        TSX     RFNHDT,4
   01347  0 00000 0 01540        910        PZE     HA
   01350                         911        REM4
   01351                         912        REM4
   01352                         913        REM4
   01353                         914        REM4
   01354                         915        REM4
   01355                         916        REM4
   01356 -0600 00 0 01541        917        STQ     N                  PØLYNØMIAL RETURN. N IN MQ
   01357  0601 00 0 01542        918        STØ     E                  E IN AC.
   01360  0400 00 0 04060        919        ADD     =1
   01361  0601 00 0 01543        920        STØ     W
   01362  0601 00 0 01551        921        STØ     SAVE
   01363  0131 00 0 00000        922        XCA                        N INTØ AC.
   01364  0100 00 0 01527        923        TZE     ST6                IF N IS ZERØ
   01365  0402 00 0 04060        924        SUB     =1                 ØR ØNE,
   01366  0100 00 0 01527        925        TZE     ST6                GØ TØ STEP 6.
   01367  0534 00 4 01542        926        LXA     E,4
   01370 -0634 00 4 01466        927        SXD     E1,4
   01371  1 00001 4 01372        928        TXI     *+1,4,1
   01372 -0634 00 4 01427        929        SXD     W1,4
   01373 -0634 00 4 01455        930        SXD     W2,4
   01374 -0634 00 4 01505        931        SXD     W3,4
   01375 -0634 00 4 01506        932        SXD     W4,4
   01376 -0634 00 4 01575        933        SXD     W5,4
   01377 -0634 00 4 01610        934        SXD     W6,4
   01400  0634 00 4 01602        935        SXA     W7,4
   01401 -0634 00 4 01621        936        SXD     W8,4
   01402 -0634 00 4 01627        937        SXD     W9,4
   01403 -0634 00 4 01511        938        SXD     ST5C,4
                                 939 * STEP 4.  SØRT.
   01404  0500 00 0 04060        940        CLA     =1
   01405  0601 00 0 01710        941        STØ     K
   01406  0074 00 4 01553        942        TSX     SØRT,4
   01407  0 00000 0 00000        943  DA    PZE     **
   01410  0 00000 0 01541        944        PZE     N
                                 945 * STEP 5.  SQUASH.
   01411  0560 00 0 01543        948        LDQ     W
   01412  0200 00 0 01541        949        MPY     N
   01413 -0600 00 0 01544        950        STQ     WW
   01414  0534 00 1 01544        951        LXA     WW,1
   01415  0534 00 2 01544        952        LXA     WW,2
   01416 -0634 00 2 01507        953        SXD     WW1,2
```

```
PAGE 19                                                                                    13:32:18   09/25/64  JØB 3773

 01417  0131 00 0 00000   954          XCA
 01420  0400 00 0 01407   955          ADD    DA
 01421  0621 00 0 01545   956          STA    LCI
 01422  0621 00 0 01546   957          STA    LCJ
 01423  0400 00 0 04060   958          ADD    =1
 01424  0621 00 0 01547   959          STA    LEI
 01425  0621 00 0 01550   960          STA    LEJ
 01426  0140 00 0 01427   961          TØV    *+1                  TURN ØFF AC ØVERFLØW LIGHT.
 01427  2 00000 1 01444   962   W1     TIX    ST5B,1,**            **=W. INCREMENT I AND
 01430                    963          REM6                          GØ TØ STEP 5B. SINCE N IS
                          964                                        AT LEAST 2, THE TIX CANNØT FAIL.

                          966 *  STEP 5A. SET J=1. MØVE THE I TERM INTØ THE J PØSITIØN
                          967 *                AND INCREMENT I.
 01431  0534 00 2 01544   968   ST5A   LXA    WW,2
 01432  0500 60 0 01545   969          CLA*   LCI                  MØVE THE
 01433  0601 60 0 01546   970          STØ*   LCJ                  CØEFFICIENT.
 01434  0534 00 4 01542   971          LXA    E,4
 01435  2 00001 1 01436   972   BTL2   TIX    *+1,1,1
 01436  2 00001 2 01437   973          TIX    *+1,2,1
 01437 -0500 60 0 01545   974          CAL*   LCI                  MØVE THE
 01440  0602 60 0 01546   975          SLW*   LCJ                  EXPØNENTS
 01441  2 00001 4 01435   976          TIX    BTL2,4,1
 01442  0534 00 2 01544   977          LXA    WW,2                 RESTØRE J TØ 1.
 01443 -2 00001 1 01511   978          TNX    ST5C,1,1             INCREMENT I.
                          979 *  STEP 5B. CØMPARE THE I AND J TERMS.
 01444  0634 00 1 01551   980   ST5B   SXA    SAVE,1
 01445 -0634 00 2 01551   981          SXD    SAVE,2
 01446  0534 00 4 01542   982          LXA    E,4
 01447 -0500 60 0 01547   983   BTL4   CAL*   LEI                  CØMPARE EXPØNENTS.
 01450 -0340 60 0 01550   984          LAS*   LEJ
 01451  0020 00 0 01453   985          TRA    *+2
 01452  0020 00 0 01471   986          TRA    TSTMR                MAYBE THE SAME.  TEST MØRE.
 01453  0534 00 1 01551   987          LXA    SAVE,1               DIFFERENT. RESTØRE
 01454 -0534 00 2 01551   988          LXD    SAVE,2               INDEX REGISTERS.
 01455  2 00000 2 01456   989   W2     TIX    *+1,2,**             **=W. INCREMENT J.
 01456  0500 60 0 01545   990          CLA*   LCI                  MØVE THE
 01457  0601 60 0 01546   991          STØ*   LCJ                  CØEFFICIENT.
 01460  0534 00 4 01542   992          LXA    E,4
 01461  2 00001 1 01462   993   BTL6   TIX    *+1,1,1
 01462  2 00001 2 01463   994          TIX    *+1,2,1
 01463 -0500 60 0 01545   995          CAL*   LCI                  MØVE THE
 01464  0602 60 0 01546   996          SLW*   LCJ                  EXPØNENTS.
 01465  2 00001 4 01461   997          TIX    BTL6,4,1
 01466  1 00000 2 01467   998   E1     TXI    *+1,2,**             ** =E. RESTØRE J.
 01467  2 00001 1 01444   999          TIX    ST5B,1,1             INCREMENT I AND REPEAT ST5B.
 01470  0020 00 0 01511  1000          TRA    ST5C
 01471 -2 00001 4 01475  1001   TSTMR  TNX    CØMB,4,1
 01472  2 00001 2 01473  1002          TIX    *+1,2,1
 01473  2 00001 1 01447  1003          TIX    BTL4,1,1
 01474                   1004          REM6
 01475  0534 00 1 01551  1005   CØMB   LXA    SAVE,1               EXPØNENTS SAME.
 01476 -0534 00 2 01551  1006          LXD    SAVE,2               RESTØRE INDEX REGISTERS.
 01477  0500 60 0 01545  1007          CLA*   LCI                  CØMBINE
```

```
01500                     1008          CAD*    LCJ
01503  0601 60 0 01546    1009          STØ*    LCJ                THE
01504 -0100 00 0 01506    1010          TNZ     *+2                TERMS.
01505  1 00000 2 01506    1011  W3      TXI     *+1,2,**
01506 -2 00000 1 01511    1012  W4      TNX     ST5C,1,**          **=W. IF ZERØ, BACKSPACE J.
01507 -3 00000 2 01444    1013  WW1     TXL     ST5B,2,**          INCREMENT I.
01510  0020 00 0 01431    1014          TRA     ST5A               **=WW.
                          1015 * STEP 5C.  FIX UP N.
01511  2 00000 2 01513    1016  ST5C    TIX     *+2,2,**
01512  0774 00 2 00000    1017          AXT     0,2                **=W.  INCREMENT  J.
01513  0600 00 0 01551    1018          STZ     SAVE
01514  0634 00 2 01551    1019          SXA     SAVE,2
01515  0500 00 0 01544    1020          CLA     WW
01516  0402 00 0 01551    1021          SUB     SAVE
01517  0601 00 0 01551    1022          STØ     SAVE
01520  0131 00 0 00000    1023          XCA                        NEW TØTAL NUMBER ØF WØRDS.
01521 -0754 00 0 00000    1024          ZAC
01522  0221 00 0 01543    1025          DVP     W
01523  0100 00 0 01525    1026          TZE     *+2
01524                     1027          REM6
01525 -0600 00 0 01541    1028          STQ     N
01526 -0600 00 0 00000    1029  LN      STQ     **
                          1030 * STEP 6.  USE PØLHCV.  IF P CØNSTANT, STØRE ZERØ AT SAVE.
01527  0074 00 4 01711    1031  ST6     TSX     PØLHCV,4
01530  0 00000 0 01540    1032          PZE     HA
01531  0600 00 0 01551    1033          STZ     SAVE
                          1034 *  STEP 7. RESTØRE INDEX REGISTERS AND RETURN TØ (2,4)
                          1035 *          WITH NEXT AVAILABLE ADDRESS IN AC.
01532  0500 00 0 01407    1036          CLA     DA
01533  0400 00 0 01551    1037          ADD     SAVE
01534                     1038  ØUT     EXIT    2,4

01537  0 00000 0 00000    1040 *STØRAGE  FØR  MAIN  PART  ØF  PØLCFM.
                          1041  PDL     PZE     **                 ** = HEADING ADDRESS ØF PRECEDING
                          1042                                          BLØCK IN PUSH-DØWN LIST.
01540  0 00000 0 00000    1043  HA                                 HEADING ADDRESS.
01541  0 00000 0 00000    1044  N                                  NUMBER ØF TERMS.
01542  0 00000 0 00000    1045  E                                  EXP WØRDS PER TERM.
01543  0 00000 0 00000    1046  W                                  WØRDS PER TERM.
01544  0 00000 0 00000    1047  WW                                 TØTAL WØRDS
01545  0 00000 1 00000    1048  LCI             **,1               **=DA+WW
01546  0 00000 2 00000    1049  LCJ             **,2               **=DA+WW
01547  0 00000 1 00000    1050  LEI             **,1               **=DA+WW+1
01550  0 00000 2 00000    1051  LEJ             **,2               **=DA+WW+1
01551  0 00000 0 00000    1052  SAVE
01552  0 00000 0 00000    1053  SQSW

                          1055 *  SØRT.
                          1056 * STEP 1.  SAVE IR4 IN PDL AND SAVE ARGUMENTS.
01553  0634 00 4 01700    1057  SØRT    SXA     A,4
01554  0500 00 4 00001    1058          CLA     1,4
01555  0601 00 0 01701    1059          STØ     BA
01556  0500 60 4 00002    1060          CLA*    2,4
```

```
PAGE 21                                                                  13:32:18    09/25/64  JØB 3773

                           * STEP 2.  PERMUTE THE CØEFFICIENT AND THE K-EXP-WØRD.
01557  0131 00 0 00000               XCA                      CØMPUTE
01560  0200 00 0 01543               MPY     W                LENGTH
01561 -0600 00 0 01702               STQ     BWW              ØF BLØCK.
01562  0131 00 0 00000               XCA
01563  0400 00 0 01701               ADD     BA
01564  0621 00 0 01704               STA     LCCI
01565  0400 00 0 01710               ADD     K
01566  0621 00 0 01703               STA     LEEI
01567  0534 00 1 01702               LXA     BWW,1
01570 -0634 00 1 01601               SXD     BW1,1
01571 -0500 60 0 01704         BTL20 CAL*    LCCI
01572  0560 60 0 01703               LDQ*    LEEI
01573  0602 60 0 01703               SLW*    LEEI
01574 -0600 60 0 01704               STQ*    LCCI
01575  2 00000 1 01571         W5    TIX     BTL20,1,**       **=W.
                           * STEP 3.  CALL FAPSTL.
01576  0500 00 0 01701               CLA     BA
01577  0621 00 0 01601               STA     BW1
01600  0074 00 4 00002               CALL    FAPSTL
01601  0 00000 0 00000         BW1   PZE     **,,**           BA,,BWW
01602  0 00000 0 00000         W7    PZE     **               **=W.
                           * STEP 4.  UNDØ STEP 2.
01603  0534 00 1 01702               LXA     BWW,1
01604 -0500 60 0 01704         BTL21 CAL*    LCCI.
01605  0560 60 0 01703               LDQ*    LEEI
01606  0602 60 0 01703               SLW*    LEEI
01607 -0600 60 0 01704               STQ*    LCCI
01610  2 00000 1 01604         W6    TIX     BTL21,1,**       **=W
                           * STEP 5.  IF K=E, GØ TØ STEP 10.
01611  0500 00 0 01710               CLA     K
01612  0340 00 0 01542               CAS     E
01613                                REM6
01614  0020 00 0 01676               TRA     S10
                           * STEP 6.  FIND THE NEXT SUB-BLØCK.
01615  0534 00 1 01702               LXA     BWW,1
01616  0634 00 1 01705         BTL22 SXA     IRA,1
01617 -0500 60 0 01703               CAL*    LEEI             K-EXP-WØRD ØF NEXT TERM IN BLØCK.
01620  0602 00 0 01551               SLW     SAVE
01621 -2 00000 1 01676         W8    TNX     S10,1,**         **=W.  IF SUB-BLØCK CØNSISTS SØLELY
                                                              ØF THE LAST TERM, GØ TØ STEP 10.
01622 -0500 60 0 01703         BTL24 CAL*    LEEI
01623 -0340 00 0 01551               LAS     SAVE             CØMPARE  EXP  TØ  SAVE.
01624  0020 00 0 01631               TRA     ENDSB            IF  GREATER, GØ  TØ  ENDSB.
01625  0020 00 0 01627               TRA     *+2
01626                                REM6
01627  2 00000 1 01622         W9    TIX     BTL24,1,**       **=W.
01630  0774 00 1 00000               AXT     0,1
01631  0634 00 1 01706         ENDSB SXA     IRB,1            END SUB-BLØCK
01632  0500 00 0 01705               CLA     IRA
01633  0402 00 0 01706               SUB     IRB              CØMPUTE LENGTH ØF SUB-BLØCK.
01634  0131 00 0 00000               XCA
01635 -0754 00 0 00000               ZAC
01636  0221 00 0 01543               DVP     W                CØMPUTE AND

PAGE 22                                                                  13:32:18    09/25/64  JØB 3773

01637 -0600 00 0 01707               STQ     SBN              STØRE NUMBER ØF TERMS.
01640  0500 00 0 01701               CLA     BA
01641  0400 00 0 01702               ADD     BWW
01642  0402 00 0 01705               SUB     IRA
01643  0601 00 0 01662               STØ     SBA              CØMPUTE AND STØRE SUB-BLØCK ADDRESS.
01644  0500 00 0 01707               CLA     SBN
01645  0340 00 0 04060               CAS     =1               CØMPARE  SBN  TØ  ØNE.
01646  0020 00 0 01651               TRA     S7               IF GREATER, GØ  TØ  STEP 7.
01647  0020 00 0 01616               TRA     BTL22            IF EQUAL, REPEAT STEP 6.
01650                                REM6
                           * STEP 7. UPDATE K AND SAVE BLØCK IN PDL.
01651  0500 00 0 01710         S7    CLA     K
01652  0400 00 0 04060               ADD     =1
01653  0601 00 0 01710               STØ     K
01654 -0634 00 1 01700               SXD     A,1
01655  0074 00 4 03532               TSX     PDLSAV,4
01656  0 00000 0 01537               PZE     PDL
01657  0 00000 0 01700               PZE     A
01660  0 00000 0 04063               PZE     =4
                           *  STEP  8.  SØRT  THE  SUB-BLØCK.
01661  0074 00 4 01553               TSX     SØRT,4
01662  0 00000 0 00000         SBA   PZE     **               **=SBA
01663  0 00000 0 01707               PZE     SBN
                           * STEP 9. RESTØRE K AND RESTØRE BLØCK FRØM PDL.
01664  0500 00 0 01710               CLA     K
01665  0402 00 0 04060               SUB     =1
01666  0601 00 0 01710               STØ     K
01667  0074 00 4 03611               TSX     PDLRST,4
01670  0 00000 0 01537               PZE     PDL
01671  0 00000 0 01700               PZE     A
01672  0 00000 0 04063               PZE     =4
01673 -0534 00 1 01700               LXD     A,1
01674 -3 00000 1 01676               TXL     S10,1,0          IF SUB-BLØCK WAS THE LAST, GØ ØN TØ STEP 10.
01675  0020 00 0 01616               TRA     BTL22            ØTHERWISE GØ BACK TØ STEP 6.
                           * STEP 10.  RESTØRE IR4 AND RETURN TØ (3,4).
01676  0534 00 4 01700         S10   LXA     A,4
01677  0020 00 4 00003               TRA     3,4

                           *  STØRAGE  TØ  BE  SAVED  IN  PUSH-DØWN  LIST.
01700  0 00000 0 00000         A                              SAVE IR1 IN DECREMENT, IR4 IN ADDRESS
01701  0 00000 0 00000         BA                             BLØCK  ADDRESS.
01702  0 00000 0 00000         BWW                            TØTAL WØRDS IN BLØCK.
01703  0 00000 1 00000         LEEI  PZE     **,1             **=BA+BWW+K.
                           *  ØTHER  STØRAGE FØR  SØRT.
01704  0 00000 1 00000         LCCI  PZE     **,1             **=BA+BWW.
01705  0 00000 0 00000         IRA
01706  0 00000 0 00000         IRB
01707  0 00000 0 00000         SBN                            SUB-BLØCK  NUMBER  ØF  TERMS.
01710  0 00000 0 00000         K                              SØRTING  INDEX.
```

```
PAGE 23                                                                         13:32:18   09/25/64  JØB 3773

                                1165          HEAC     H
                                1166          ENTRY    PØLHCV
                                1167 PØLHCV   ENTER    ENDJØB
 01715  0500 60 4 00001         1168          CLA*     1,4
 01716  0601 00 0 01764         1169          STØ      HA
 01717  0074 00 4 01247         1170          TSX      RFNHDT,4
 01720  0 00000 0 01764         1171          PZE      HA
 01721                          1172          REM4
 01722                          1173          REM4
 01723                          1174          REM4
 01724                          1175          REM4
 01725                          1176          REM4
 01726  0020 00 0 01756         1177          TRA      END2-3
 01727  0400 00 0 04060         1178          ADD      =1
 01730  0621 00 0 01742         1179          STA      W
 01731  0131 00 0 00000         1180          XCA                            N INTØ AC.
 01732 -0100 00 0 01735         1181          TNZ      *+3
 01733  0600 00 0 01765         1182          STZ      CØEFF                 IF ZERØ, P=0.
 01734  0020 00 0 01753         1183          TRA      CØNST
 01735  0402 00 0 04060         1184          SUB      =1
 01736 -0100 00 0 01761         1185          TNZ      END2                  IF N GREATER THAN 1,  GØ TØ END2.
                                1186 * N=1.  TEST FURTHER.
 01737  0500 60 0 01764         1187          CLA*     HA                    DATA ADDRESS INTØ AC.
 01740  0400 00 0 01742         1188          ADD      W
 01741  0621 00 0 01750         1189          STA      LCI
 01742  0774 00 4 00000         1190 W        AXT      **,4
 01743  0500 60 0 01750         1191          CLA*     LCI                   VERIFY THAT
 01744  0601 00 0 01765         1192          STØ      CØEFF
 01745 -0100 00 0 01747         1193          TNZ      *+2                   THE CØEFFICIENT
 01746                          1194          REM6                           IS NØN-ZERØ.
 01747  2 00001 4 01750         1195          TIX      *+1,4,1
 01750 -0500 00 4 00000         1196 LCI      CAL      **,4
 01751 -0100 00 0 01761         1197          TNZ      END2                  IF EXPØNENT IS NØN-ZERØ, GØ TØ END2.
 01752  2 00001 4 01750         1198          TIX      *-2,4,1
                                1199 * PØLYNØMIAL IS A CØNSTANT.  STØRE IT USING HCV.
 01753  0074 00 4 01775         1200 CØNST    TSX      PØLSTC,4
 01754  0 00000 0 01764         1201          PZE      HA
 01755  0 00000 0 01765         1202          PZE      CØEFF
 01756                          1203          EXIT     2,4
                                1204 * PØLYNØMIAL NØT CØNSTANT.  RESTØRE IR4 AND RETURN TØ (3,4).
 01761                          1205 END2     EXIT     3,4

                                1207 * STØRAGE.
 01764  0 00000 0 00000         1208 HA                                      HEADING ADDRESS
 01765  0 00000 0 00000         1209 CØEFF


PAGE 24                                                                         13:32:18   09/25/64  JØB 3773

                                              ENTRY    PØLPRT
 02163 -0625 00 0 02760         1315 PØLPRT   STL      PRTSW                 SET SWITCH FØR PRINT

 02164  0634 00 1 02342         1323 BEG      SXA      ØUTA,1
 02165  0634 00 2 02343         1324          SXA      ØUTA+1,2
 02166  0634 00 4 02344         1325          SXA      ØUTA+2,4
 02167  0500 60 4 00001         1326          CLA*     1,4                   PUTS HEADING ADDRESS IN AC
 02170  0601 00 0 02347         1327          STØ      HA
 02171  0600 00 0 02362         1328          STZ      CFLAG
                                1329 * PRINT AND/ØR PUNCH NAME.
 02172 -0500 00 4 00002         1330          CAL      2,4
 02173  0602 00 0 02371         1331          SLW      XX
 02174 -0500 00 4 00003         1332          CAL      3,4
 02175  0602 00 0 02372         1333          SLW      XX+1
 02176 -0500 00 4 00004         1334          CAL      4,4
 02177  0602 00 0 02373         1335          SLW      XX+2
 02200 -0500 00 4 00005         1336          CAL      5,4
 02201 -0320 00 0 04127         1337          ANA      =Ø777777770000
 02202 -0501 00 0 04102         1338          ØRA      =Ø6060
 02203  0602 00 0 02374         1339          SLW      XX+3

 02204                          1342          HPRINT   XX,4
 02206 -0520 00 0 02761         1343          NZT      PCHSW
 02207  0020 00 0 02216         1344          TRA      HDT
 02210 -0500 00 0 04115         1345          CAL      =Ø60000000000
 02211 -0602 00 0 02371         1346          ØRS      XX
 02212 -0500 00 0 04125         1347          CAL      =Ø607777777777
 02213  0320 00 0 02371         1348          ANS      XX
 02214                          1349 PCH      HPUNCH   XX,4
                                1350 * TEST HEADING.
 02216 -0520 00 0 02362         1351 HDT      NZT      CFLAG
 02217  0020 00 0 02222         1352          TRA      *+3
 02220  0500 00 0 02360         1353          CLA      CØN
 02221  0020 00 0 02332         1354          TRA      CØNST
 02222 -0520 00 0 02347         1355          NZT      HA
 02223  0074 00 4 02407         1356          TSX      EMPTR,4
 02224  0074 00 4 01247         1357          TSX      RFNHDT,4
 02225  0 00000 0 02347         1358          PZE      HA
 02226  0074 00 4 02421         1359          TSX      NØRFN,4

 02227  0400 00 0 04060         1365          ADD      =1
 02230  0601 00 0 02354         1366          STØ      W
 02231  0200 00 0 02354         1367          MPY      W
 02232 -0600 00 0 02355         1368          STQ      WW
 02233  0074 00 4 01310         1369          TSX      PØLFMI,4
 02234  0 00000 0 02347         1370          PZE      HA
 02235  0634 00 1 02356         1371          SXA      LNAMV,1               IR1 CØNTAINS MA=FA+2+2V.
 02236  1 00001 1 02237         1372          TXI      *+1,1,1
 02237  0634 00 1 02351         1373          SXA      LBJ,1
 02240  0131 00 0 00000         1374          XCA                            V INTØ THE AC.
 02241  0767 00 0 00001         1375          ALS      1
```

```
02242  0601 00 0 02350    1376         STØ    2V
02243  0500 60 0 02347    1377         CLA*   HA
02244  0601 00 0 02346    1378         STØ    DA
                          1379 * PRINT VARIABLE NAMES. IF PCHSW ØN, REPLACE IT BY MZE.

02245 -0500 00 0 04105    1387         CAL    =H+
02246  0602 00 0 03016    1388         SLW    C4
02247 -0500 00 0 02755    1389         CAL    PAD2
02250  0602 00 0 02727    1390         SLW    HPRT
02251  0534 00 1 02350    1391         LXA    2V,1
02252  0560 60 0 02356    1392   LØØP  LDQ*   LNAMV            NAME ØF VARIABLE INTØ THE MQ.
02253 -2 00002 1 02257    1393         TNX    LSTV,1,2
02254  0074 00 4 02605    1394         TSX    BCD,4
02255 +000000000060       1395         ØCT    60
02256  0020 00 0 02252    1396         TRA    LØØP
02257  0074 00 4 02605    1397   LSTV  TSX    BCD,4
02260  0 00000 0 00000    1398         PZE

                          1432 * PRINT AND/ØR PUNCH PØLYNØMIAL.
02261  0500 00 0 02346    1433   PØLY  CLA    DA
02262  0400 00 0 02355    1434         ADD    WW
02263  0340 00 0 00034    1435         CAS    $C
02264  0074 00 4 02433    1436         TSX    DATØV,4
02265  0020 00 0 02266    1437         TRA    *+1
02266  0621 00 0 02357    1438         STA    LDWI
02267  0534 00 1 02355    1439         LXA    WW,1
02270  0534 00 2 02350    1440   START LXA    2V,2
02271  0500 60 0 02357    1441         CLA*   LDWI
02272  0074 00 4 02506    1442         TSX    CØEFF,4
02273  2 00001 1 02274    1443         TIX    *+1,1,1
02274  0560 60 0 02357    1444   STRNG LDQ*   LDWI
02275  0500 60 0 02351    1445   BIT1  CLA*   LBJ
02276  0621 00 0 02302    1446         STA    SHIFT
02277  0400 00 0 02353    1447         ADD    CØUNT
02300  0601 00 0 02353    1448         STØ    CØUNT
02301 -0754 00 0 00000    1449         ZAC
02302 -0763 00 0 00000    1450   SHIFT LGL    **               EXPØNENT INTØ AC.
02303  0602 00 0 02352    1451         SLW    EMQ              IF 36 BITS, INTERPRET
02304  0500 00 0 02352    1452         CLA    EMQ              FIRST BIT AS A SIGN.
02305 -2 00002 2 02322    1453         TNX    LAST,2,2
02306 -0600 00 0 02352    1454         STQ    EMQ
02307  0074 00 4 02531    1455         TSX    INTGR,4
02310 +000000000060       1456         ØCT    60
02311  0560 00 0 02352    1457         LDQ    EMQ
02312  0500 00 0 02353    1458         CLA    CØUNT
02313  0340 00 0 04074    1459         CAS    =36
02314  0074 00 4 02426    1460         TSX    NØFMT,4
02315  0020 00 0 02317    1461         TRA    *+2
02316  0020 00 0 02275    1462         TRA    BIT1
02317  0600 00 0 02353    1463         STZ    CØUNT
02320  2 00001 1 02274    1464         TIX    STRNG,1,1
02321  0074 00 4 02426    1465         TSX    NØFMT,4
```

```
PAGE 26                                                                     13:32:18    09/25/64  JOB 3773

02322  0074 00 4 02531   1466  LAST  TSX    INTGR,4
02323  0 00000 0 00000   1467        PZE
02324  0500 00 0 02353   1468        CLA    COUNT
02325  0402 00 0 04074   1469        SUB    =36
02326  0100 00 0 02330   1470        TZE    *+2
02327  0074 00 4 02426   1471        TSX    NOFPT,4
02330  0600 00 0 02353   1472        STZ    COUNT
02331  2 00001 1 02270   1473        TIX    START,1,1

                         1479 * PRINT AND / OR PUNCH CONSTANT.
02332  0560 00 0 04105   1480  CONST LDQ    =H+
02333 -0600 00 0 03016   1481        STQ    C4
02334  0560 00 0 02755   1482        LDQ    PA02
02335 -0600 00 0 02727   1483        STQ    HPRT
02336  0074 00 4 02506   1484        TSX    COEFF,4
02337  0 00000 0 00000   1485        PZE
02340  0520 00 0 02363   1486  OUT   ZET    RFLAG
02341  0020 00 0 00000   1487  RETN  TRA    **
02342  0774 00 1 00000   1488  OUTA  AXT    **,1
02343  0774 00 2 00000   1489        AXT    **,2
02344  0774 00 4 00000   1490        AXT    **,4
02345  0020 00 4 00006   1491        TRA    6,4

                         1543 * STORAGE.

02346  0 00000 0 00000   1545  DA                              DATA ADDRESS.
02347  0 00000 0 00000   1546  HA                              HEADING ADDRESS
02350  0 00000 0 00000   1547  2V                              V=NO. OF VARIABLES.
02351  0 00000 2 00000   1548  LBJ          **,2              LOC. OF BIT NO. (**=FA+3+2V).
02352  0 00000 0 00000   1549  EMQ
02353  0 00000 0 00000   1550  COUNT
02354  0 00000 0 00000   1551  W                               WORDS/TERM.
02355  0 00000 0 00000   1552  WW                              TOTAL WORDS
02356  0 00000 1 00000   1553  LNAMV        **,1              LOC. OF NAME OF VARIABLE (**=FA+2+2V)
02357  0 00000 1 00000   1554  LDWI         **,1              **=DA+WW
02360  0 00000 0 00000   1555  CON
02361  0 00000 0 00000   1556  DEN
02362  0 00000 0 00000   1557  CFLAG
02363  0 00000 0 00000   1558  RFLAG
02364  004564442551      1563  NUMN  BCI    2,ONUMERATOR
02365  216346516060
02366  002425454644      1564  DENN  BCI    2,ODENOMINATOR
02367  314521634651
02370  006060254524      1565  R4    BCI    1,0  END
02371  606060606060      1566  XX    BCI    4,
02372  606060606060
02373  606060606060
02374  606060606060
02375                    1567        BSS    10                WORKING SPACE FOR HPUNCH.

PAGE 27                                                                     13:32:18    09/25/64  JOB 3773

LITERALS
   04131 IS THE FIRST LOCATION NOT USED BY THIS PROGRAM
  NO ERROR IN ABOVE ASSEMBLY
```

* APPENDIX II

```
                                  HEAD     B
                                  ENTRY    PØLØMØ
                          * PØLØMØ. ØNE-TERM MULTIPLY AND ØVERWRITE. P=Ø*P.
                          PØLØMØ  ENTER    DUMP
00410  0500 60 4 00001            CLA*     1,4
00411  0601 00 0 00626            STØ      Ø
00412  0500 60 4 00002            CLA*     2,4
00413  0601 00 0 00627            STØ      P
00414                             RFNHDT   Ø
00416                             REM4
00417                             REM4
00420                             REM4
00421                             REM4
00422                             REM4
00423  0020 00 0 00573            TRA      ØCNST
00424  0131 00 0 00000            XCA
00425  0340 00 0 04412            CAS      =1
00426                             REM4
00427  0020 00 0 00431            TRA      *+2
00430                             REM4
00431                             RFNHDT   P
00433                             REM4
00434                             REM4
00435                             REM4
00436                             REM4
00437                             REM4
00440  0020 00 0 00600            TRA      PCNST
00441  0621 00 0 00531            STA      DNA
00442  0400 00 0 04412            ADD      =1
00443  0601 00 0 00632            STØ      W
00444  0734 00 1 00000            PAX      ,1
00445 -0634 00 1 00566            SXD      XIT,1
00446 -0600 00 0 00633            STQ      AC
00447  0200 00 0 00632            MPY      W
00450 -0600 00 0 00634            STQ      WW
00451  0535 00 1 00626            LAC      Ø,1
00452  0500 00 1 00001            CLA      1,1
00453  0601 00 0 00635            STØ      FA
00454                             PØLFMI   P
00456  0402 00 0 00635            SUB      FA
00457  0100 00 0 00461            TZE      *+2
00460                             REM5
00461  0634 00 2 00540            SXA      MASK,2             IR2 CØNTAINS SRA=MA+E.
                          * MULTIPLY P BY THE CØEFFICIENT ØF Ø.
00462  0500 60 0 00626            CLA*     Ø
00463  0621 00 0 00472            STA      SEQ
00464  0400 00 0 00632            ADD      W
```

```
PAGE 4                                                                 16:49:24     09/25/64   JØB 3773

00465  0621 00 0 00535    751         STA     LCØ
00466  0621 00 0 00536    752         STA     LCØ+1
00467 -0520 00 0 02263    753         NZT     E$N
00470  0020 00 0 00477    754         TRA     BEGN
00471  0074 00 4 02216    755         TSX     SUMEXP,4           SUM FIRST N EXPØNENTS ØF Ø
00472  0 00000 0 00000    756   SEQ   PZE     **
00473 -0340 00 0 00630    757         LAS     CRIT               IS SUM SMALL ENØUGH
00474  0020 00 0 00570    758         TRA     XERØX
00475  0761 00 0 00000    759         NØP
00476  0602 00 0 00631    760         SLW     ØSUM
                          761 * START MULTIPLICATIØN.
00477  0534 00 1 00634    762   BEGN  LXA     WW,1
00500  0534 00 4 00634    763         LXA     WW,4
00501  0500 60 0 00627    764         CLA*    P
00502  0621 00 0 00517    765         STA     CALL
00503  0400 00 0 00634    766         ADD     WW
00504  0621 00 0 00533    767         STA     JLØØP
00505  0621 00 0 00542    768         STA     LCPP
00506  0560 60 0 00533    769   ILØØP LDQ*    JLØØP
00507                     770         CMP     /I/SEQ
00512 -0600 60 0 00542    771         STQ*    LCPP
00513 -0520 00 0 02263    772         NZT     E$N
00514  1 77777 4 00531    773         TXI     JLØØP-2,4,-1       SKIP THE CØEFFICIENT
00515  0634 00 4 00520    774         SXA     *+3,4
00516  0074 00 4 02216    775         TSX     SUMEXP,4
00517  0 00000 0 00000    776   CALL  PZE     **
00520  0774 00 4 00000    777         AXT     **,4
00521  0140 00 0 00522    778         TØV     *+1
00522  0400 00 0 00631    779         ADD     ØSUM
00523 -0140 00 0 00525    780         TNØ     *+2
00524                     781         REM2
00525 -0340 00 0 00630    782         LAS     CRIT               IS TERM KEPT
00526  0020 00 0 00563    783         TRA     ZERØ
00527  0761 00 0 00000    784         NØP
00530  1 77777 4 00531    785         TXI     *+1,4,-1
00531  0774 00 2 00000    786   DNA   AXT     **,2
00532  1 77777 1 00533    787         TXI     *+1,1,-1
00533 -0500 00 1 00000    788   JLØØP CAL     **,1               **=DA(P)+WW(P).
00534  0044 00 0 00000    789         PAI
00535  0361 00 2 00000    790   LCØ   ACL     **,2               **=DA(Ø)+W.
00536  0440 00 2 00000    791         IIS     **,2               **=DA(Ø)+W.
00537  0041 00 0 00000    792         IIA
00540  0444 00 2 00000    793   MASK  ØFT     **,2               **=MA+E.
00541                     794         REM2
00542  0602 00 4 00000    795   LCPP  SLW     **,4               **=DA(P)+WW(P).
                          796 * IR1 AND IR4 DIFFER ØNLY IF TRUNCATIØN ØCCURS.
00543 -2 00001 1 00552    797         TNX     END,1,1
00544  1 77777 4 00545    798         TXI     *+1,4,-1
00545  2 00001 2 00533    799         TIX     JLØØP,2,1
00546 -0500 00 0 00517    800   HAG   CAL     CALL
00547  0400 00 0 00632    801         ADD     W
00550  0621 00 0 00517    802         STA     CALL
00551  0020 00 0 00506    803         TRA     ILØØP
00552 -2 00001 2 00554    804   END   TNX     *+2,2,1
```

```
PAGE 5                                                                 16:49:24     09/25/64   JØB 3773

00553                     805         REM6
00554  0535 00 1 00627    806         LAC     P,1
00555  0500 00 0 00633    807         CLA     AC
00556  0100 00 0 00570    808         TZE     XERØX              ALL TERMS ARE TRUNCATED.
00557  0601 00 1 00002    809         STØ     2,1                RE-SET TERM CØUNT
00560                     810   EXIT  EXIT    3,4
00563  0500 00 0 00633    811   ZERØ  CLA     AC                 DECREMENT TERM CØUNT
00564  0402 00 0 04412    812         SUB     =1
00565  0601 00 0 00633    813         STØ     AC
00566  2 00000 1 00546    814   XIT   TIX     HAG,1,**           **=W.
00567  0020 00 0 00554    815         TRA     END+2
00570                     816   XERØX PØLSTZ  P
00572  0020 00 0 00560    817         TRA     EXIT

                          819 * Ø CØNSTANT.  SET P=AC*P.
00573  0601 00 0 00633    820   ØCNST STØ     AC
00574                     821         PØLSMØ  AC,P
00577  0020 00 0 00560    822         TRA     EXIT

                          824 * P CØNSTANT. SET P=AC*Ø.
00600  0601 00 0 00633    825   PCNST STØ     AC
00601                     826         PØLSMP  P,AC,Ø
00605  0020 00 0 00560    827         TRA     EXIT

                          829 * DUMP SECTIØN.
00606                     830   DUMP  HPRINT  R3,1
00610                     831         PØLPRT  Ø,-
00616                     832         PØLPRT  P,-
00624  0074 00 4 77000    833         TSX     ENDJØB,4
00625  404713465447       834   R3    BCI     1,-P=Ø*P

                          836 * STØRAGE.
00626  0 00000 0 00000    837   Ø
00627  0 00000 0 00000    838   P
00630  0 00000 0 00000    839   CRIT
00631  0 00000 0 00000    840   ØSUM
00632  0 00000 0 00000    841   W
00633  0 00000 0 00000    842   AC
00634  0 00000 0 00000    843   WW
00635  0 00000 0 00000    844   FA
```

```
PAGE 6                                                                         16:49:24    09/25/64  JØB 3773

                                  846 * PØLØMP.  ØNE-TERM MULTIPLY.  Q=Ø*P WHERE Ø IS A MØNØMIAL.
                                  847          ENTRY    PØLØMP
                                  848          HEAD     Y
                                  849 PØLØMP   ENTER    DUMP
  00642  0600 00 0 00710          850          STZ      Q
  00643  0600 00 0 00714          851          STZ      PP
  00644  0500 60 4 00002          852          CLA*     2,4
  00645  0601 00 0 00711          853          STØ      Ø
  00646  0500 60 4 00003          854          CLA*     3,4
  00647  0601 00 0 00712          855          STØ      P
  00650                           856          PØLHDA   1,4
  00667  0601 00 0 00710          857          STØ      Q
  00670                           858          RFNRTC
  00671  0601 00 0 00713          859          STØ      CSA
  00672                           860          PØLDUP   PP,P                  PP=P
  00675                           861          PØLØMØ   Ø,PP                  PP=Ø*PP=Ø*P
  00700                           862          RFNDPH   Q,PP                  Q=PP=Ø*P
  00703  0500 00 0 00713          863          CLA      CSA
  00704                           864          RFNUDC
  00705                           865          EXIT     4,4

                                  867 * STØRAGE.
  00710  0 00000 0 00000          868  Q
  00711  0 00000 0 00000          869  Ø
  00712  0 00000 0 00000          870  P
  00713  0 00000 0 00000          871  CSA
  00714  0 00000 0 00000          872  PP
```

```
PAGE 7                                                                         16:49:24    09/25/64  JØB 3773

                                  880 * PØLADD.  THIS IS ACCØMPLISHED BY MERGING THE TERMS SØ THAT THE CANØN-
                                  881 * ICAL ØRDER IS PRESERVED AND THAT TERMS ARE ADDED AND CANCELLED THAT
                                  882 * SHØULD BE.  THE ANSWER IS PRØDUCED BELØW THE B PØINTER.  ØVSW IS ZERØ.

                                  884 * PØLADØ.  SAME AS ABØVE ØNLY THE MERGE IS PRØDUCED WHERE P IS
                                  885 * RATHER THAN BELØW THE B PØINTER.  ØVSW IS NØN-ZERØ

                                  890          HEAD     D
                                  891          ENTRY    PØLADD,PØLADØ
                                  892 PØLADD   ENTER    DUMP
  00745  0020 00 0 00752          893          TRA      PUA
                                  894 PØLADØ   ENTER    DUMP
  00752 -0500 00 4 00002          896  PUA     CAL      2,4                   STØRE ØVSW--NØN-ZERØ IMPLIES ØVW.
  00753  0630 00 0 01516          897          STP      ØVSW
  00754 -0500 00 4 00003          898          CAL      3,4
  00755  0630 00 0 01517          899          STP      ESW                   STØRE ESW--NØN-ZERØ IMPLIES ERASE
  00756  0500 60 4 00002          900          CLA*     2,4
  00757  0601 00 0 01506          901          STØ      P
  00760  0500 60 4 00003          902          CLA*     3,4
  00761  0601 00 0 01507          903          STØ      Q
  00762                           904          PØLHDA   1,4
  01001  0601 00 0 01505          905          STØ      R
                                  906 * IF HA(P)=HA(Q), DØ PØLSMP ØR PØLSMØ  =2.
  01002  0500 00 0 01506          907          CLA      P
  01003  0402 00 0 01507          908          SUB      Q
  01004  0100 00 0 01470          909          TZE      PEQ
  01005  0535 00 1 01506          910          LAC      P,1
  01006  0535 00 2 01507          911          LAC      Q,2
                                  912 * TEST HEADINGS.
                                  913 * IF EITHER P ØR Q ARE CØNSTANT, STØRE IT FØLLØWED BY ALL ZERØ EXPØNENTS
                                  914 * JUST BELØW B.  IF BØTH ARE CØNSTANT, ADD THEM AND EXIT.
  01007                           915          RFNHDT   P
  01011                           916          REM4
  01012                           917          REM4
  01013                           918          REM4
  01014                           919          REM4
  01015                           920          REM4
  01016  0020 00 0 01424          921          TRA      PCØN
  01017  0621 00 0 01174          922          STA      AGH
  01020  0400 00 0 04412          923          ADD      =1
  01021  0601 00 0 01513          924          STØ      W
  01022 -0600 00 0 01511          925          STQ      NP
  01023  0600 00 0 01523          926          STZ      PCSW
  01024                           927  TQ      RFNHDT   Q
  01026                           928          REM4
  01027                           929          REM4
  01030                           930          REM4
  01031                           931          REM4
  01032                           932          REM4
  01033  0020 00 0 01427          933          TRA      QCØN
  01034  0600 00 0 01524          934          STZ      QCSW
  01035  0621 00 0 01174          935          STA      AGH
  01036  0400 00 0 04412          936          ADD      =1
  01037  0601 00 0 01513          937          STØ      W
```

```
01040 -0600 00 0 01512          STQ     NQ
01041 -0520 00 0 01523          NZT     PCSW
01042  0020 00 0 01056          TRA     PPØL
                      * P CØNSTANT, Q PØLYNØMIAL. STØRE CØN AT B FØLLØWED BY ZERØ EXPS.
01043                           PØLBSS  (0,1)W
01047  0500 00 2 00001          CLA     1,2
01050  0601 00 1 00001          STØ     1,1
01051  0500 00 0 04412          CLA     =1
01052  0601 00 1 00002          STØ     2,1
01053  0601 00 0 01511          STØ     NP
01054  0500 00 1 00000          CLA     0,1
01055  0020 00 0 01445          TRA     STZ
                      * CHECK FØRMAT CØMPATIBILITY
01056  0500 00 1 00001    PPØL  CLA     1,1
01057  0601 00 0 01514          STØ     FA
01060  0402 00 2 00001          SUB     1,2
01061  0100 00 0 01063          TZE     *+2
01062                           REM5
                      * IF ERASE SWITCH IS ØN AND NP LESS THAN NQ, INTERCHANGE P AND Q.
01063 -0520 00 0 01517          NZT     ESW
01064  0020 00 0 01100          TRA     GØ
01065  0500 00 0 01511          CLA     NP
01066  0402 00 0 01512          SUB     NQ
01067  0120 00 0 01100          TPL     GØ
01070  0500 00 0 01511          CLA     NP
01071  0560 00 0 01512          LDQ     NQ
01072  0601 00 0 01512          STØ     NQ
01073 -0600 00 0 01511          STQ     NP
01074  0500 00 0 01506          CLA     P
01075  0560 00 0 01507          LDQ     Q
01076  0601 00 0 01507          STØ     Q
01077 -0600 00 0 01506          STQ     P
01100  0534 00 4 01513    GØ    LXA     W,4
01101 -0634 00 4 01204          SXD     EPØ,4
01102 -0634 00 4 01233          SXD     T3,4
01103 -0634 00 4 01252          SXD     T11,4
01104 -0634 00 4 01260          SXD     T12,4
01105 -0634 00 4 01262          SXD     CHQ,4
01106 -0634 00 4 01265          SXD     T5,4
01107 -0634 00 4 01275          SXD     T7,4
01110  0560 00 0 01513          LDQ     W
01111  0200 00 0 01512          MPY     NQ
01112  0131 00 0 00000          XCA
01113  0621 00 0 01310          STA     QPTR
01114  0601 00 0 01521          STØ     WWQ
01115  0560 00 0 01513          LDQ     W
01116  0200 00 0 01511          MPY     NP
01117  0131 00 0 00000          XCA
01120  0621 00 0 01210          STA     PPTR
                      * IF ØVERWRITE, ØPEN GAP AFTER P ØF SIZE WWQ, ØTHERWISE MAKE SPACE AT B
                      * ØF SIZE WWP+WWQ. IF INSUF. SPACE, USE WHAT IS AVAILABLE AND HØPE FØR
                      * ENØUGH CANCELLATIØNS.
01121 -0520 00 0 01516          NZT     ØVSW
01122  0020 00 0 01133          TRA     ETH
```

```
01123                     PØLØPG  P,WWQ,LAST,NØP
01130  0500 60 0 01506            CLA*    P
01131  0621 00 0 01515            STA     DAR
01132  0020 00 0 01145            TRA     ØG
01133  0500 00 0 01210     ETH    CLA     PPTR
01134  0400 00 0 01310            ADD     QPTR
01135  0621 00 0 01520            STA     SPACE
01136                             PØLBSS  DAR,SPACE,NØP
01142                             RFNRTC
01143  0601 00 0 01510            STØ     LAST
01144  0500 00 0 01515            CLA     DAR
01145  0621 00 0 01214     ØG     STA     HR
                           * THE FIRST UNAVAILABLE STØRAGE IS C IF NØ ØVW AND IS THE DATA ADDRESS
                           * ØF THE NEXT PØLY. IF ØVW. AND IS C IF P IS SUPREME.
01146  0534 00 4 01510            LXA     LAST,4
01147 -0634 00 4 01205            SXD     EPØ+1,4
01150 -0634 00 4 01234            SXD     T3+1,4
01151 -0634 00 4 01266            SXD     T5+1,4
01152 -0634 00 4 01276            SXD     T7+1,4
01153 -0634 00 4 01325            SXD     T9+1,4
01154 -0634 00 4 01343            SXD     T10+1,4
01155  0500 60 0 01506            CLA*    P
01156  0400 00 0 01210            ADD     PPTR
01157  0621 00 0 01177            STA     HP
01160  0621 00 0 01347            STA     BEP
01161  0500 60 0 01507            CLA*    Q
01162  0400 00 0 01310            ADD     QPTR
01163  0621 00 0 01200            STA     HQ
01164  0621 00 0 01331            STA     BEQ
01165  0621 00 0 01313            STA     BEQ1
                           * SET TCT=NP+NQ.  IF TERMS CANCEL, SET TCT=TCT-2.  IF TERMS CØLLECT, SET
                           * TCT=TCT-1.
01166  0500 00 0 01511            CLA     NP
01167  0400 00 0 01512            ADD     NQ
01170  0601 00 0 01510            STØ     TCT
                           * START LØØKING FØR WHERE TØ MERGE TERMS.
01171  0534 00 1 01210            LXA     PPTR,1
01172  0534 00 2 01310            LXA     QPTR,2
01173                             ØDD
01173  0140 00 0 01174            TØV     *+1                   TURN ØFF THE ØVERFLØW LIGHT
01174  0774 00 4 00000     AGH    AXT     **,4                  **=E
01175  1 77777 1 01176     LØØP   TXI     *+1,1,-1              SKIP CØEFFICIENT
01176  1 77777 2 01177            TXI     *+1,2,-1
                           * CØMPARE TERMS TØ SEE WHERE THEY SHØULD BE MERGED.
01177 -0500 00 1 00000     HP     CAL     **,1                  **=BES ADDRESS ØF P
01200 -0340 00 2 00000     HQ     LAS     **,2                  **=BES ADDRESS ØF Q
                           * Q TERM BELØNGS AHEAD ØF P TERM.  GØ CØPY Q TERM INTØ ANSWER.
01201  0020 00 0 01264            TRA     CØPQ
                           * TERMS SØ FAR EQUAL.
01202  0020 00 0 01221            TRA     TIX
                           * P TERM BELØNGS AHEAD ØF Q TERM.  GØ CØPY P TERM INTØ ANSWER.
01203                             ØDD
01203  0534 00 4 01214            LXA     HR,4
01204  1 00000 4 01205     EPØ    TXI     *+1,4,**              **=E+1
```

```
01205 -3 00000 4 01207        TXL   *+2,4,**
01206                         REM3                  **=FIRST UNAVAILABLE STØRAGE
01207  0634 00 4 01214        SXA   HR,4            NØ RØØM TØ CØPY TERM.
01210  0774 00 1 00000  PPTR  AXT   **,1
01211  0534 00 2 01310        LXA   QPTR,2          **=(NP REMAINING)*(E+1)
01212 -0534 00 4 01204        LXD   EPØ,4
01213 -0500 60 0 01177        CAL*  HP
01214  0602 00 4 00000  HR    SLW   **,4            **=BES ADDRESS ØF R
01215 -2 00001 1 01322        TNX   ØUTQ,1,1      IF P IS EXHAUSTED, APPEND REST ØF Q
01216  2 00001 4 01213        TIX   *-3,4,1
01217  0634 00 1 01210        SXA   PPTR,1
01220  0020 00 0 01174        TRA   AGH
01221  2 00001 4 01175  TIX   TIX   LØØP,4,1
                        * THE TERMS ARE EQUAL.  ADD THE CØEFFICIENTS.  THIS PART ALØNE DEPENDS
                        * ØN THE PRECISIØN ØF THE CØEFFS.
01222  0534 00 1 01210        LXA   PPTR,1
01223  0534 00 2 01310        LXA   QPTR,2
01224  0500 60 0 01177        CLA*  HP
01225                         CAD*  HQ
01230  0100 00 0 01255        TZE   ØN              TERMS CANCEL
01231  0534 00 4 01214        LXA   HR,4
01232  0634 00 4 01237        SXA   SCF,4
01233  1 00000 4 01234  T3    TXI   *+1,4,**        **=E+1
01234 -3 00000 4 01236        TXL   *+2,4,**        **=FIRST UNAVAILABLE STØRAGE
01235                         REM3                  NØ RØØM TØ CØPY TERM
01236  0634 00 4 01214        SXA   HR,4
01237  0601 00 0 00000  SCF   STØ   **              **=BSS ADDRESS ØF TERM, STØRE CØEFF
01240  0500 00 0 01510        CLA   TCT             ADJUST TERM CØUNT
01241  0402 00 0 04412        SUB   =1
01242  0601 00 0 01510        STØ   TCT
01243  0534 00 4 01174        LXA   AGH,4
01244  1 77777 1 01245        TXI   *+1,1,-1
01245 -0500 60 0 01177        CAL*  HP              CØPY EXPØNENTS
01246  0602 60 0 01214        SLW*  HR
01247 -2 00001 1 01262        TNX   CHQ,1,1         IF P IS EXHAUSTED, CHECK Q
01250  2 00001 4 01245        TIX   *-3,4,1
01251  0634 00 1 01210  ØTH   SXA   PPTR,1
01252 -2 00000 2 01336  T11   TNX   ØUTP,2,**       **=EPØ  IF Q EXHAUSTED APPEND P
01253  0634 00 2 01310        SXA   QPTR,2
01254  0020 00 0 01174        TRA   AGH
01255  0500 00 0 01510  ØN    CLA   TCT             ADJUST TERM CØUNT
01256  0402 00 0 04413        SUB   =2
01257  0601 00 0 01510        STØ   TCT
01260 -2 00000 1 01262  T12   TNX   CHQ,1,**        **=EPØ  IF P EXHAUSTED CHECK Q
01261  0020 00 0 01251        TRA   ØTH
01262  2 00000 2 01322  CHQ   TIX   ØUTQ,2,**       **=EPØ
01263  0020 00 0 01352        TRA   END-3           IF Q ALSØ EXHAUSTED, DØNE
                        * CØPY Q TERM
01264  0534 00 4 01214  CØPQ  LXA   HR,4
01265  1 00000 4 01266  T5    TXI   *+1,4,**        **=EPØ
01266 -3 00000 4 01270        TXL   *+2,4,**        **=FIRST UNAVAILABLE SPACE
01267                         REM3                  NØ RØØM TØ CØPY TERM
01270  0634 00 4 01214        SXA   HR,4
01271 -0520 00 0 01516        NZT   ØVSW
```

```
01272  0020 00 0 01310          TRA     QPTR
                       * ØPEN GAP IN P ØF SIZE EPØ IF ØVW.
01273                           ØDD
01273  0534 00 4 01177          LXA     HP,4
01274  0634 00 4 01304          SXA     HPP,4
01275  1 00000 4 01276   T7     TXI     *+1,4,**            **=E+1
01276 -3 00000 4 01300          TXL     *+2,4,**            **=FIRST UNAVAILABLE SPACE
01277                           REM3                        NØ RØØM TØ ØPEN GAP
01300  0634 00 4 01177          SXA     HP,4                RESET HP
01301  0534 00 1 01210          LXA     PPTR,1
01302 -0634 00 1 01307          SXD     T8,1
01303  0774 00 1 00001          AXT     1,1
                       * THE FØLLØWING LØØP ØPENS THE GAP AND MUST RUN FRØM HIGH TØ LØW CØRE.
01304 -0500 00 1 00000   HPP    CAL     **,1                **=ØLD HP
01305  0602 60 0 01177          SLW*    HP
01306  1 00001 1 01307          TXI     *+1,1,1
01307 -3 00000 1 01304   T8     TXL     HPP,1,**            **=NØ. WØRDS TØ CØPY
01310  0774 00 2 00000   QPTR   AXT     **,2                **=(NQ REMAINING)*(E+1)
01311  0534 00 1 01210          LXA     PPTR,1
01312 -0534 00 4 01204          LXD     EPØ,4
01313 -0500 00 2 00000   BEQ1   CAL     **,2                **=BES ØF Q
01314  0602 60 0 01214          SLW*    HR
01315 -2 00001 2 01336          TNX     ØUTP,2,1            IF Q EXHAUSTED APPEND REST ØF P
01316  2 00001 4 01313          TIX     *-3,4,1
01317  0634 00 2 01310          SXA     QPTR,2
01320  0020 00 0 01174          TRA     AGH
01321  0774 00 0 00000          EVEN
01322 -0634 00 2 01324   ØUTQ   SXD     T9,2                APPEND THE REST ØF Q
01323  0534 00 4 01214          LXA     HR,4
01324  1 00000 4 01325   T9     TXI     *+1,4,**            **=NØ. WØRDS TØ APPEND
01325 -3 00000 4 01327          TXL     *+2,4,**            **=FIRST UNAVAILABLE SPACE
01326                           REM3                        NØ RØØM TØ APPEND
01327  0634 00 4 01214          SXA     HR,4
01330 -0534 00 4 01324          LXD     T9,4
01331 -0500 00 4 00000   BEQ    CAL     **,4                **=BES ØF Q
01332  0602 60 0 01214          SLW*    HR
01333  2 00001 4 01331          TIX     BEQ,4,1
01334  0020 00 0 01352          TRA     END-3
01335  0774 00 0 00000          EVEN
01336  0520 00 0 01516   ØUTP   ZET     ØVSW                APPEND THE REST ØF P
01337  0020 00 0 01355          TRA     END                 IF ØVW, REST ØF P ALREADY IN PLACE
01340 -0634 00 1 01342          SXD     T10,1
01341  0534 00 4 01214          LXA     HR,4
01342  1 00000 4 01343   T10    TXI     *+1,4,**            **=NØ. WØRDS TØ APPEND
01343 -3 00000 4 01345          TXL     *+2,4,**            **=FIRST UNAVAILABLE SPACE
01344                           REM3                        NØ RØØM TØ APPEND
01345  0634 00 4 01214          SXA     HR,4
01346 -0534 00 4 01342          LXD     T10,4
01347 -0500 00 4 00000   BEP    CAL     **,4                **=BES ØF P
01350  0602 60 0 01214          SLW*    HR
01351  2 00001 4 01347          TIX     BEP,4,1
01352 -0500 00 0 01214          CAL     HR
01353 -0520 00 0 01516          NZT     ØVSW                DØ NØT RENUDB IF ØVW
01354  0621 60 0 00000          STA*    $B
```

```
                             1154 * PUT P AND Q BACK IN CØNSTANT CØNVENTIØN.
01355  0535 00 1 01506       1155  END    LAC     P,1
01356  0535 00 2 01507       1156         LAC     Q,2
01357  0500 60 1 00000       1157         CLA*    0,1
01360  0560 60 2 00000       1158         LDQ*    0,2
01361  0441 00 0 04415       1159         LDI     =5
01362 -0520 00 0 01523       1160         NZT     PCSW
01363  0020 00 0 01366       1161         TRA     *+3
01364  0604 00 1 00000       1162         STI     0,1
01365  0601 00 1 00001       1163         STØ     1,1
01366 -0520 00 0 01524       1164         NZT     QCSW
01367  0020 00 0 01372       1165         TRA     *+3
01370  0604 00 2 00000       1166         STI     0,2
01371 -0600 00 2 00001       1167         STQ     1,2
                             1168 * IF ERASE SWITCH IS ØN, CLEAR P AND Q.
01372 -0520 00 0 01517       1169         NZT     ESW
01373  0020 00 0 01376       1170         TRA     FIXL
01374                        1171         CLEAR   P
01375                        1172         CLEAR   Q
                             1173 * FILL IN HEADING ØF ANSWER.  IF ERASE, HEADING ØF R = HEADING ØF P(BE-
                             1174 * FØRE ANY INTERCHANGE)
01376  0535 00 4 01505       1175  FIXL   LAC     R,4
01377  0500 00 0 01515       1176         CLA     DAR
01400  0601 00 4 00000       1177         STØ     0,4
01401  0500 00 0 01514       1178         CLA     FA
01402  0601 00 4 00001       1179         STØ     1,4
01403  0500 00 0 01510       1180         CLA     TCT
01404  0601 00 4 00002       1181         STØ     2,4               SET TERM CØUNT ØF ANSWER
01405                        1182         PØLHCV  R
01407  0020 00 0 01421       1183         TRA     ØUT
                             1184 * CHECK DATA BUFFER TØ SEE IF TERM WITH ZERØ CØEFF. IS PRESENT AND IF SØ
                             1185 * MAKE ADJUSTMENTS IN HEADING.
01410  0535 00 4 01505       1186         LAC     R,4
01411  0500 60 4 00000       1187         CLA*    0,4
01412 -0100 00 0 01421       1188         TNZ     ØUT
01413  0500 00 4 00000       1189         CLA     0,4
01414  0400 00 0 01513       1190         ADD     W
01415  0601 00 4 00000       1191         STØ     0,4
01416  0500 00 4 00002       1192         CLA     2,4
01417  0402 00 0 04412       1193         SUB     =1
01420  0601 00 4 00002       1194         STØ     2,4
01421                        1195  ØUT    FXIT    4,4

01424  0601 00 0 01522       1197  PCØN   STØ     CØN
01425 -0625 00 0 01523       1198         STL     PCSW
01426  0020 00 0 01024       1199         TRA     TQ
01427  0520 00 0 01523       1200  QCØN   ZET     PCSW
01430  0020 00 0 01457       1201         TRA     BCØN
01431  0601 00 0 01522       1202         STØ     CØN
01432 -0625 00 0 01524       1203         STL     QCSW
                             1204 * Q CØNSTANT, P PØLYNØMIAL.  STØRE CØN AT B FØLLØWED BY ZERØ EXPS.
01433                        1205         PØLBSS  (0,2)W
01437  0500 00 1 00001       1206         CLA     1,1
01440  0601 00 2 00001       1207         STØ     1,2
```

```
01441  0500 00 0 04412       1208         CLA     =1
01442  0601 00 2 00002       1209         STØ     2,2
01443  0601 00 0 01512       1210         STØ     NQ
01444  0500 00 2 00000       1211         CLA     0,2
01445  0621 00 0 01455       1212  STZ    STA     BX
01446  0400 00 0 01513       1213         ADD     W
01447                        1214         RFNUD6
01450  0621 00 0 01452       1215         STA     *+2
01451  0534 00 4 01513       1216         LXA     W,4
01452  0600 00 4 00000       1217         STZ     **,4              **=B+W
01453  2 00001 4 01452       1218         TIX     *-1,4,1
01454  0500 00 0 01522       1219         CLA     CØN
01455  0601 00 0 00000       1220  BX     STØ     **                **=B
01456  0020 00 0 01056       1221         TRA     PPØL
                             1222 * P AND Q ARE CØNSTANT.  ADD THEM AND EXIT.
                             1223 * THIS DEPENDS ØN CØEFF. PRECISIØN.
01457  0140 00 0 01460       1224  BCØN   TØV     *+1
01460                        1225         CAD     CØN
01463  0535 00 4 01505       1226         LAC     R,4
01464  0601 00 4 00001       1227         STØ     1,4
01465  0500 00 0 04415       1228         CLA     =5
01466  0601 00 4 00000       1229         STØ     0,4
01467  0020 00 0 01421       1230         TRA     ØUT
01470 -0520 00 0 01516       1231  PEQ    NZT     ØVSW
01471  0020 00 0 01500       1232         TRA     NØV
01472  0520 00 0 01517       1233         ZET     ESW
01473                        1234         REM4
01474                        1235         PØLSMØ  =2,P
01477  0020 00 0 01421       1236         TRA     ØUT
01500                        1237  NØV    PØLSMP  R,=2,P
01504  0020 00 0 01421       1238         TRA     ØUT
01505  0 00000 0 00000       1239  R
01506  0 00000 0 00000       1240  P
01507  0 00000 0 00000       1241  Q
01510  0 00000 0 00000       1242  TCT
01511  0 00000 0 00000       1243  NP
01512  0 00000 0 00000       1244  NQ
01513  0 00000 0 00000       1245  W
01514  0 00000 0 00000       1246  FA
01515  0 00000 0 00000       1247  DAR
01516  0 00000 0 00000       1248  ØVSW
01517  0 00000 0 00000       1249  ESW
01520  0 00000 0 00000       1250  SPACE
01521  0 00000 0 00000       1251  WWC
01522  0 00000 0 00000       1252  CØN
01523  0 00000 0 00000       1253  PCSW
```

```
                             1307 * E. MULTIPLY.

                             1309        HEAD     E
                             1325 PØLMPY ENTER    ENDJØB
01673  0600 00 0 02277       1326  STF   STZ      PS
01674  0600 00 0 02300       1327        STZ      TI
01675  0500 60 4 00002       1328        CLA*     2,4
01676  0601 00 0 02256       1329        STØ      P
01677  0500 60 4 00003       1330        CLA*     3,4
01700  0601 00 0 02257       1331        STØ      Q
01701  0600 00 0 02260       1332        STZ      R
01702                        1335        ØPT1E    PØLPRT(P,-,PØLMPY.IN)
01702                        1336        ØPT1E    PØLPRT(Q,-,PØLMPY.IN)
                             1337 * STEP 3.  FIND FREE DATA AREA.
01702                        1338        RFNRTB
01703  0601 00 0 02261       1339        STØ      B
01704                        1340        RFNRTC
01705  0601 00 0 02262       1341        STØ      C
01706  0402 00 0 02261       1342        SUB      B
01707  0601 00 0 02270       1343        STØ      GAP
                             1344 * STEP 4. TEST HEADINGS.
                             1345 *           TRANSFER IF P ØR Q IS CØNSTANT.
                             1346 *           IF P IS LØNGER THAN Q, EXCHANGE THEM.
                             1347 *           IF NP IS NØW EQUAL TØ ØNE, GØ TØ NP1.
01710                        1348        RFNHDT   P
01712                        1349        REM4
01713                        1350        REM4
01714                        1351        REM4
01715                        1352        REM4
01716                        1353        REM4
01717  0020 00 0 02171       1354        TRA      PCNST
01720  0400 00 0 04412       1355        ADD      =1
01721  0601 00 0 02273       1356        STØ      W
01722 -0600 00 0 02271       1357        STQ      NP
01723                        1358        RFNHDT   Q
01725                        1359        REM4
01726                        1360        REM4
01727                        1361        REM4
01730                        1362        REM4
01731                        1363        REM4
01732  0020 00 0 02203       1364        TRA      QCNST
01733 -0600 00 0 02272       1365        STQ      NQ
01734  0500 00 0 02272       1366        CLA      NQ
01735  0340 00 0 02271       1367        CAS      NP
01736  0020 00 0 01754       1368        TRA      ST5
01737  0020 00 0 01754       1369        TRA      ST5
01740  0500 00 0 02256       1370        CLA      P
01741  0560 00 0 02257       1371        LDQ      Q
01742 -0600 00 0 02256       1372        STQ      P
01743  0601 00 0 02257       1373        STØ      Q
01744  0500 00 0 02271       1374        CLA      NP
01745  0560 00 0 02272       1375        LDQ      NQ
01746 -0600 00 0 02271       1376        STQ      NP
01747  0601 00 0 02272       1377        STØ      NQ
```

```
01750 -0500 00 0 02265             CAL     PMAX
01751  0560 00 0 02267             LDQ     QMAX
01752  0602 00 0 02267             SLW     QMAX
01753 -0600 00 0 02265             STQ     PMAX
                           * STEP 5. BE SURE FØRMATS ARE THE SAME.
01754  0535 00 1 02256       ST5   LAC     P,1
01755  0535 00 2 02257             LAC     Q,2
01756  0500 00 1 00001             CLA     1,1
01757  0601 00 0 02254             STØ     FA
01760  0402 00 2 00001             SUB     1,2
01761  0100 00 0 01763             TZE     *+2
01762                              REM5
                           * STEP 6. TEST SPACE. IF SUFFICIENT FØR "LEAPFRØG METHØD"
                           *       TURN ØN LSW AND GØ TØ STEP 7. IF NØT,
                           *       CØLLECT GARBAGE AND TRY AGAIN. IF STILL NØT,
                           *       TURN ØFF LSW, AND SKIP TØ STEP 8.
01763 -0520 00 0 02263             NZT     N
01764  0020 00 0 02056             TRA     IGN              TEST FIRST HØWEVER FØR TRUNCATE
01765                              SETAD
02000                              MIMAX   P,NP,PMIN
02016                              MIMAX   Q,NQ,QMIN
02034  0140 00 0 02035             TØV     *+1
02035  0500 00 0 02267             CLA     QMAX
02036 -0120 00 0 02042             TMI     *+4
02037  0400 00 0 02264             ADD     PMIN
02040 -0140 00 0 02042             TNØ     *+2
02041                              REM2
02042  0601 00 0 00630             STØ     B$CRIT
02043  0500 00 0 02265             CLA     PMAX
02044 -0120 00 0 02054             TMI     ØUTP-1
02045  0400 00 0 02266             ADD     QMIN
02046 -0140 00 0 02050             TNØ     *+2
02047                              REM2
02050 -0340 00 0 00630             LAS     B$CRIT
02051  0020 00 0 02054             TRA     *+3
02052  0020 00 0 02054             TRA     *+2
02053  0602 00 0 00630             SLW     B$CRIT
02054 -0500 00 0 00630             CAL     B$CRIT
02055  0602 00 0 00000       ØUTP  SLW     **               ØRDER ØF P*Q TØ MAIN PRØGRAM
02056  0500 00 0 02271       IGN   CLA     NP
02057  0402 00 0 04412             SUB     =1
02060  0100 00 0 02211             TZE     NP1
02061  0600 00 0 02276             STZ     LSW
02062  0560 00 0 02272             LDQ     NQ
02063  0200 00 0 02273             MPY     W
02064 -0600 00 0 02274             STQ     WWQ
02065  0200 00 0 02271             MPY     NP
02066 -0600 00 0 02275             STQ     WWMAX
02067  0131 00 0 00000             XCA                      WWMAX=NP*NQ*W=NP*WWQ.
02070  0400 00 0 02274             ADD     WWQ
02071  0400 00 0 04416             ADD     =6
02072  0601 00 0 02270             STØ     GAP              SPACE FØR TWØ TEMPØRARY HEADINGS.
02073                              PØLBSS  B,GAP(TRA ST8)
02077 -0625 00 0 02276             STL     LSW
```

```
                                 * STEP 7. LSW ØN. INITIALIZE FØR "LEAPFRØG METHØD."
                                 *         SET DA(TI)=B+WWMAX. SET B=DA(PS)=B+WWMAX-WWQ.
02100  0500 00 0 02261                  CLA     B
02101  0400 00 0 02275                  ADD     WWMAX
02102  0601 00 0 02302                  STØ     DATI
02103  0402 00 0 02274                  SUB     WWQ
02104  0601 00 0 02301                  STØ     DAPS
02105                                   RFNUDB
                                 * STEP 8. SET DA(PI)=DA(P) AND SET I=1.
                                 *         THEN CØMPUTE PS=PI*Q.
02106  0500 60 0 02256           ST8    CLA*    P
02107  0601 00 0 02253                  STØ     DAPI
02110  0534 00 1 02271                  LXA     NP,1
02111                                   PØLØMP  PS,PI,Q
02115                                   ØPT2E   PØLPRT(PS,-)
02115  2 00001 1 02117                  TIX     *+2,1,1
02116                                   REM6
                                 * STEP 9. IF LSW IS ØN, SET B=DA(TI).
02117 -0520 00 0 02276                  NZT     LSW
02120  0020 00 0 02123                  TRA     ST10
02121  0500 00 0 02302           ST9    CLA     DATI
02122                                   RFNUDB
                                 * STEP 10. TI=PI*Q
02123  0500 00 0 02253           ST10   CLA     DAPI
02124  0400 00 0 02273                  ADD     W
02125  0601 00 0 02253                  STØ     DAPI
02126                                   PØLØMP  TI,PI,Q
02132                                   ØPT3E   PØLPRT(PI,-)
02132                                   ØPT3E   PØLPRT(TI,-)
                                 * STEP 11. PS=PS+TI.
                                 *          IF LSW IS ØN, SET B=DA(PS)=DA(PS)-WWQ, AND ADD.
                                 *          ØTHERWISE ADD USING PØLAØE.
02132 -0520 00 0 02276                  NZT     LSW
02133  0020 00 0 02146                  TRA     ST11B
02134  0500 00 0 02301                  CLA     DAPS
02135  0402 00 0 02274                  SUB     WWQ
02136  0601 00 0 02301                  STØ     DAPS
02137                                   RFNUDB
02140                                   PØLADD  PS,PS,TI
02144                                   ØPT2E   PØLPRT(PS,-)
02144  2 00001 1 02121                  TIX     ST9,1,1
02145  0020 00 0 02153                  TRA     ST12
02146                            ST11B  PØLAØE  PS,TI
02152                                   ØPT2E   PØLPRT(PS,-,PSAØE)
02152  2 00001 1 02123                  TIX     ST10,1,1
                                 * STEP 12. PS IS NØW EQUAL TØ P*Q.
                                 *          EXCHANGE IT WITH R.
02153                            ST12   RFNDPH  R,PS
                                 * STEP 13. RESTØRE C (ERASE TEMPØRARY HEADINGS).
02156  0500 00 0 02262                  CLA     C
02157                                   RFNUDC
02160 -0520 00 0 02263           ST14   NZT     N
02161  0020 00 0 02166                  TRA     TS
02162                                   PØLHCV  R
```

```
 02164  0020 00 0 02165   1486          TRA     *+1
 02165  0600 00 0 02263   1487          STZ     N
 02166                    1488   TS     ØPT1E   PØLPRT(PS,-,PØLMPY.ØUT)
 02166                    1489          EXIT    4,4

                          1491 * P CØNSTANT. R=AC*Q.
 02171  0601 00 0 02303   1492   PCNST  STØ     AC
 02172 -0500 00 0 02265   1493          CAL     PMAX
 02173  0560 00 0 02267   1494          LDQ     QMAX
 02174  0602 00 0 02267   1495          SLW     QMAX
 02175 -0600 00 0 02265   1496          STQ     PMAX
 02176                    1497          PØLSMP  R,AC,Q
 02202  0020 00 0 02166   1498          TRA     TS

                          1500 * Q CØNSTANT.  R=AC*P.
 02203  0601 00 0 02303   1501   QCNST  STØ     AC
 02204                    1502          PØLSMP  R,AC,P
 02210  0020 00 0 02166   1503          TRA     TS

                          1505 * NP=1. R=P*Q.
 02211                    1506   NP1    PØLØMP  R,P,Q
 02215  0020 00 0 02160   1507          TRA     ST14

 02216  0634 00 1 02245   1509   SUMEXP SXA     EN,1                SUM FIRST N EXPØNENTS ØF TERM AT 1,4
 02217  0634 00 2 02246   1510          SXA     EN+1,2
 02220  0500 00 4 00001   1511          CLA     1,4
 02221  0140 00 0 02222   1512          TØV     *+1
 02222  0737 00 2 00000   1513          PAC     ,2
 02223  0600 00 0 02250   1514          STZ     SUM
 02224  0774 00 1 00000   1515   AXT    AXT     **,1                2*N
 02225  0560 00 2 00001   1516          LDQ     1,2
 02226  0600 00 0 02251   1517          STZ     BITS
 02227  0500 00 1 00000   1518   HE     CLA     **,1                FA+2+2*N
 02230  0621 00 0 02237   1519          STA     SH
 02231  0400 00 0 02251   1520          ADD     BITS
 02232  0340 00 0 04420   1521          CAS     =36
 02233  1 77777 2 02225   1522          TXI     AXT+1,2,-1          GET NEW EXPØNENT WØRD
 02234  0761 00 0 00000   1523          NØP
 02235  0601 00 0 02251   1524          STØ     BITS
 02236 -0754 00 0 00000   1525          ZAC
 02237 -0763 00 0 00000   1526   SH     LGL     **
 02240  0400 00 0 02250   1527          ADD     SUM
 02241 -0140 00 0 02243   1528          TNØ     *+2
 02242                    1529          REM2
 02243  0601 00 0 02250   1530          STØ     SUM
 02244  2 00002 1 02227   1531          TIX     HE,1,2
 02245  0774 00 1 00000   1532   EN     AXT     **,1
 02246  0774 00 2 00000   1533          AXT     **,2
 02247  0020 00 4 00002   1534          TRA     2,4
 02250  0 00000 0 00000   1535   SUM
 02251  0 00000 0 00000   1536   BITS

                          1538 * PØINTER TØ PI (I-TH TERM ØF P).
 02252  0 00000 0 02253   1539   PI     PZE     *+1
```

```
                          1540 * HEADING FØR PI.
 02253  0 00000 0 00000   1541   DAPI   PZE     **                 **=DAP+W*(I-1)
 02254  0 00000 0 00000   1542   FA     PZE     **
 02255 +000000000001      1543          DEC     1
                          1544 * STØRAGE.
 02256  0 00000 0 00000   1545   P
 02257  0 00000 0 00000   1546   Q
 02260  0 00000 0 00000   1547   R
 02261  0 00000 0 00000   1548   B
 02262  0 00000 0 00000   1549   C
 02263  0 00000 0 00000   1550   N
 02264  0 00000 0 00000   1551   PMIN
 02265  0 00000 0 00000   1552   PMAX
 02266  0 00000 0 00000   1553   QMIN
 02267  0 00000 0 00000   1554   QMAX
 02270  0 00000 0 00000   1555   GAP
 02271  0 00000 0 00000   1556   NP
 02272  0 00000 0 00000   1557   NQ
 02273  0 00000 0 00000   1558   W
 02274  0 00000 0 00000   1559   WWQ
 02275  0 00000 0 00000   1560   WWMAX
 02276  0 00000 0 00000   1561   LSW
 02277  0 00000 0 00000   1562   PS
 02300  0 00000 0 00000   1563   TI
 02301  0 00000 0 00000   1564   DAPS
 02302  0 00000 0 00000   1565   DATI
 02303  0 00000 0 00000   1566   AC
```

```
***** REMØTE PRØGRAM CALLED BY END *****

LITERALS

 04426 IS THE FIRST LØCATIØN NØT USED BY THIS PRØGRAM

  NØ ERRØR IN ABØVE ASSEMBLY
```

What is claimed is:

1. The machine method of processing information constituted of at least one variable and associated parameters, which comprises the steps of 1. generating signals designating a first set of locations in a machine memory and storing the signals thus generated at a second set of locations identified with said information,
2. generating signals designating a third set of locations in said memory and storing the signals thus generated at the memory location of said first set,
3. generating signals representing the parameters of one variable and storing the signals thus generated at the memory location of said third set, and
4. generating format signals indicating the format of the signals generated at step (3) and the name of the variable associated with said variable and storing said format signals at a fourth set of memory locations.

2. The method as defined in claim 1 wherein the signals generated by step (2) further designate locations of said memory for the format of said variable.

3. A programmed data processing machine method of processing information constituted of at least one variable and associated parameters, which comprises the steps of 1. generating data signals representing said parameters associated with each variable and storing the signals in a machine memory,
2. generating and storing heading signals designating the location of signals generated by step (1),
3. generating and storing identification signals designating the location of the signals generated by step (2), and
4. generating and storing format signals for each of the signals generated at step (1).

4. The machine method of processing information which comprises the steps of 1. generating signals indicating a fixed lower bound of a set of storage locations in a machine memory,
2. generating signals indicating a fixed upper bound of said set of storage locations,
3. generating signals indicating a variable lower bound with respect to the bound of step (1),
4. generating signals indicating a variable upper bound with respect to the bound of step (2),
5. entering signals referring to the bound of step (4) into the location indicated by the bound of step (3), and
6. updating the bound of step (3) by the extent of the signals stored according to step (5).

5. The stored-program-controlled machine method of processing polynomial information constituted of at least one term of coefficient and exponent signals, which comprises the steps of 1. testing the coefficient signals of one term for the termination thereof,
2. storing the signals of the coefficient of said term at a first word location of a machine memory,
3. storing the signals of a first exponent of said term at a new location of said memory bearing a fixed relation to said first location,
4. packing said new location with signals of succeeding exponents to the extent that said new location does not overflow, and
5. repeating steps (3) and (4) with successive new locations each bearing a fixed relation to said first location, and with the next exponent not having its signals packed replacing said first exponent upon packing the previous new location to the point of imminent overflow, until all signals of a term have been stored.

6. The machine method of processing polynomial information constituted of exponent signals stored in a plurality of word locations of a memory, which comprises the steps of 1. ordering the exponent signals in said word locations according to the numerical magnitudes corresponding to the signals of each word, and
2. combining, for the signals thus ordered, all successive words representing like numerical magnitudes.

7. The machine method of multiplying together two polynomials, which comprises the steps of 1. generating signals representing a first-order partial product of the first term of one polynomial by all the terms of the other polynomial and storing the resultant signals at a first block of machine storage locations,
2. generating signals representing a higher order partial product of another term of said one polynomial by all the terms of said other polynomial and storing the resulting signals at a successive block of machine storage locations,
3. generating signals representing a summation of the results of steps (1) and (2) and storing the result of said summation at a block of machine storage locations preceding and partially overwriting those of step (2), and
4. repeating steps (2) and (3) and, for each repetition, storing the resultant summation signals at a block of storage locations preceding and partially overwriting those of each earlier repetition.

8. Apparatus comprising means for storing (1) a first set of signals indicative of the packing of signals representing a plurality of distinctive quantities into groups of preassigned extent and (2) second and third sets of signals packed according to the signals of said first set, register means, means for adding the signals of said second and third sets to each other to form a sum signal, means for loading said sum signal into said register means, means for performing an EXCLUSIVE-OR operation between the contents of said register means and the signals of said second set to form a first EXCLUSIVE-OR result signal, means for storing said first EXCLUSIVE-OR result signal in said register means, means for performing an EXCLUSIVE-OR operation between said first EXCLUSIVE-OR result signal and the signals of said third set to form a second EXCLUSIVE-OR result signal, means for storing said second EXCLUSIVE-OR result signal in said register means, and means for performing an AND operation between the contents of said register means and the signals of said first set.

9. Apparatus comprising means for adding first and second sets of digit signals, together with their carries, to form a third set of signals occupying preassigned digit positions;

means for subtracting, without carries, (1) the signals of the first set from those of said third set to form a first residual set of signals and (2) the signals of the second set from those of said first residual set to form a second residual set; and means for testing the signals of said second residual set for a carry signal in one of said preassigned digit positions.